US012569989B2

(12) United States Patent  
Kitano et al.

(10) Patent No.: US 12,569,989 B2  
(45) Date of Patent: Mar. 10, 2026

(54) ESTIMATION DEVICE, ESTIMATION METHOD, ESTIMATION PROGRAM, AND ROBOT SYSTEM

(71) Applicant: BRIDGESTONE CORPORATION, Tokyo (JP)

(72) Inventors: Hajime Kitano, Tokyo (JP); Yasumichi Wakao, Tokyo (JP); Hitoshi Yasui, Tokyo (JP); Masahiro Yamaguchi, Tokyo (JP); Hirohito Sugino, Tokyo (JP); Yusuke Fujisawa, Tokyo (JP)

(73) Assignee: BRIDGESTONE CORPORATION, Tokyo (JP)

( * ) Notice: Subject to any disclaimer, the term of this patent is extended or adjusted under 35 U.S.C. 154(b) by 230 days.

(21) Appl. No.: 18/569,237

(22) PCT Filed: Jul. 11, 2022

(86) PCT No.: PCT/JP2022/027248  
§ 371 (c)(1),  
(2) Date: Dec. 12, 2023

(87) PCT Pub. No.: WO2023/008160  
PCT Pub. Date: Feb. 2, 2023

(65) Prior Publication Data  
US 2024/0286277 A1     Aug. 29, 2024

(30) Foreign Application Priority Data

Jul. 26, 2021     (JP) ................................. 2021-121927  
Jul. 26, 2021     (JP) ................................. 2021-121929  
(Continued)

(51) Int. Cl.  
*B25J 9/16*          (2006.01)  
*B25J 9/10*          (2006.01)  
*B25J 13/08*        (2006.01)

(52) U.S. Cl.  
CPC ............. *B25J 9/163* (2013.01); *B25J 9/1075* (2013.01); *B25J 9/161* (2013.01); *B25J 13/081* (2013.01); *B25J 13/087* (2013.01)

(58) Field of Classification Search  
None  
See application file for complete search history.

(56) References Cited

U.S. PATENT DOCUMENTS

2010/0292837 A1     11/2010     Takahashi et al.  
2011/0288681 A1     11/2011     Hayakawa et al.  
(Continued)

FOREIGN PATENT DOCUMENTS

AU          2016308995 A1     3/2018  
EP               2060893 A1     5/2009  
(Continued)

OTHER PUBLICATIONS https://www.nitta.co.jp/product/sensor/bpms/.  
(Continued)

*Primary Examiner* — Adam R Mott  
*Assistant Examiner* — Alan Lindsay Ostrow  
(74) *Attorney, Agent, or Firm* — SOLARIS Intellectual Property Group, PLLC

(57) ABSTRACT

A flexible material provided at a robot is conductive and an electrical characteristic of the flexible material changes in response to a change of state. The electrical characteristic between plural detection points of the robot is detected by a detection unit. An estimation unit uses a learning model to estimate a robot state from the electrical characteristic of the robot. The learning model is trained so as to input the electrical characteristic and output the robot state. The learning model is trained using, as training data, electrical characteristics when changes of state occur at the flexible material and robot states after the changes of state of the (Continued)

flexible material of the robot. The estimation unit inputs the electrical characteristic to the learning model and outputs the robot state corresponding to the inputted electrical characteristic.

19 Claims, 60 Drawing Sheets

(30) Foreign Application Priority Data

| | | |
|---|---|---|
| Jul. 26, 2021 | (JP) ................................. | 2021-122017 |
| Jul. 26, 2021 | (JP) ................................. | 2021-122018 |
| Dec. 14, 2021 | (JP) ................................. | 2021-202894 |

(56) References Cited

U.S. PATENT DOCUMENTS

| | | | |
|---|---|---|---|
| 2012/0035765 A1 | 2/2012 | Sato et al. | |
| 2014/0238153 A1* | 8/2014 | Wood .................... | A43B 23/029 |
| | | | 73/862.627 |
| 2017/0239821 A1* | 8/2017 | Lessing .................... | B25J 15/12 |
| 2017/0336891 A1* | 11/2017 | Rosenberg .......... | G06F 3/04144 |
| 2019/0143528 A1* | 5/2019 | Hayashi ............... | B25J 11/0015 |
| | | | 700/245 |
| 2019/0145817 A1* | 5/2019 | Shim ...................... | B25J 19/028 |
| | | | 606/203 |
| 2020/0156244 A1* | 5/2020 | Li ........................... | B25J 13/087 |
| 2021/0283771 A1* | 9/2021 | Ijiri ......................... | B25J 9/1664 |
| 2023/0017613 A1 | 1/2023 | Sakurai et al. | |
| 2023/0043301 A1* | 2/2023 | Okamoto ................ | G01M 3/02 |

FOREIGN PATENT DOCUMENTS

| | | | | |
|---|---|---|---|---|
| JP | 2010-198234 A | | 9/2010 | |
| JP | 2011-056619 A | | 3/2011 | |
| JP | 2013-101096 A | | 5/2013 | |
| JP | 2018011916 A | * | 1/2018 | |
| JP | 2021-084210 A | | 6/2021 | |
| JP | 2021-099552 A | | 7/2021 | |
| WO | 2017/029905 A1 | | 2/2017 | |

OTHER PUBLICATIONS

International Search Report issued in International Application No. PCT/JP2022/027248 on Sep. 13, 2022.

Davari Mohammad-Javad et al., "Identifying Multiple Interaction Events from Tactile Data during Robot-Human Object Transfer", 2019 28th IEEE International Conference on Robot and Human Interactive Communication (RO-MAN), IEEE, Oct. 14, 2019, pp. 1-6, [retrieved on Jan. 10, 2020].

Lasitha Weerakoon et al., "Adaptive Tracking Control of Soft Robots using Integrated Sensing Skin and Recurrent Neural Networks", arxiv.org, Cornell University Library, 201 Olin Library Cornell University Ithaca, NY 14853, Nov. 17, 2020.

Zimmer Julian et al., "Predicting Grasp Success with a Soft Sensing Skin and Shape-Memory Actuated Gripper", 2019 IEEE/RSJ International Conference on Intelligent Robots and Systems (IROS), IEEE, Nov. 3, 2019, pp. 7120-7127, [retrieved on Jan. 23, 2020].

Truby Ryan L et al., "Distributed Proprioception of 3D Configuration in Soft, Sensorized Robots via Deep Learning", IEEE Robotics and Automation Letters, IEEE, vol. 5, No. 2, Feb. 25, 2020, pp. 3299-3306, [retrieved on Mar. 10, 2020].

Li Wen-Yung et al., "Shape Recognition of a Tensegrity With Soft Sensor Threads and Artificial Muscles Using a Recurrent Neural Network", IEEE Robotics and Automation Letters, IEEE, vol. 6, No. 4, Jun. 22, 2021, pp. 6228-6234, [retrieved on Jul. 10, 2021].

Sakurai Ryo et al., "Emulating a sensor using soft material dynamics: A reservoir computing approach to pneumatic artificial muscle", 2020 3rd IEEE International Conference on Soft Robotics (ROBOSOFT), IEEE, May 15, 2020, pp. 710-717, [retrieved on Jun. 12, 2020].

Lee Hyosang et al., "Internal Array Electrodes Improve the Spatial Resolution of Soft Tactile Sensors Based on Electrical Resistance Tomography", 2019 International Conference on Robotics and Automation (ICRA), IEEE, May 20, 2019 (May 20, 2019), pp. 5411-5417, [retrieved on Aug. 9, 2019].

* cited by examiner

FIG.4
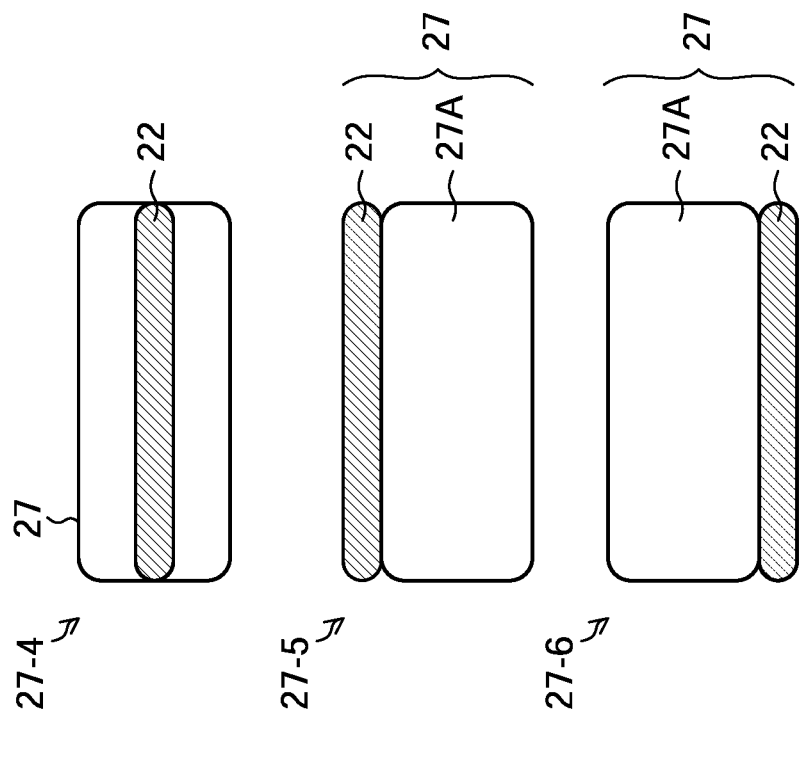
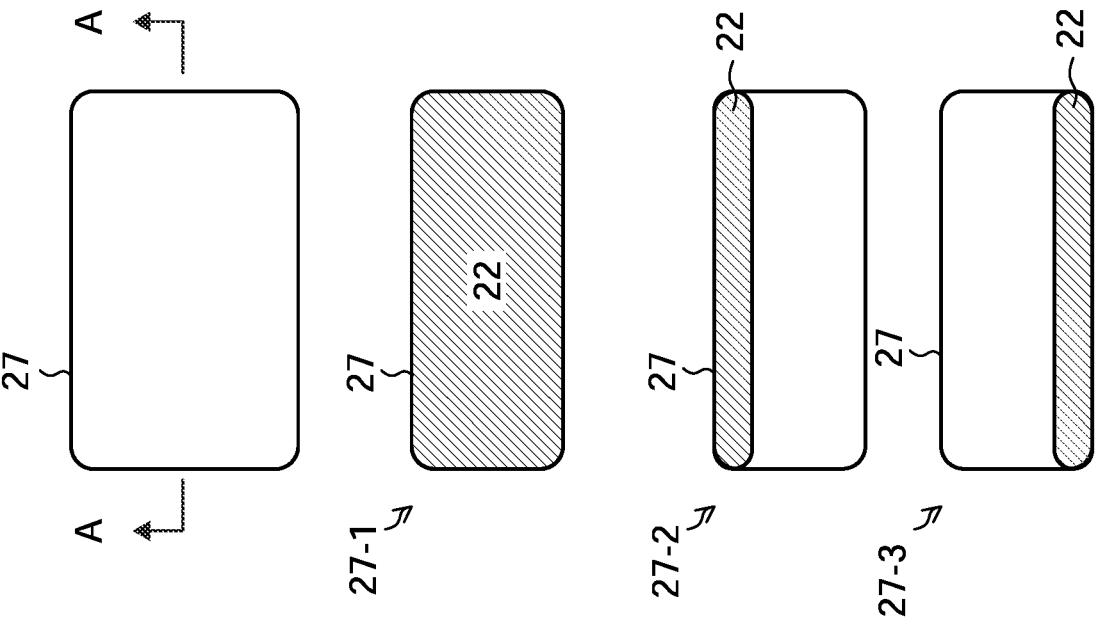

FIG.6
2

Figure 26:
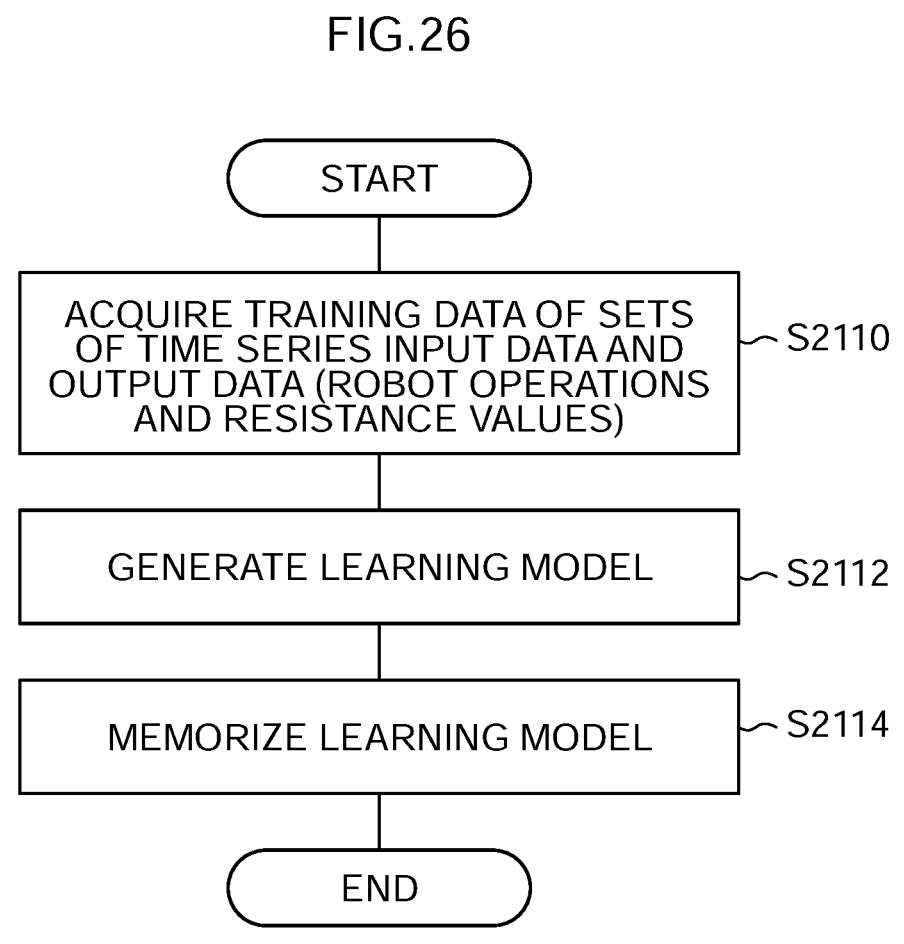

START

ACQUIRE TRAINING DATA OF SETS OF TIME SERIES INPUT DATA AND OUTPUT DATA (ROBOT OPERATIONS AND RESISTANCE VALUES) — S2110

GENERATE LEARNING MODEL — S2112

MEMORIZE LEARNING MODEL — S2114

END

FIG.38

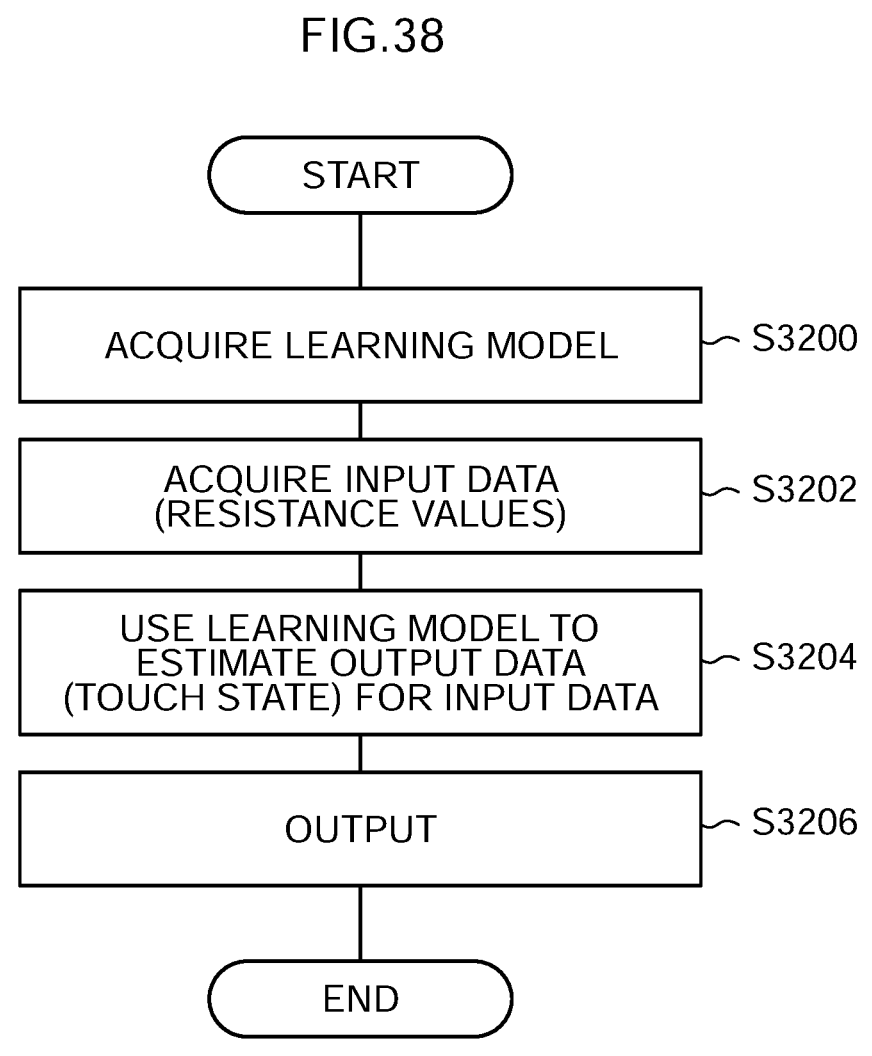

```
            ┌─────────────┐
            │    START    │
            └─────────────┘
                   │
     ┌──────────────────────────────┐
     │   ACQUIRE LEARNING MODEL     │── S3200
     └──────────────────────────────┘
                   │
     ┌──────────────────────────────┐
     │     ACQUIRE INPUT DATA       │── S3202
     │    (RESISTANCE VALUES)       │
     └──────────────────────────────┘
                   │
     ┌──────────────────────────────┐
     │   USE LEARNING MODEL TO      │
     │    ESTIMATE OUTPUT DATA      │── S3204
     │ (TOUCH STATE) FOR INPUT DATA │
     └──────────────────────────────┘
                   │
     ┌──────────────────────────────┐
     │           OUTPUT             │── S3206
     └──────────────────────────────┘
                   │
            ┌─────────────┐
            │     END     │
            └─────────────┘
```

Figure 39:
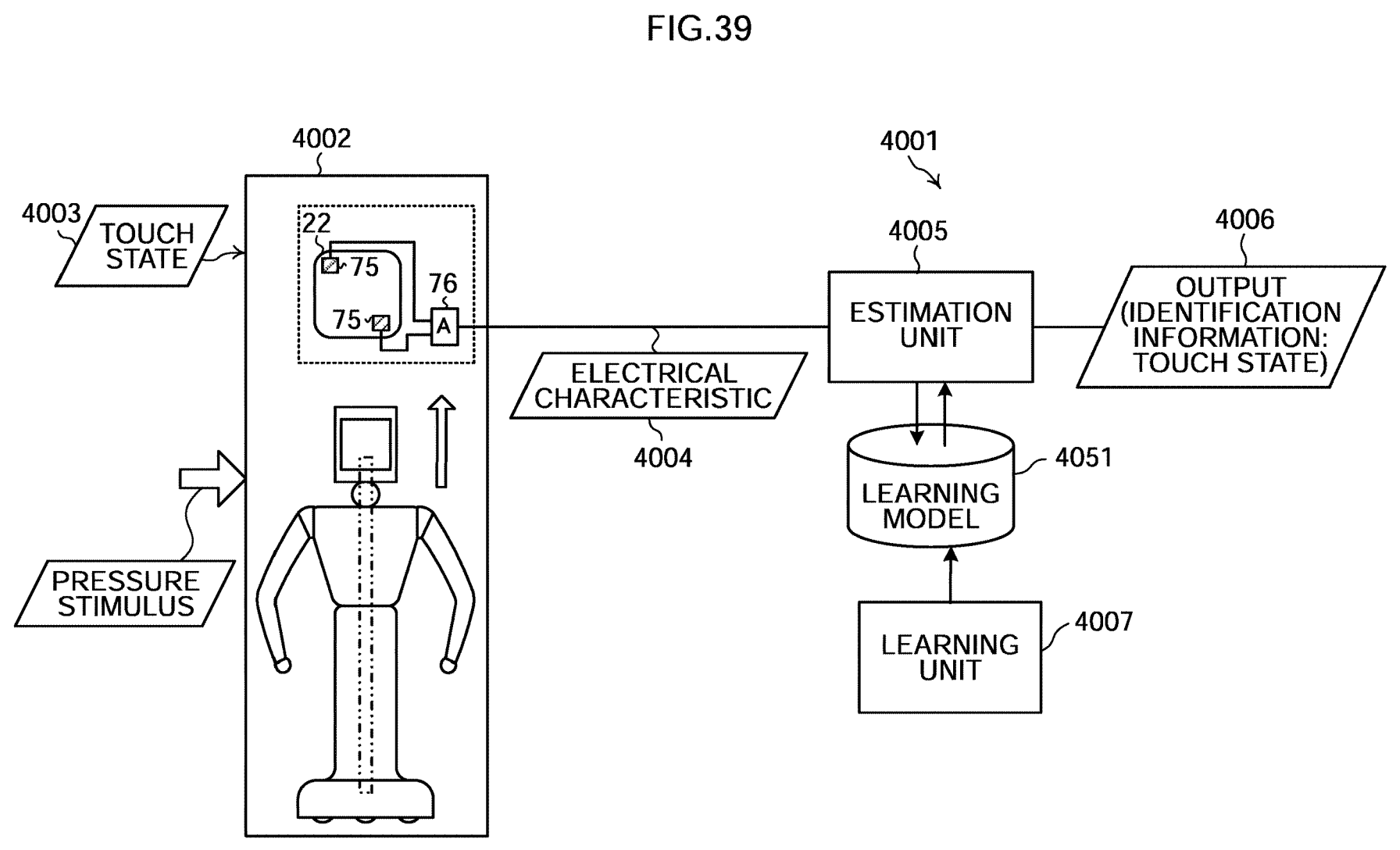

OUTPUT
(IDENTIFICATION
INFORMATION:
TOUCH STATE)

4001

4005

ESTIMATION
UNIT

4051

LEARNING
MODEL

4007

LEARNING
UNIT

4004

ELECTRICAL
CHARACTERISTIC

4002

76

A

75

75

22

4003

TOUCH
STATE

PRESSURE
STIMULUS

FIG.43

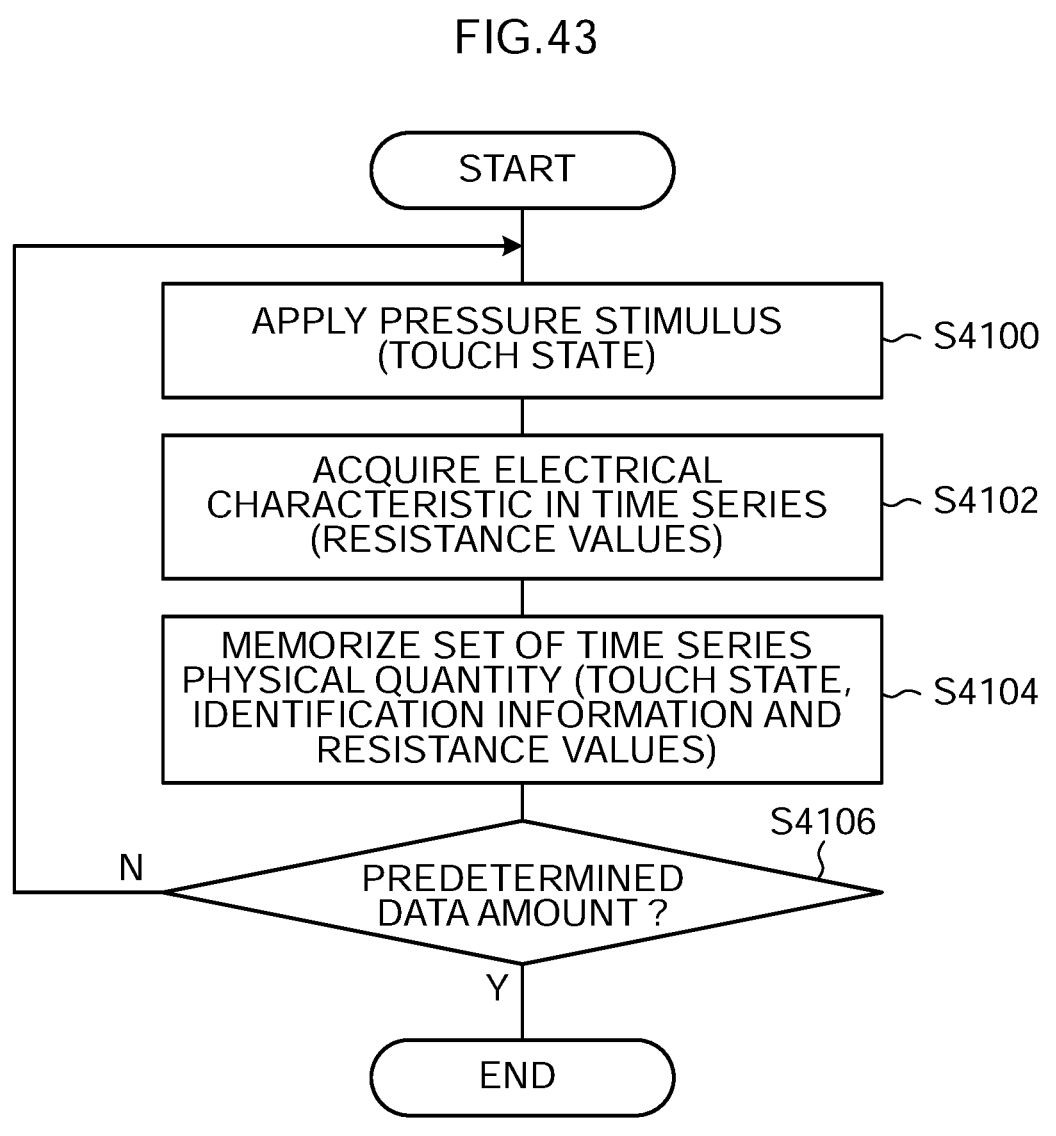

START

APPLY PRESSURE STIMULUS
(TOUCH STATE) ～ S4100

ACQUIRE ELECTRICAL
CHARACTERISTIC IN TIME SERIES
(RESISTANCE VALUES) ～ S4102

MEMORIZE SET OF TIME SERIES
PHYSICAL QUANTITY (TOUCH STATE,
IDENTIFICATION INFORMATION AND
RESISTANCE VALUES) ～ S4104

S4106

N  PREDETERMINED
DATA AMOUNT ?

Y

END

FIG.54

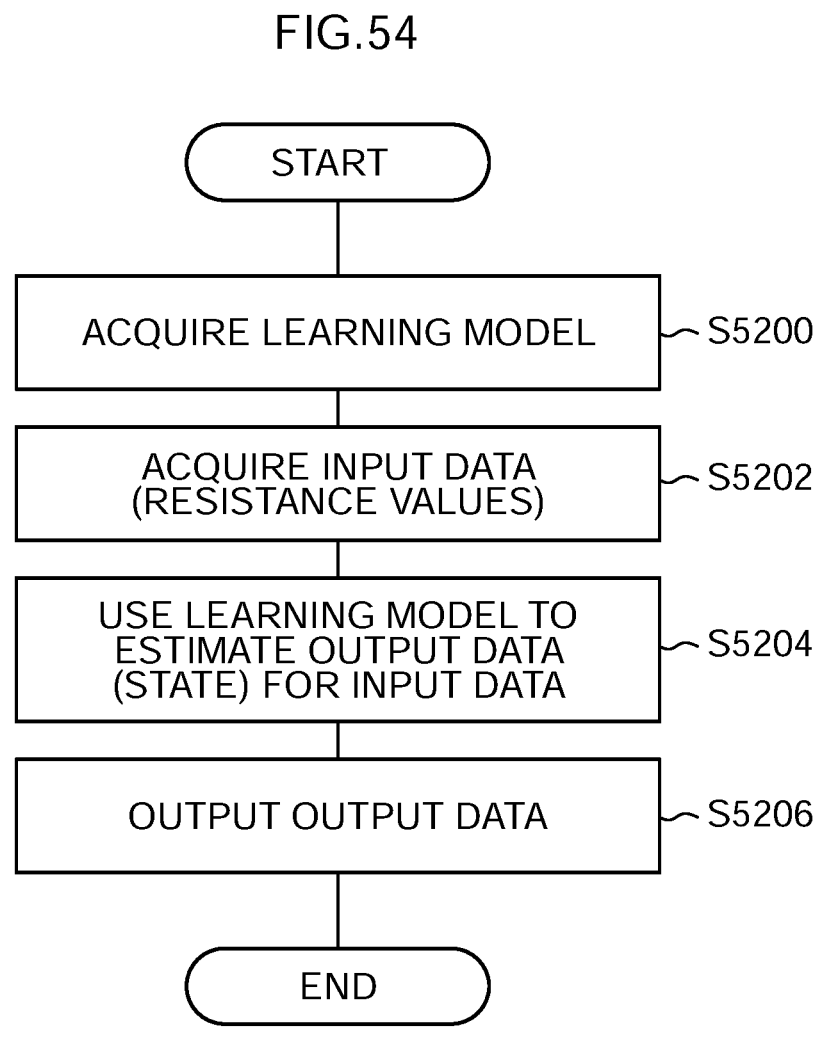

START

ACQUIRE LEARNING MODEL — S5200

ACQUIRE INPUT DATA
(RESISTANCE VALUES) — S5202

USE LEARNING MODEL TO
ESTIMATE OUTPUT DATA
(STATE) FOR INPUT DATA — S5204

OUTPUT OUTPUT DATA — S5206

END

FIG.56

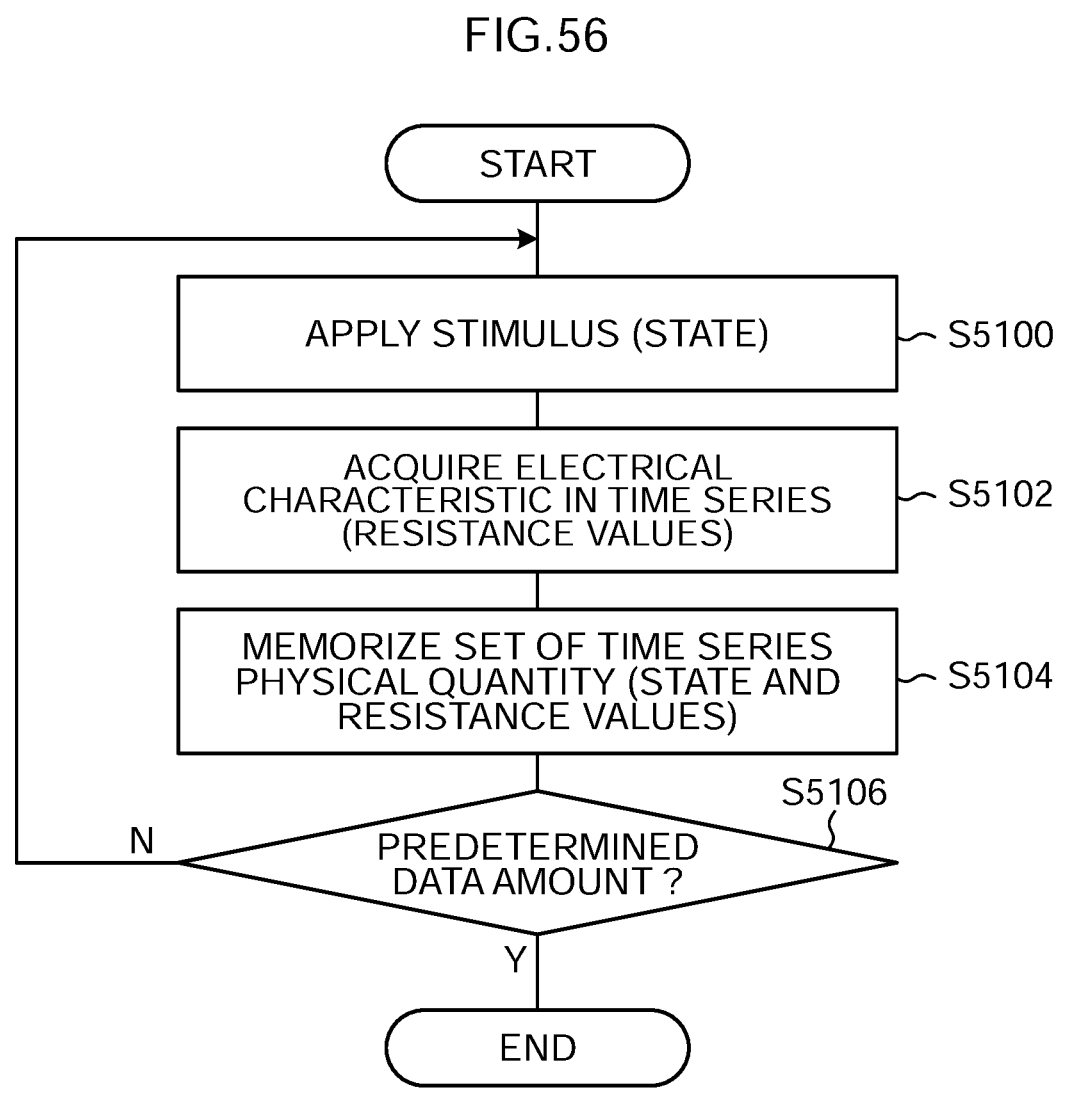

START

APPLY STIMULUS (STATE) — S5100

ACQUIRE ELECTRICAL CHARACTERISTIC IN TIME SERIES (RESISTANCE VALUES) — S5102

MEMORIZE SET OF TIME SERIES PHYSICAL QUANTITY (STATE AND RESISTANCE VALUES) — S5104

S5106

N — PREDETERMINED DATA AMOUNT ?

Y

END

ESTIMATION DEVICE, ESTIMATION METHOD, ESTIMATION PROGRAM, AND ROBOT SYSTEM

TECHNICAL FIELD

The present disclosure relates to an estimation device, an estimation method, an estimation program, and a robot system.

BACKGROUND ART

Recently, technological development of robots that assist user tasks and operations has been energetically pursued. Technologies are known (for example, see Japanese Patent Application Laid-Open (JP-A) No. 2011-056619) in which, with consideration for collisions with people and objects, a robot is equipped with numerous special touch sensors and detects contact of a person or object with the robot.

To detect changes in state of a robot, detecting changes in state of the exterior of the robot has been considered, but special detection equipment is required for detecting amounts of change at side surfaces that detect the changes in state. For example, technologies are known (for example, see International Publication No. 2017/029905) in which displacements and vibrations of an object are measured with a camera, a deformation image is acquired, and a deformation quantity is extracted. Further technologies are known (for example see JP-A No. 2013-101096) that relate to soft touch sensors that estimate deformation amounts from light transmission amounts.

Still further technologies are known that employ a sheet-shaped pressure sensor and measure a distribution of pressure applied to a wheelchair, a cushion, a bed or the like (for example, see https://www.nitta.co.jp/product/sensor/bpms/).

SUMMARY OF INVENTION

Technical Problem

However, at a side surface that is provided with numerous special sensors and detects changes in state, the sensors need to be provided at respective locations for detecting change amounts and the number of sensors is large, leading to an increase in size of a robot, which is not preferable. Moreover, the numerous special sensors may impede operations of the robot.

A system at a side surface that detects changes in state and includes a camera for detecting change amounts or sensors that detect light transmission amounts with an analysis device that analyzes sensor outputs is large in scale, leading to an increase in size of a robot, which is not preferable. Moreover, sensors that detect change amounts need to be disposed at all portions of the robot in order to detect change amounts, which is not preferable.

A system at a side surface that detects touches and includes a camera for detecting touches or sensors that detect light transmission amounts with an analysis device that analyzes sensor outputs is large in scale, leading to an increase in size of a robot, which is not preferable. Moreover, sensors that detect touches need to be disposed at all portions of the robot in order to detect touches, which is not preferable.

A robot may be operated only with operations specified in advance at a time of fabrication. Depending on individual users, there may be various touch states, and the robot may need to be operated in accordance with the various touch states.

A system at a side surface that detects shape changes and includes a camera for detecting deformation amounts or sensors that detect light transmission amounts with an analysis device that analyzes sensor outputs is large in scale, leading to an increase in size of a robot, which is not preferable. Moreover, sensors that detect deformation amounts need to be disposed at all portions of the robot in order to detect deformation amounts, which is not preferable. In particular, when a robot is equipped with movable portions and touch states of the movable portions against target objects are to be estimated, numerous special touch sensors and the like are required, meaning large equipment, which is not preferable.

A system at a side surface that detects shape changes and includes a camera for detecting deformation amounts or sensors that detect light transmission amounts with an analysis device that analyzes sensor outputs is large in scale, leading to an increase in size of a robot, which is not preferable. Moreover, sensors that detect deformation amounts need to be disposed at all portions of the robot in order to detect deformation amounts, which is not preferable. In particular, a robot such as a nursing care robot or the like may conduct identification of individual users touching the robot in order to make adjustments for various changes of application in accordance with the users. However, a separate device is required for identifying the users, meaning large equipment, which is not preferable.

An object of the present disclosure is to provide an estimation device, an estimation method, an estimation program and a robot system that may, without using special detection equipment, utilize an electrical characteristic of a conductive flexible material to estimate robot state information representing a state of a robot, robot operation information representing an operation of the robot, or identification information of a user touching the robot.

Solution to Problem

In order to achieve the object described above, a first aspect is an estimation device including:

a detection unit that detects an electrical characteristic between a pre-specified plurality of detection points at a flexible material in a robot, the flexible material being provided at at least a part of an exterior portion or at a movable portion, the flexible material including conductivity, and the electrical characteristic changing in response to a change of state; and an estimation unit that inputs a time series of the electrical characteristic detected by the detection unit to a learning model and estimates robot state information, robot operation information or user identification information representing a state of the robot corresponding to the input time series of the electrical characteristic, the learning model being trained so as to input the time series of the electrical characteristic and output the robot state information, robot operation information or user identification information, and the learning model being trained using, as training data, time series of the electrical characteristic when changes of state occur, and using robot state information representing states of the robot after the changes of state, robot operation information representing operations of the robot corresponding to the changes of state, or identification information of users who touch the robot and cause the changes of state.

A second aspect is a robot system including:

a robot in which a flexible material is provided at a movable portion, the flexible material including conductivity and an electrical characteristic of the flexible material changing in response to a change in applied pressure; and the estimation device of the first aspect.

A third aspect is a robot system including:

a robot in which a flexible material is provided at at least a part of an exterior portion, the flexible material including conductivity and an electrical characteristic of the flexible material changing in response to a change of state or a change in applied pressure; and the estimation device of the first aspect.

A fourth aspect is a robot system including:

a robot in which a flexible material is provided at at least a part of an exterior portion, the flexible material including conductivity and an electrical characteristic of the flexible material changing in response to a change in applied pressure; and the estimation device of the first aspect, wherein the robot is controlled so as to perform an operation represented by the robot operation information estimated by the estimation device.

A fifth aspect is an estimation method including a computer:

acquiring an electrical characteristic from a detection unit that detects the electrical characteristic between a pre-specified plurality of detection points at a flexible material in a robot, the flexible material being provided at at least a part of an exterior portion or at a movable portion, the flexible material including conductivity, and the electrical characteristic changing in response to a change of state; and estimating robot state information, robot operation information or user identification information representing a state of the robot corresponding to an input time series of the electrical characteristic detected by the detection unit, the estimating including inputting the time series of the electrical characteristic to a learning model, the learning model being trained so as to input the time series of the electrical characteristic and output the robot state information, robot operation information or user identification information, and the learning model being trained using, as training data, time series of the electrical characteristic when changes of state occur, and robot state information representing states of the robot after the changes of state, robot operation information representing operations of the robot corresponding to the changes of state, or identification information of users who touch the robot and cause the changes of state.

A sixth aspect is an estimation program causing a computer to execute processing including:

acquiring an electrical characteristic from a detection unit that detects the electrical characteristic between a pre-specified plurality of detection points at a flexible material in a robot, the flexible material being provided at at least a part of an exterior portion or at a movable portion, the flexible material including conductivity, and the electrical characteristic changing in response to a change of state; and estimating robot state information, robot operation information or user identification information representing a state of the robot corresponding to an input time series of the electrical characteristic detected by the detection unit, the estimating including inputting the time series of the electrical characteristic to a learning model, the learning model being trained so as to input the time series of the electrical characteristic and output the robot state information, robot operation information or user identification information, and the learning model being trained using, as training data, time series of the electrical characteristic when changes of state occur, and robot state information representing states of the robot after the changes of state, robot operation information representing operations of the robot corresponding to the changes of state, or identification information of users who touch the robot and cause the changes of state.

Advantageous Effects of Invention

According to the present disclosure, an effect is provided in that, without the use of special detection equipment, an electrical characteristic of a conductive flexible material may be utilized to estimate robot state information representing a state of a robot, robot operation information representing an operation of the robot, or identification information of a user touching the robot.

BRIEF DESCRIPTION OF DRAWINGS

FIG. 4 is diagrams relating to an exterior portion of the robot according to the exemplary embodiment.

FIG. 6 is a diagram relating to the robot according to the exemplary embodiment.

FIG. 9 is a diagram relating to the conductive member according to the exemplary embodiment.

FIG. 26 is a flowchart showing an example of a flow of learning processing according to the second exemplary embodiment.

FIG. 38 is a flowchart showing an example of a flow of estimation processing according to the third exemplary embodiment.

FIG. 39 is a diagram showing an example of structures of an identification information estimation device according to a fourth exemplary embodiment.

FIG. 43 is a flowchart showing an example of training data collection processing according to the fourth exemplary embodiment.

FIG. 54 is a flowchart showing an example of a flow of estimation processing according to the fifth exemplary embodiment.

FIG. 56 is a flowchart showing an example of training data collection processing according to the fifth exemplary embodiment.

DETAILED DESCRIPTION

Figure 1:
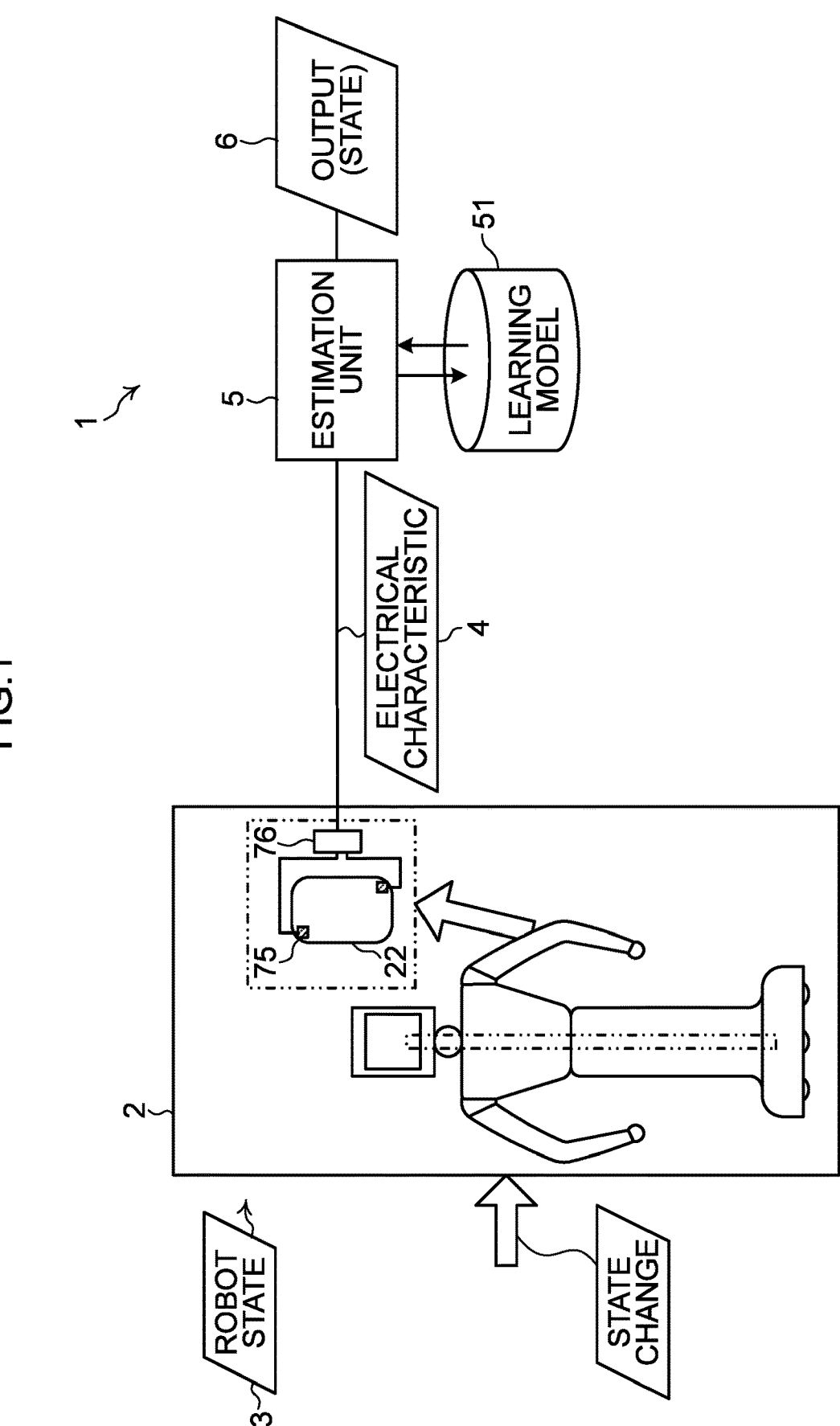
FIG. 1 is a diagram showing an example of structures of a robot state estimation device according to a first exemplary embodiment.

Below, exemplary embodiments embodying the technology of the present disclosure are described in detail with reference to the attached drawings.

Structural elements and processes that are responsible for the same operations and functions may be assigned the same reference symbols in all the drawings and duplicative descriptions thereof may be omitted as appropriate. The present disclosure is not limited by the exemplary embodiments described below. Further appropriate modifications may be embodied within the scope of the object of the present disclosure. The present disclosure mainly describes using members that deform non-linearly to estimate states but it will be clear that using members that deform linearly to estimate states is applicable.

The meaning of the term "robot" as used in the present disclosure is intended to include a structure in which plural parts are coupled and at least one of the parts is movable. The meaning of the term "robot state" is intended to include states representing passive modes (below referred to as passive mode states). The meaning of the term "passive mode state" is intended to include states representing passive modes, illustrated by a liquid or the like adhering to one or more of the parts or a crack forming. Examples of states representing passive modes include adherence states in which a liquid such as water, oil or the like adheres to a robot, and cracked states of parts.

The meaning of the term "flexible material" as used in the present disclosure is intended to include a material that is deformable such that at least a portion is warped or the like by the application of an external force, and includes soft resilient bodies of rubber materials and the like, structures that contain fiber-form or mesh-form frameworks, and structures inside which numerous microscopic bubbles are dispersed. Examples of external forces include pressures. Examples of structures that contain fiber-form or mesh-form frameworks and of structures in which numerous microscopic bubbles are dispersed include polymer materials such as urethanes. The meaning of the term "flexible material with enhanced conductivity" is intended to include materials with conductivity, and includes materials in which a conductive material is added to a flexible material to enhance conductivity and materials in which a flexible material is conductive. A flexible material with enhanced conductivity features the function of an electrical characteristic changing in accordance with a state change. Examples of a physical quantity that activates the function of an electrical characteristic changing in accordance with a state change include an amount of liquid adhering to the flexible material and the size of a crack in a part. Examples of a physical quantity representing an electrical characteristic that changes in accordance with a state change of a flexible material include an electrical resistance value. Alternative examples include a voltage value and a current value. An electrical resistance value may be understood to be a volume resistance value of the flexible material.

Because a flexible material is provided with conductivity, the flexible material manifests an electrical characteristic in response to state changes. That is, in a flexible material with enhanced conductivity, electrical pathways are complexly connected and the electrical pathways contract or expand in response to state changes. The flexible material may exhibit a behavior in which an electrical pathway is temporarily cut and a behavior that causes a different connection from a previous state. Therefore, the flexible material exhibits behaviors with an electrical characteristic between positions separated by a predetermined distance (for example, positions of detection points at which electrodes are disposed) varying in accordance with adhered liquid, a size or distribution of cracking, or the like. Therefore, the electrical characteristic changes in response to liquid adhering to the flexible material, a size or distribution of cracking, or the like.

First Exemplary Embodiment

An estimation device according to the present disclosure uses a trained learning model to estimate a robot state from an electrical characteristic of a conductive flexible material provided at a robot. As training data, the learning model uses time series of the electrical characteristic when state changes are applied to the conductive flexible material and robot state information representing states of the robot after the state changes of the flexible material. The learning model is trained so as to input a time series of the electrical characteristic and output robot state information representing a robot state that corresponds to that time series of the electrical characteristic.

In the descriptions below, a situation is described in which a sheet member serving as the conductive flexible material is disposed at an exterior portion of at least a portion of a robot. In this sheet member (below referred to as conductive urethane), a conductive material is blended with all or at least a portion of a urethane member. Values (amounts of adhered liquid) representing state changes occurring at the robot, which is to say at the flexible material, are employed as a physical quantity that causes the conductive urethane to change state. A situation is described in which electrical resistance values of the conductive urethane are employed as the physical quantity that changes in accordance with state changes.

FIG. 1 is a diagram showing an example of structures of a robot state estimation device 1 that serves as the estimation device of the present disclosure.

Estimation processing at the robot state estimation device 1 uses a trained learning model 51 to estimate and output a passive mode state of a robot 2, which is an unknown robot state, from an electrical characteristic of a conductive urethane 22 disposed at the robot 2. Therefore, robot state information representing a state of the robot may be estimated without using special equipment or large equipment and without directly measuring a state change of the exterior of the robot 2. The learning model 51 is trained using robot states (for example, state values representing passive mode states) as labels and using the electrical characteristic of the conductive urethane (that is, electrical resistance values of the conductive urethane disposed at the robot 2) in those states of the robot as inputs. Training of the learning model 51 is described below.

Figure 2:
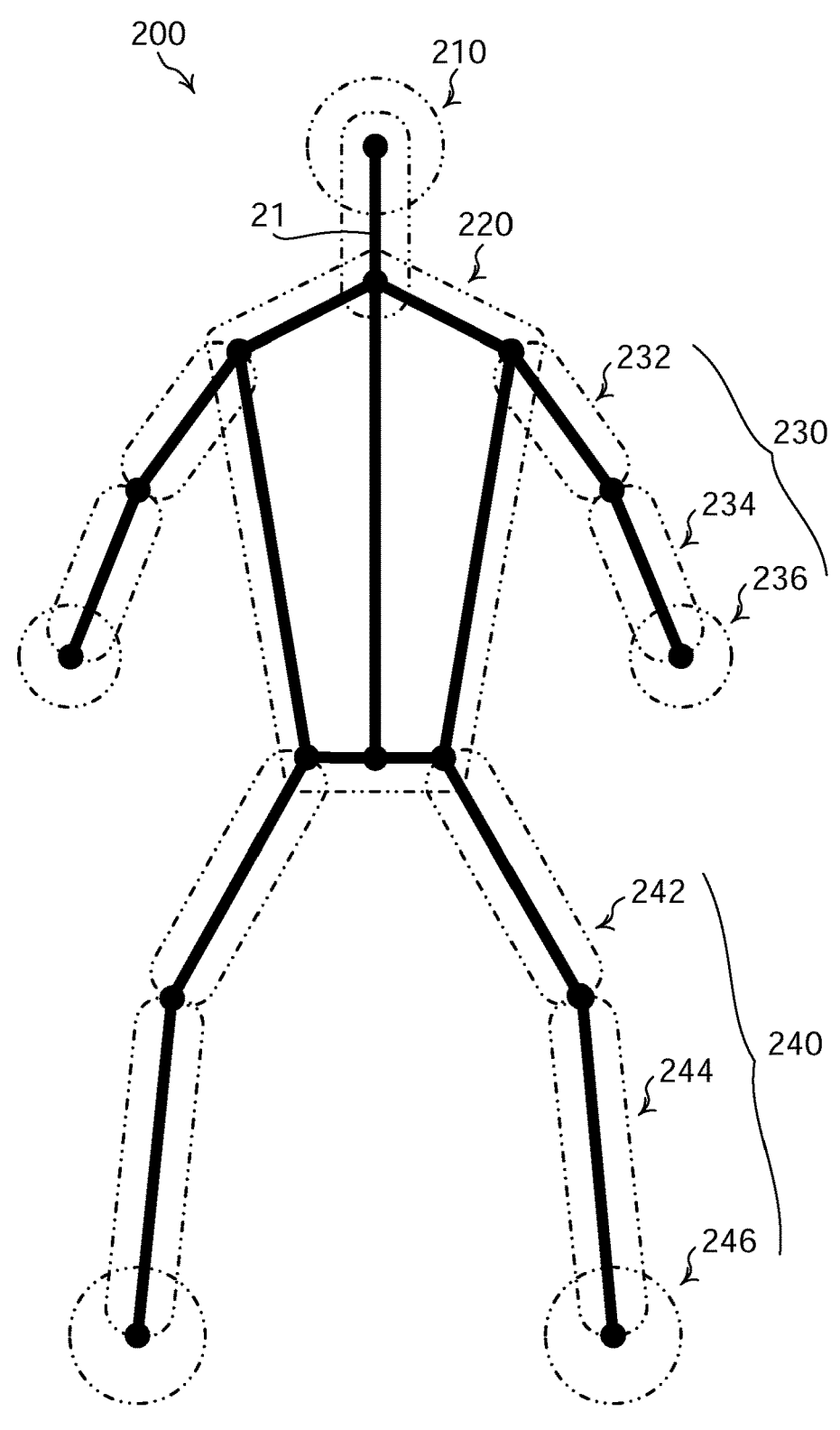
FIG. 2 is a diagram relating to a robot according to the exemplary embodiment.

Now, structures of the robot 2 are described. FIG. 2 shows an example of the robot structures of the android robot 200 that is formed in a humanoid shape.

Figure 8:
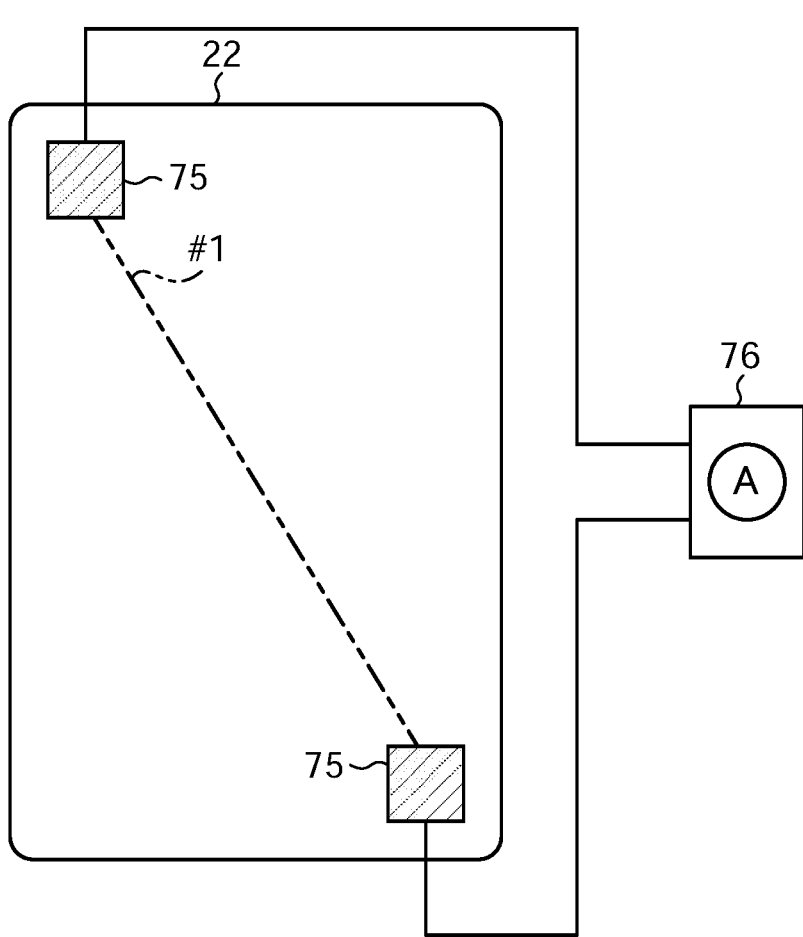
FIG. 8 is a diagram relating to detection points of a conductive member according to the exemplary embodiment.

In the android robot 200 shown in FIG. 2, respective parts of a head portion 210, a trunk portion 220, arm portions 230 (upper arms 232, forearms 234 and hands 236) and leg portions 240 (thighs 242, lower legs 244 and feet 246) are linked by a skeleton 21. In the android robot 200, the conductive urethane 22 is disposed around the skeleton 21. The conductive urethane 22 is disposed at an outer shell at the outer side of the android robot 200. The conductive urethane 22 disposed at the robot 2 is connected to an electrical characteristic detection unit 76 (FIG. 8).

Figure 3:
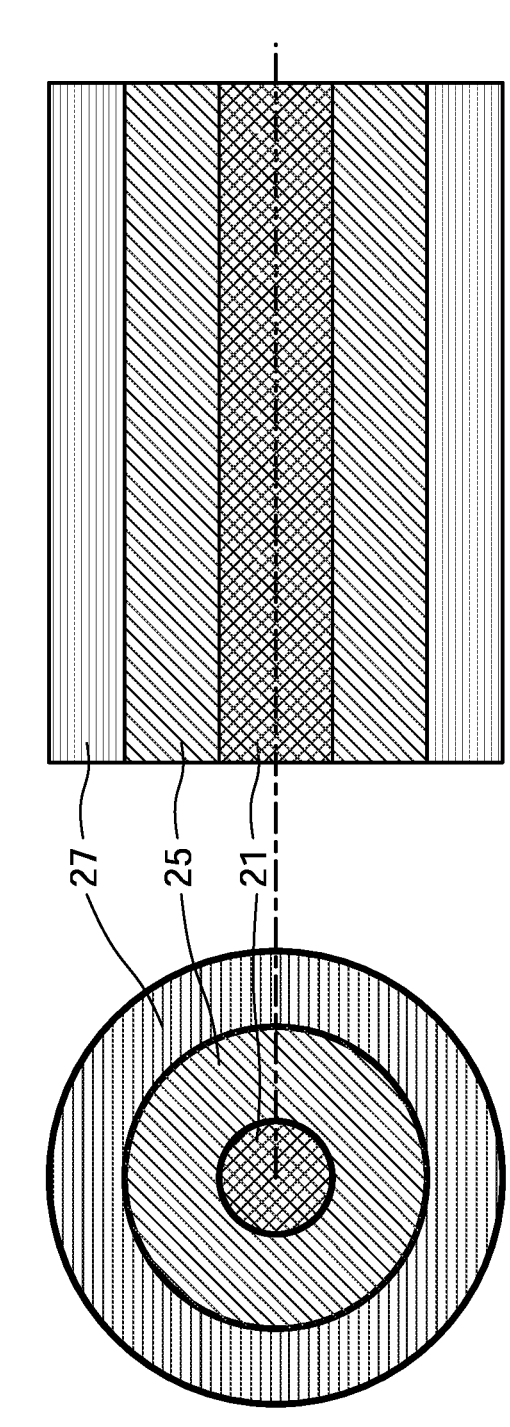
FIG. 3 is a diagram relating to an arm portion of the robot according to the exemplary embodiment.

For example, as shown in a sectional diagram of an example of schematic structure of each upper arm 232 in FIG. 3, an inner layer 25 including structures such as an artificial muscle and the like is disposed around the skeleton 21 of the upper arm 232, and an exterior portion 27 that functions as a skin is disposed around the inner layer 25. The exterior portion 27 that functions as the skin may be disposed around the skeleton 21.

It is sufficient that the conductive urethane 22 is disposed at least at a portion of a material disposed around the skeleton 21, that is, the exterior portion 27. The conductive urethane 22 may be disposed inside and may be disposed outside the exterior portion 27 (FIG. 4). As a concrete example, the section A-A of the exterior portion 27 may be illustrated as the exterior section 27-1 in which the whole of the interior of the exterior portion 27 is constituted by the conductive urethane 22. As illustrated by the exterior section 27-2, the conductive urethane 22 may be formed at a portion of the outer side (surface side) of the exterior portion 27, and as illustrated by the exterior section 27-3, the conductive urethane 22 may be formed at the inner side (skeleton side) of the exterior portion 27. As illustrated by the exterior section 27-4, the conductive urethane 22 may be formed at a portion inside the exterior portion 27. As illustrated by the exterior section 27-5, the conductive urethane 22 may be disposed at the outer side of the material 27A with flexibility that constitutes the exterior portion 27, and as illustrated by the exterior section 27-6, the conductive urethane 22 may be disposed outside of the inner side (skeleton side) of the exterior portion 27. When the conductive urethane 22 is disposed outside of the material 27A constituting the exterior portion 27, the conductive urethane 22 and the material constituting the exterior portion 27 may simply be layered, or the conductive urethane 22 and the material constituting the exterior portion 27 may be integrated by adhesion or the like. Even when the conductive urethane 22 is disposed outside of the material constituting the exterior portion 27, because the conductive urethane 22 is a conductive urethane member, flexibility of the material constituting the exterior portion 27 is not impeded.

Figure 5:
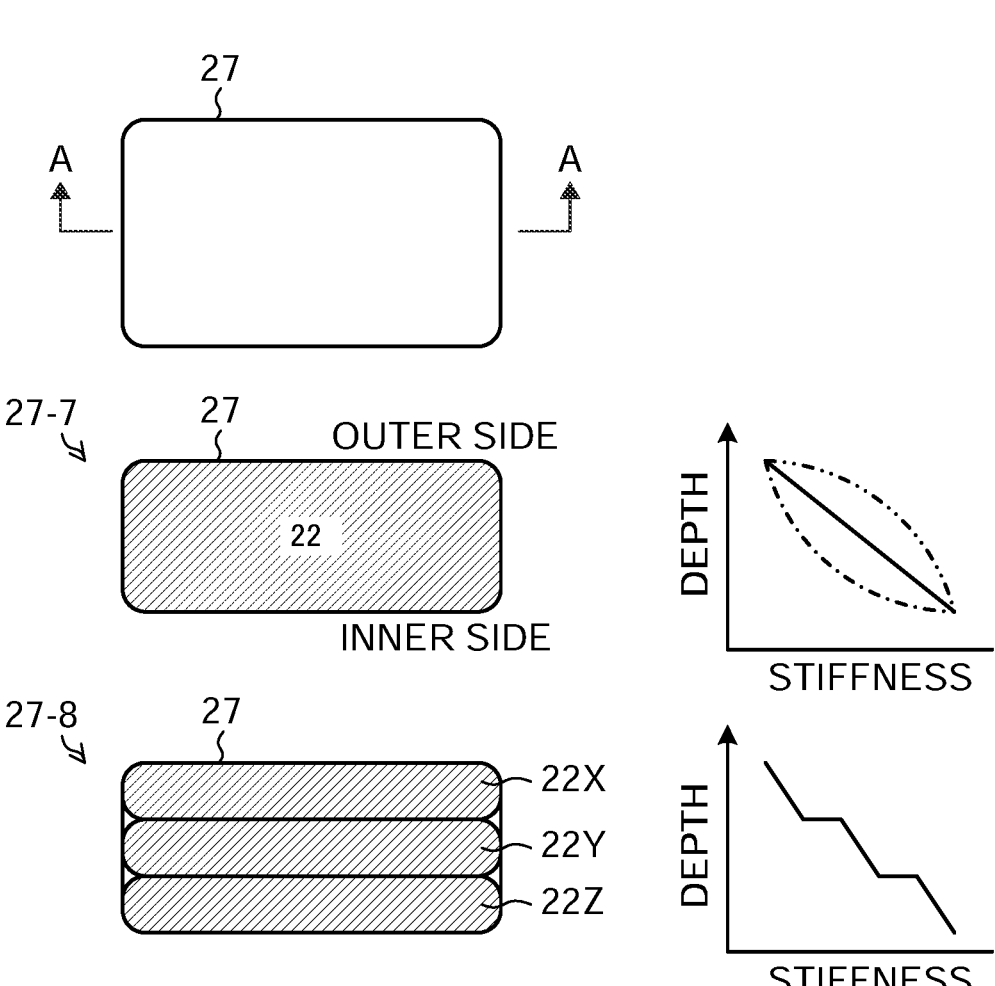
FIG. 5 is diagrams relating to hardness of the exterior portion of the robot according to the exemplary embodiment.

The conductive urethane 22 may be formed so as to have flexibility with predetermined stiffnesses. For example, as shown in FIG. 5, the conductive urethane 22 may be formed so as to have flexibility with the stiffness varying in accordance with depth. FIG. 5 is schematic diagrams relating to stiffnesses of the exterior portion of the robot: schematic diagrams relating to structures of the conductive urethane 22 are shown at the left side of the drawing and schematic diagrams relating to depth and stiffness of the conductive urethane 22 are shown at the right side of the drawing. In the examples shown in FIG. 5, if the exterior portion 27 illustrated as the exterior section 27-7 is structured with the conductive urethane 22, the conductive urethane 22 may be formed such that that the stiffness progressively increases from the outer side (surface side) of the exterior portion 27 toward the inner side (skeleton side), that is, as the depth increases. As illustrated by the exterior section 27-8, plural conductive urethanes 22 with different thicknesses may be arranged (stiffnesses: 22X<22Y<22Z). With a structure such that the stiffness (flexibility) of the exterior portion 27 including the conductive urethane 22 varies in accordance with depth, a touch sensation similar to skin areas of the human body may be provided.

In order to simplify descriptions below, descriptions are given in which, as an example of the robot of the present disclosure, an autonomous robot system including a robot with the simplified shape shown in FIG. 6 is employed as the robot 2. The conductive urethane 22 is disposed around the skeleton 21 to serve as the exterior, which is the outer side of the robot 2, to form exterior portions of the robot 2.

As shown in FIG. 6, the head portion 210 of the robot 2 is structured with a display unit 211 and a neck portion 212, and the trunk portion 220 is structured with an upper trunk 222 and a lower trunk 224. Each arm portion 230 of the robot 2 is structured with the shoulder portion 231, limb portion 233 and hand 236, and the leg portion 240 is structured with the base portion 241 equipped with a movement mechanism that is not shown in the drawings. The head portion 210, trunk portion 220, arm portions 230 and leg portion 240 are linked by the skeleton 21.

The limb portion 233 of each arm portion 230 is formed to be inflectable with the shoulder portion 231 as a pivot. In a structure in which the limb portion 233 of the arm portion 230 is formed to be inflectable, a member containing a resilient body that deforms linearly or nonlinearly may be employed. A resilient contraction body that produces a contraction force in a predetermined direction in response to an applied physical quantity (for example, a voltage, a supply of liquid or the like) can be mentioned as an example. As an example of a resilient contraction body, an airbag-type member of a publicly known type may be employed (for example, see Japanese Patent Application Publication No. S52-40378). An airbag-type resilient contraction body (for example, a rubber actuator) includes a main body in which an outer periphery of a tubular body structured of a soft resilient material, such as a rubber member or the like, is covered by a woven reinforcing structure of organic or inorganic polymer fibers, for example, aromatic polyamide fibers. Openings at both ends of the main body are sealed off by enclosing members. The rubber actuator deforms by expansion when a pressurized fluid is supplied to an internal cavity via a connection aperture provided in the enclosing members, producing a contracting force along the axial direction. Thus, this rubber actuator is changed in length by the expansion deformation. Note, however, that the rubber actuator is merely an example of an applicable target of the estimation device of the present disclosure; the estimation device is also applicable to members other than rubber actuators.

Figure 7:
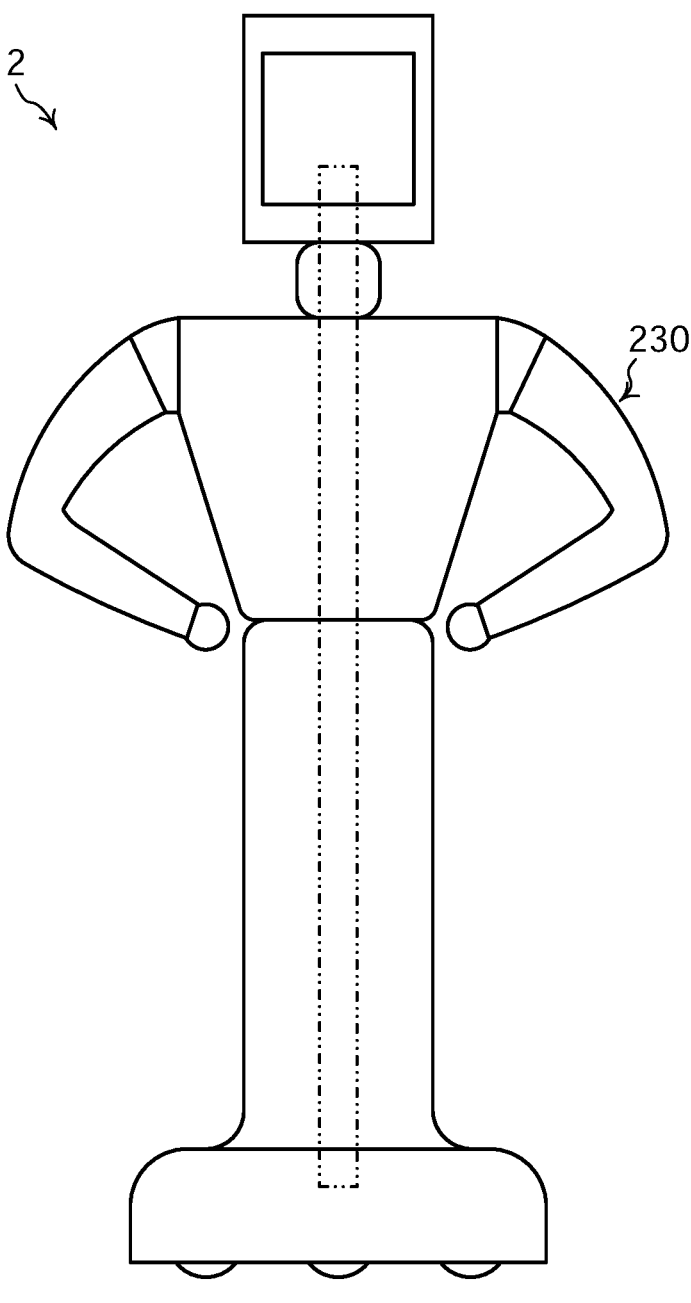
FIG. 7 is a diagram relating to the robot according to the exemplary embodiment.

As illustrated in FIG. 7, the limb portion 233 of the robot 2 is inflected by driving of a resilient contraction member that is not shown in the drawing. A human arm may be imitated by operations of the limb portion 233.

Figure 17:
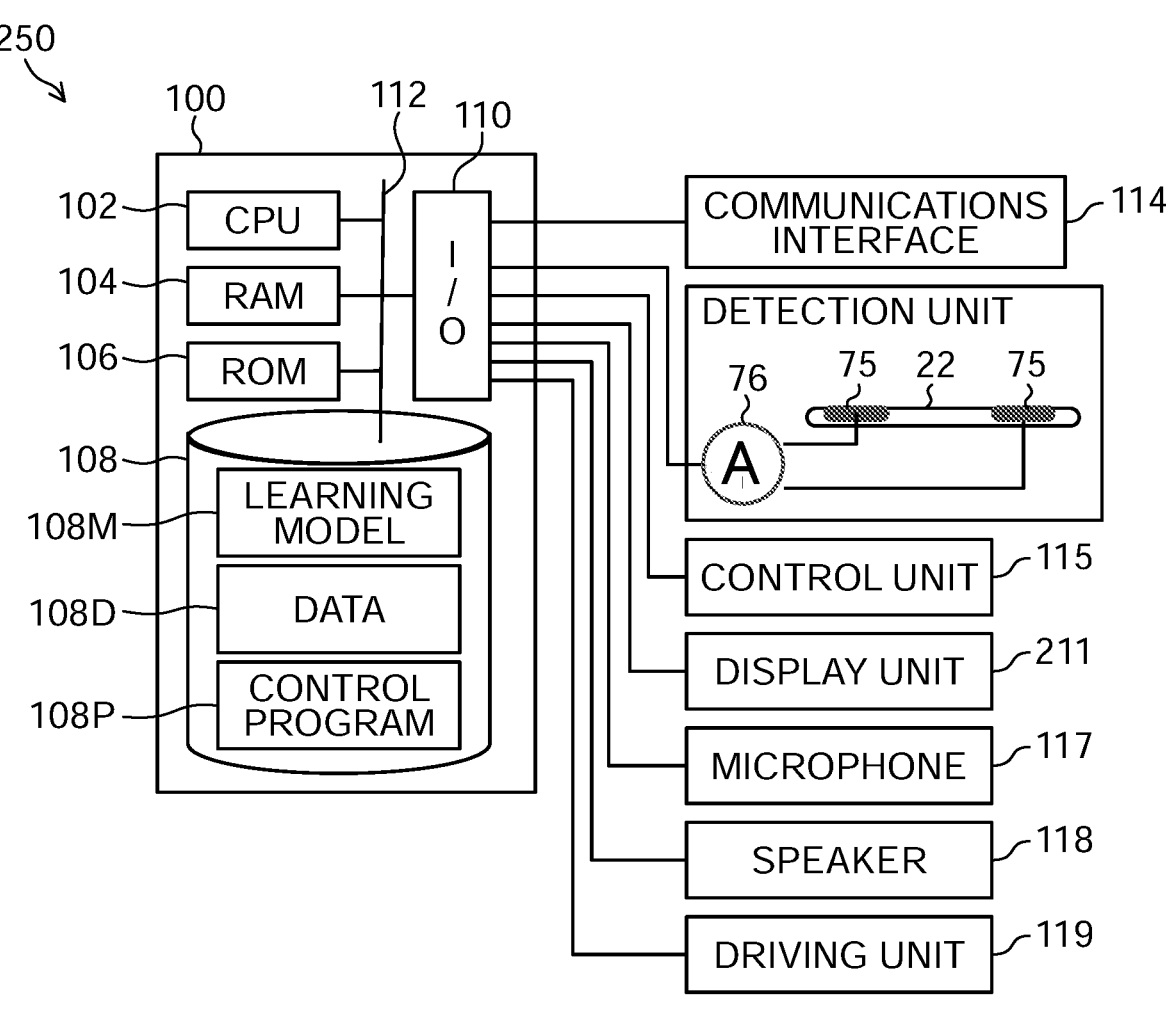
FIG. 17 is a diagram showing an example of structures of the robot state estimation device according to the exemplary embodiment.

Because the robot 2 is equipped with the unillustrated movement mechanism at the base portion 241, the robot 2 is movable. A control device 250 that controls the robot 2 is provided at the base portion 241 (FIG. 17). The control device 250 includes functional units that operate as the robot state estimation device 1.

The robot 2 is equipped with a control unit 115, the display unit 211, a microphone 117 and a speaker 118 (FIG. 17). Thus, commands from users, states of users, information on responses to users and the like may be acquired and supplied.

The robot 2 is equipped with a driving unit 119 (FIG. 17) for moving parts in accordance with the coupling of the skeleton 21 at portions other than the leg portion 240 including the base portion 241. By driving of the driving unit 119 (FIG. 17) moving respective parts or moving plural coupled parts, the robot 2 may maintain various postures and conduct various actions. Thus, the robot 2 operates as an autonomous robot system.

To estimate a robot state, the robot state estimation device 1 detects an electrical characteristic of the conductive urethane 22 disposed at the robot 2.

As shown in FIG. 8, the electrical characteristic of the conductive urethane 22 (that is, volume resistance values, which are electrical resistance values) may be detected from signals from plural (two in FIG. 8) detection points 75 that are disposed a distance apart. FIG. 8 illustrates a situation in which the conductive urethane 22 that is disposed as a portion of the exterior portion 27 is unfolded flat. FIG. 8 shows a detection set #1 that detects electrical resistance values from signals from the plural detection points 75, which are distanced apart and disposed at opposite corners of the conductive urethane 22. Arrangements of the plural detection points 75 are not limited to the positions shown in FIG. 8 but may be any positions provided those positions enable detection of the electrical characteristic of the conductive urethane 22. It is sufficient that the electrical characteristic detection unit 76 that detects the electrical characteristic of the conductive urethane 22 (that is, volume resistance values that are electrical resistance values) is connected to and uses outputs from the detection points 75.

The electrical resistance values detected at the robot 2 that is equipped with the conductive urethane 22 at the exterior portion 27 change from before to after a state change of the conductive urethane 22 caused by a state change being applied to the exterior portion 27 of the robot 2 or the like. Therefore, a state change of the robot 2 may be detected by detecting electrical resistance values in a time series, that is, detecting a change in the electrical resistance values from a state in which the state change has not been applied to the robot 2 (for example, detecting an electrical resistance value that exceeds a pre-specified threshold). In concrete terms, because the conductive urethane 22 is disposed at the robot 2, states of adherence of liquid to the robot 2 may be detected. The electrical resistance value changes if any one of a position, distribution and size of a state change applied to the robot 2 changes. Therefore, detecting states of adherence of liquid to the robot 2 from electrical resistance values changing in time series is conceivable. If the robot 2 is structured with artificial muscles, liquids encompass a medium for activating the artificial muscles (for example, a pressurized fluid for rubber actuators).

The exterior portion 27 including the conductive urethane 22 formed at the robot 2 may be formed as an integrated structure in which the exterior portion 27 including the conductive urethane 22 is formed at the outer side of the robot 2, and the exterior portion 27 including the conductive urethane 22 may be formed separately at respective parts.

To improve a detection accuracy of the electrical characteristic at a single conductive urethane 22, a greater number of detection points than the (two) detection points shown in FIG. 8 may be used.

Figure 9:
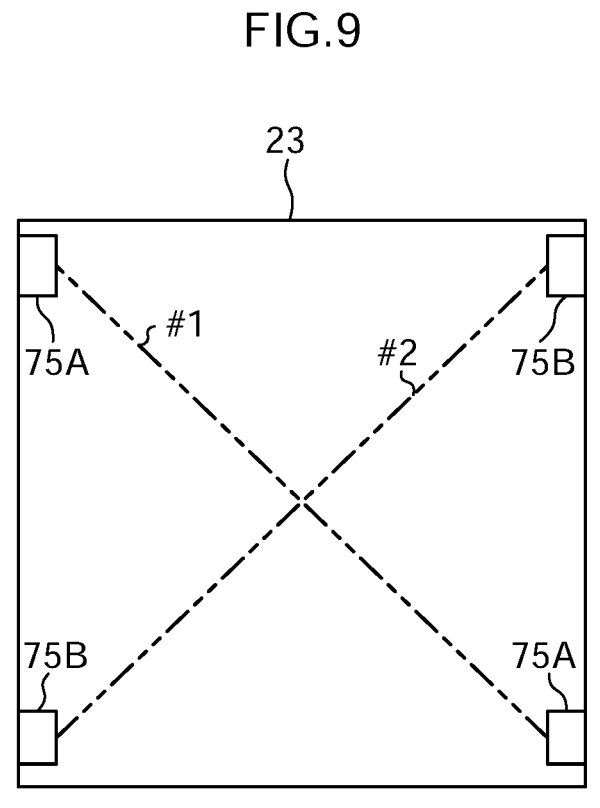
Figure 10:
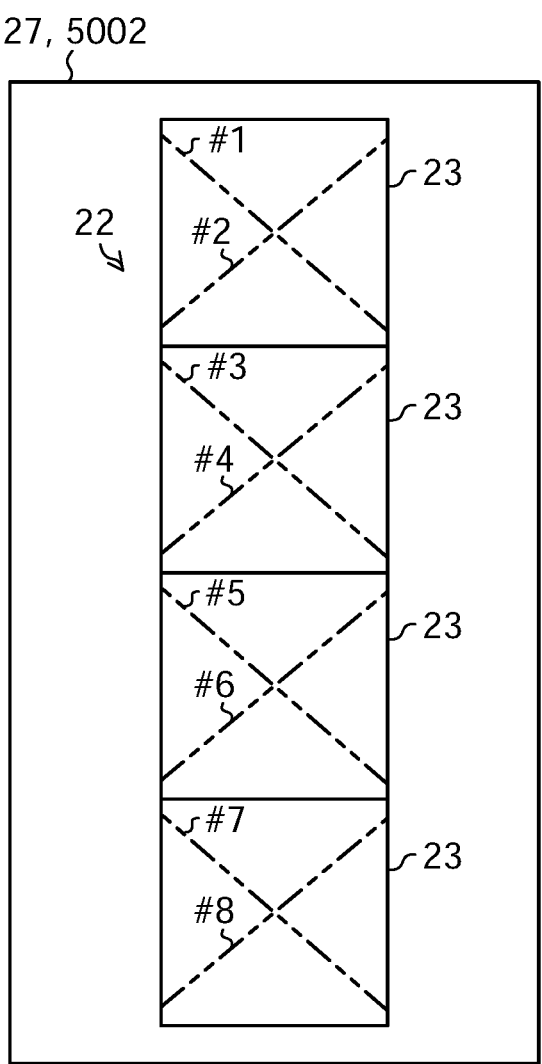
FIG. 10 is a diagram relating to conductive members according to the exemplary embodiment.
Figure 11:
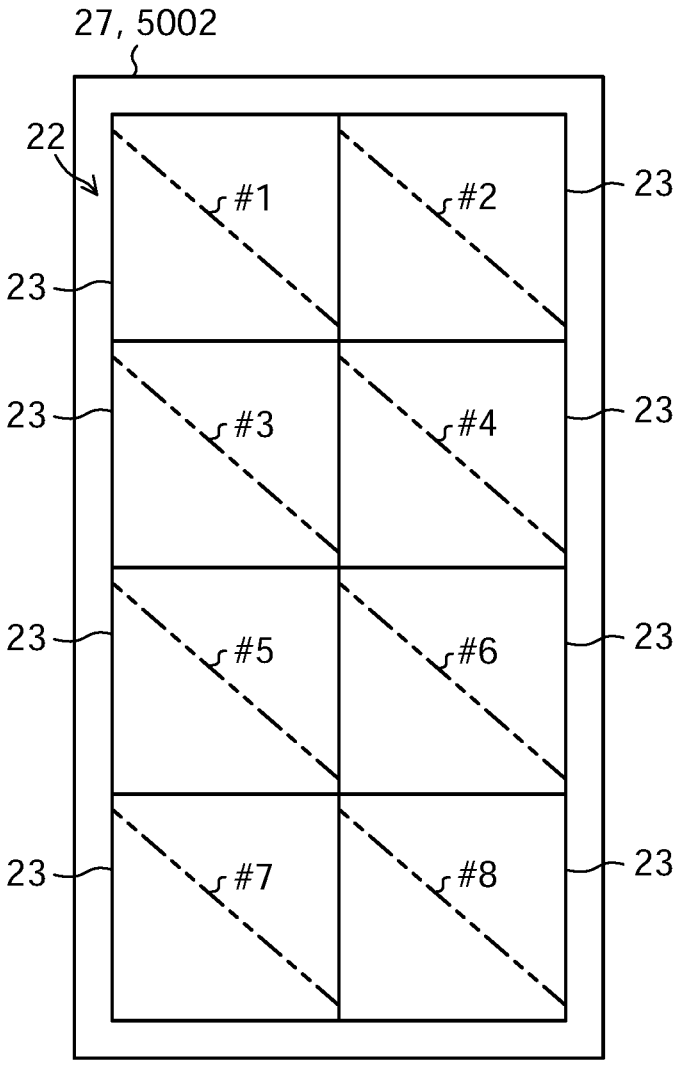
FIG. 11 is a diagram relating to conductive members according to the exemplary embodiment.

As examples, one row or a plural number of rows in which plural conductive urethane pieces at which the respective detection points are disposed may be arrayed to form the conductive urethane 22, and the electrical characteristic may be detected from each of the plural conductive urethane pieces. For example, the conductive urethane pieces 23 (FIG. 9) may be arrayed to form the conductive urethane 22 (FIG. 10 and FIG. 11). The example shown in FIG. 9 illustrates a first detection set #1 and a second detection set #2. The first detection set #1 detects an electrical resistance value according to signals from detection points 75A that are distanced apart and disposed at opposite corner positions. The second detection set #2 detects an electrical resistance value according to signals from detection points 75B that are distanced apart and disposed at the other opposite corner positions. In the example shown in FIG. 10, the conductive urethane pieces 23 (FIG. 9) are arrayed (4×1) in a length direction of the exterior portion 27 to form the conductive urethane 22, and the conductive urethane pieces 23, in sequence, constitute a first detection set #1 to an eighth detection set #8. In the example shown in FIG. 11 the first detection set #1 of each conductive urethane piece 23 (FIG. 9) is employed, and the conductive urethane pieces 23 are arrayed (4×2) in the length direction and a width direction of the exterior portion 27 to form the conductive urethane 22 and constitute a first detection set #1 to an eighth detection set #8.

As an alternative example, a detection range of the conductive urethane 22 may be segmented, detection points may be provided at each segmented detection range, and the electrical characteristic may be detected for each detection range. For example, specifying regions corresponding to the size of the conductive urethane pieces 23 shown in FIG. 10 and FIG. 11 as detection ranges, disposing detection points at each of the specified detection ranges, and detecting the electrical characteristic in each detection range is applicable.

As shown in FIG. 1, the robot state estimation device 1 is equipped with an estimation unit 5. The estimation unit 5 inputs time series input data 4 representing sizes of electrical resistance (electrical resistance values) of the conductive urethane 22. The input data 4 corresponds to a robot state 3 of the robot 2. As an estimation result, the estimation unit 5 outputs output data 6 representing a physical quantity (a robot state value) that represents the robot state 3. The estimation unit 5 includes the trained learning model 51.

The learning model 51 is a model that has been trained to compute a robot state, which is to say a passive mode state of the robot 2 (the output data 6), from electrical resistances (the input data 4) of the conductive urethane 22 that are changed by a state change corresponding to the robot state 3. The learning model 51 is, for example, a model that defines a trained neural network, which is manifested as a collection of information of weights (strengths) of connections between nodes (neurons) structuring the neural network.

Figure 12:
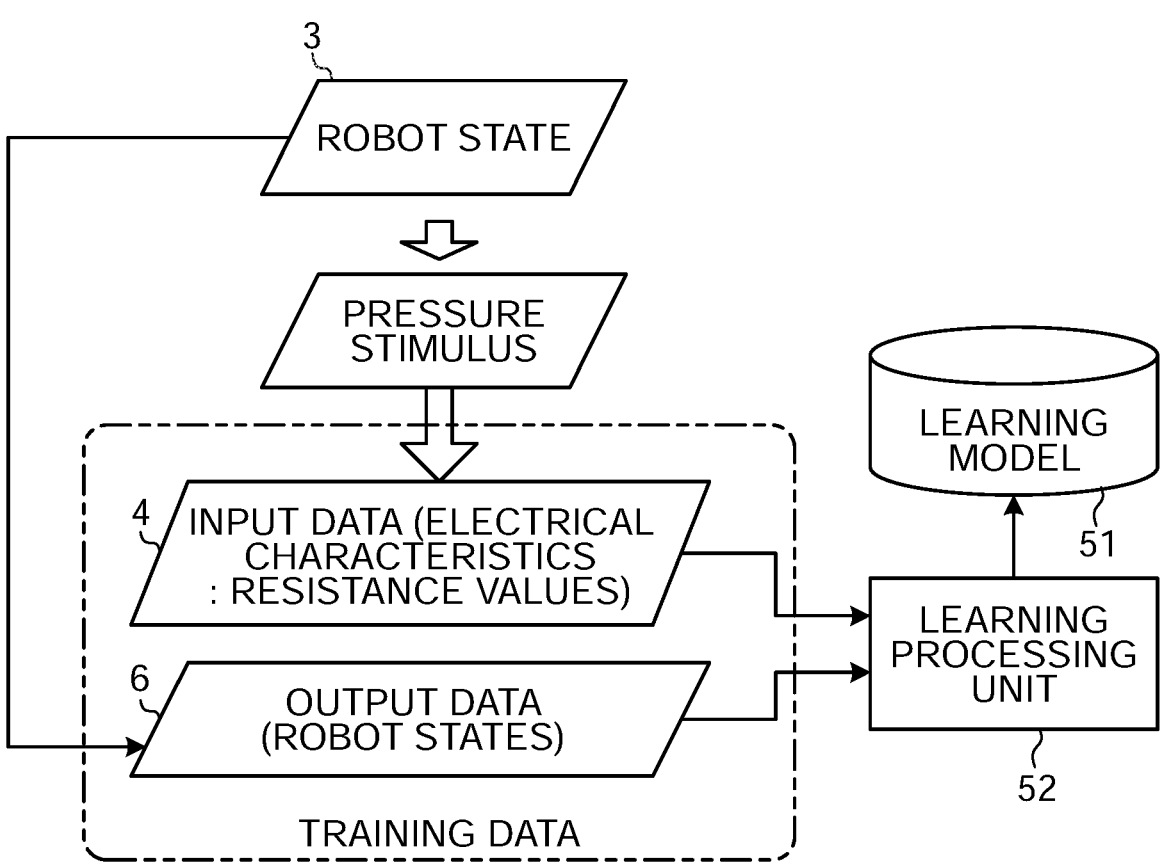
FIG. 12 is a diagram relating to learning processing according to the first exemplary embodiment.

The learning model 51 is generated by learning processing at a learning processing unit 52 (FIG. 12). The learning processing unit 52 uses electrical characteristics of the conductive urethane 22 (the input data 4) that change with state changes according to the robot states 3 to conduct the learning processing. That is, the learning processing unit 52 uses the robot states 3 as labels and large amounts of data of time series measurements of electrical resistances of the conductive urethane 22 as training data. More specifically, the training data includes a large amount of sets of input data including electrical resistance values (the input data 4) and information (the output data 6) representing the robot states 3 corresponding to the input data. The learning processing unit 52 associates time series information by assigning information representing a measurement time to each electrical resistance value of the conductive urethane 22 (the input data 4). This time series information may be associated by assigning the information representing measurement times to sets of time series electrical resistance values of the conductive urethane 22 in periods defined as the robot states 3.

Now the learning processing unit 52 is described.

In the learning processing conducted by the learning processing unit 52, the exterior portion 27 of the robot 2 at which the conductive urethane 22 is disposed as described above is employed as a detection unit, and the robot states 3 and electrical resistance values from the conductive urethane 22 (the input data 4) are used as training data.

For example, data corresponding to robot states representing passive mode states is used as training data. In concrete terms, a user OP is instructed to cause liquid to adhere to the robot 2 or the like so as to put the robot 2 into a predetermined robot state in which liquid is adhered to at least one of the parts. Electrical resistance values at this time are detected and associated with the robot state, and are used as training data. The exterior portion 27 of the robot 2 changes in state due to liquid from a person adhering to at least one part and electrical resistance values of the conductive urethane 22 change. A time series of electrical resistance values may be detected and associated with the robot state (a robot state value), and may be used as training data. States of adherence of liquid to one or a combination of multiple parts are applied as the passive mode states.

Figure 13:
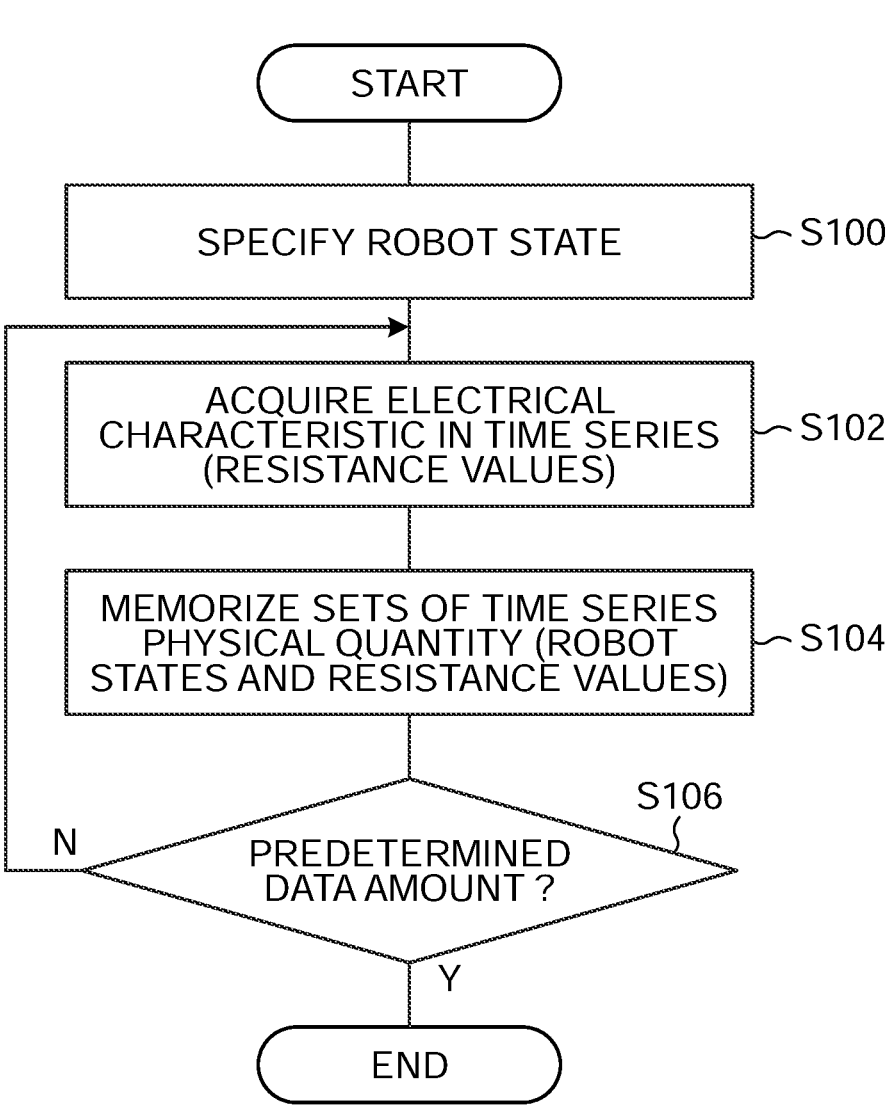
FIG. 13 is a flowchart showing an example of training data collection processing according to the first exemplary embodiment.

The learning processing unit 52 may be structured with a computer including a CPU, which is not shown in the drawings. The learning processing unit 52 executes training data collection processing and the learning processing. FIG. 13 shows an example of the training data collection processing executed by the unillustrated CPU. In step S100, the learning processing unit 52 gives an instruction to attain a robot state as described above. In step S102, the learning processing unit 52 acquires a time series of electrical resistance values of the conductive urethane 22 that change in accordance with a state change corresponding to the robot state. In step S104, the learning processing unit 52 assigns a robot state value representing the robot state 3 to the acquired time series electrical resistance values as a label and memorizes the same. The learning processing unit 52 repeats the processing described above until a pre-specified number of sets of these robot state values and electrical resistance values of the conductive urethane 22 is reached or until a pre-specified time has passed (results of the determination in step S106 are negative until the result is affirmative). Thus, the learning processing unit 52 may acquire and memorize electrical resistance values of the conductive urethane 22 in time series for each of the robot states 3. The learning processing unit 52 uses the memorized sets of respective robot states and time series electrical resistance values of the conductive urethane 22 as the training data.

Now, when a liquid adheres to the robot 2, an electrical characteristic (the electrical resistance values) changes to increase with robot states in which greater amounts of liquid adhere to the exterior portion 27. Therefore, at least an adherence state in which liquid adheres to the exterior portion 27 may be detected by detecting that an electrical characteristic time series exceeds a pre-specified threshold for touch detection. Accordingly, providing at least adherence states in which liquid is adhered to the exterior portion 27 are detected, using electrical characteristic time series corresponding to adhered amounts of liquid as the training data is applicable.

Robot states may be identified by physical quantities such as positions of parts of the robot 2, relative positional relationships of plural parts, distributions, sizes and frequencies of state changes of the parts, and so forth. Therefore, electrical characteristic time series of the conductive urethane 22 encompass the feature of a time series physical quantity representing a robot state. In the present exemplary embodiment, because the conductive urethane 22 is utilized, an electrical characteristic (volume resistance) reflecting these physical quantities may be detected in time series.

Thus, when a state of the robot 2 changes and an electrical characteristic corresponding to the change of state is acquired in time series, the electrical characteristic time series may be associated with the robot state and memorized. Sets of electrical characteristic time series and robot state values representing the robot states may be used as the training data.

Now, an example of the training data described above is shown in a table. Table 1 is an example in which data associating time series electrical resistance value data (r)

with passive mode states, including liquid adherence states and cracked states, is used as training data relating to the passive mode states.

TABLE 1

| Time series electrical resistance value data | State |
|---|---|
| r11, r12, r13, . . . r1n | Water (adherence) |
| r21, r22, r23, . . . r2n | Oil (adherence) |
| r31, r32, r23, . . . r3n | Cracking |
| . . . | . . . |

Figure 14:
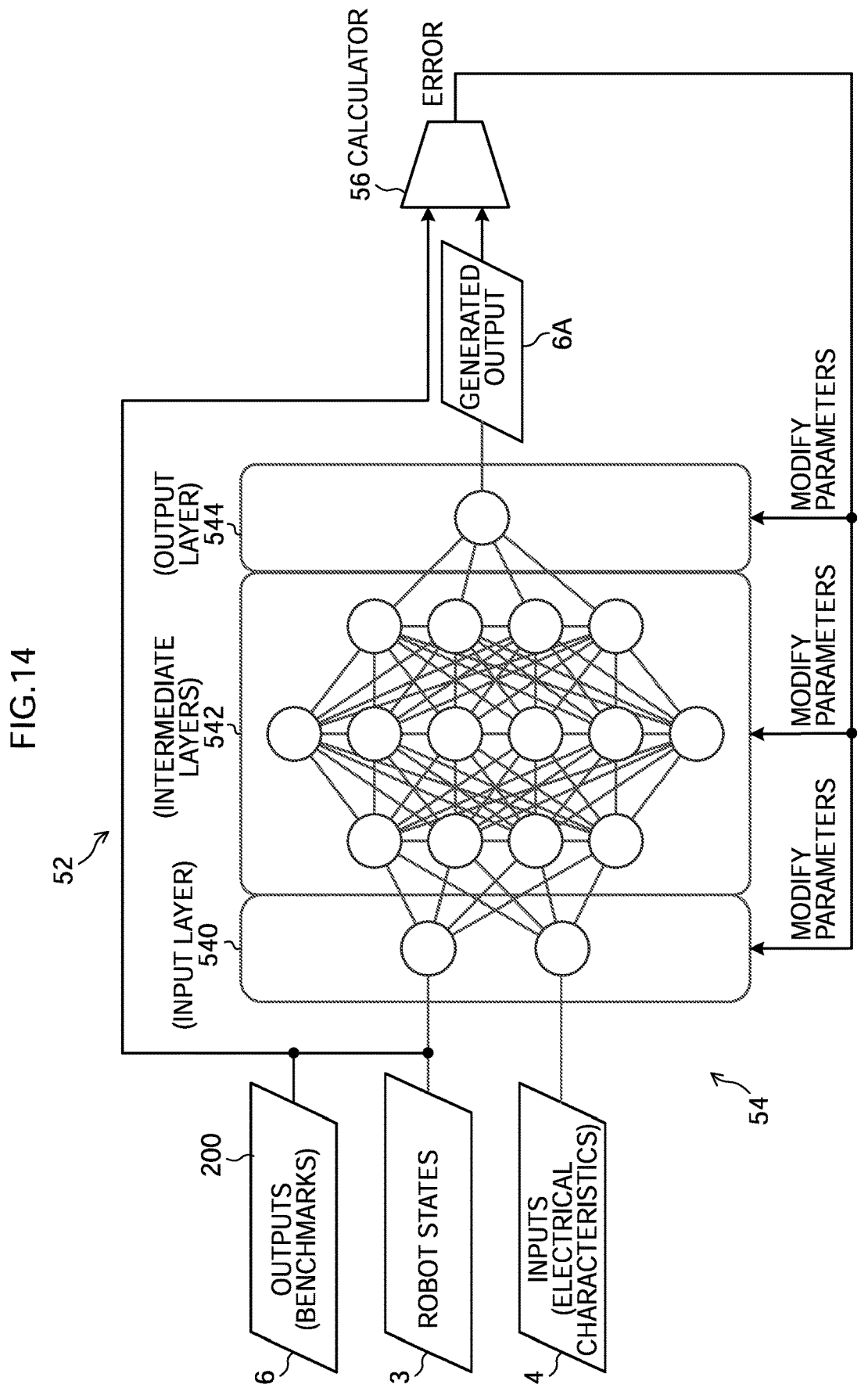
FIG. 14 is a diagram relating to learning processing at a learning processing unit according to the first exemplary embodiment.

Now, the learning processing at the learning processing unit 52 is described. FIG. 14 is a diagram showing functions of the unillustrated CPU of the learning processing unit 52 in the learning processing.

The unillustrated CPU of the learning processing unit 52 includes a generator 54 and a calculator 56 as functional sections. The generator 54 features a function of generating outputs in consideration of inputs that are before-and-after relationships of electrical resistance values acquired in time series As training data, the learning processing unit 52 retains numerous sets of the input data 4 described above (electrical resistance values) and the output data 6 that is robot states 3 corresponding to the input data 4 (electrical resistance values).

The generator 54 includes an input layer 540, intermediate layers 542 and an output layer 544, constituting a publicly known neural network (NN). Because a neural network is a publicly known technology, detailed descriptions are not given here. However, the intermediate layers 542 include numerous node groups (neuron groups) with inter-node connections and feedback connections. Data is inputted from the input layer 540 to the intermediate layers 542 and data of computation results from the intermediate layers 542 is outputted to the output layer 544.

The generator 54 is a neural network that generates generated output data 6A representing a robot state from the inputted input data 4 (electrical resistances). The generated output data 6A is data in which a robot state is estimated from the input data 4 (electrical resistances). The generator 54 generates generated output data representing a state close to a robot state from the input data 4 (electrical resistances) inputted in a time series. By learning using numerous sets of the input data 4 (electrical resistances), the generator 54 becomes capable of generating the generated output data 6A to be close to a robot state after a state change is applied to the robot 2, that is, the conductive urethane 22. From another perspective, the electrical characteristics that are the input data 4 inputted in time series may be understood as patterns. By learning these patterns, the generator 54 becomes capable of generating the generated output data 6A close to a robot state after a state change is applied to the robot 2, which is to say the conductive urethane 22.

The calculator 56 compares the generated output data 6A with the output data 6 of the training data, and calculates an error in the comparison results. The learning processing unit 52 inputs the generated output data 6A and the output data 6 of the training data to the calculator 56. In response, the calculator 56 calculates an error between the generated output data 6A and the output data 6 of the training data, and outputs signals representing the calculation results.

On the basis of the error calculated by the calculator 56, the learning processing unit 52 tunes weight parameters of the inter-node connections to train the generator 54. More specifically, weight parameters of inter-node connections between the input layer 540 and the intermediate layers 542 of the generator 54, weight parameters of inter-node connections in the intermediate layers 542, and weight parameters of inter-node connections between the intermediate layers 542 and the output layer 544 are respectively fed back to the generator 54 using a technique such as, for example, gradient descent, error back propagation or the like. Thus, connections between all the nodes are optimized so as to minimize differences between the generated output data 6A and the training data output data 6, using the output data 6 of the training data as benchmarks.

The learning model 51 is generated by the learning processing of the learning processing unit 52. The learning model 51 is manifested by the learning processing unit 52 as a collection of information of weight parameters (weights or strengths) of inter-node connections of training results.

Figure 15:
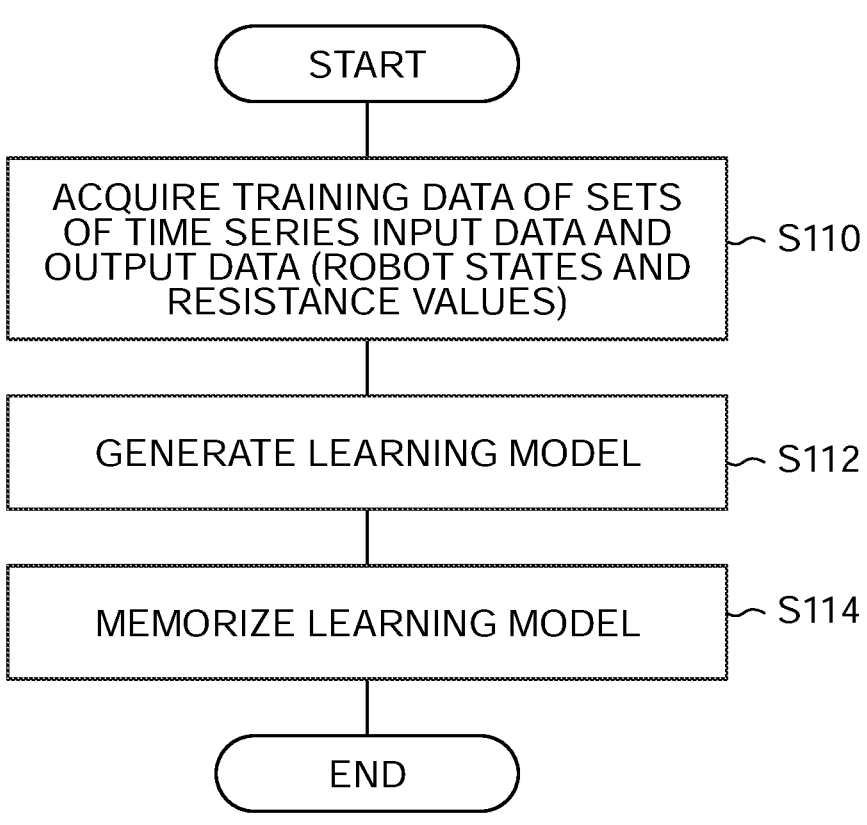
FIG. 15 is a flowchart showing an example of a flow of learning processing according to the first exemplary embodiment.

FIG. 15 shows an example of flow of the learning processing. In step S110, the learning processing unit 52 acquires the input data 4 (electrical resistances) labeled with information representing robot states, which is the training data of results measured in time series. In step S112, the learning processing unit 52 uses the training data of results measured in time series to generate the learning model 51. That is, the learning processing unit 52 obtains a collection of information of weight parameters (weights or strengths) of inter-node connections of the training results that is trained using the numerous sets of training data as described above. In step S114, the learning processing unit 52 memorizes data manifested as the collection of information of weight parameters (weights or strengths) of inter-node connections of the training results to serve as the learning model 51.

The generator 54 may also use a recurrent neural network with a function that generates outputs with consideration to before-and-after relationships of the time series inputs, or may use an alternative method.

In the robot state estimation device 1 described above, the trained generator 54 (that is, the data manifested as a collection of information of weight parameters of inter-node connections of training results) generated by the method of which an example is illustrated above is used as the learning model 51. When the learning model 51 that is used is sufficiently trained, identifying robot states from time series electrical resistance values of the conductive urethane 22 disposed at the robot 2, which is to say the exterior portion 27, is conceivable.

The processing carried out by the learning processing unit 52 is an example of processing of a learning model generation device of the present disclosure. The robot state estimation device 1 is an example of an estimation unit and the estimation device of the present disclosure. The output data 6 that is information representing the robot states 3 is an example of robot state information of the present disclosure.

As described above, in the conductive urethane 22 electrical pathways are complexly connected as described above. The conductive urethane 22 exhibits behaviors such as contractions and extensions of the electrical pathways, temporary cut-offs and new connections in accordance with state changes, and consequently exhibits behaviors with electrical characteristics that differ depending on applied state changes. This means the conductive urethane 22 may be treated as a reservoir storing data relating to state changes of the conductive urethane 22. Thus, the robot state estimation device 1 may employ the conductive urethane 22 in a neural network (below referred to as a PRCN) known as physical reservoir computing (PRC). Because PRC and a PRCN are publicly known technologies, detailed descriptions are not given here. That is, PRC and a PRCN are excellently applicable to estimating information relating to state changes of the conductive urethane 22.

Figure 16:
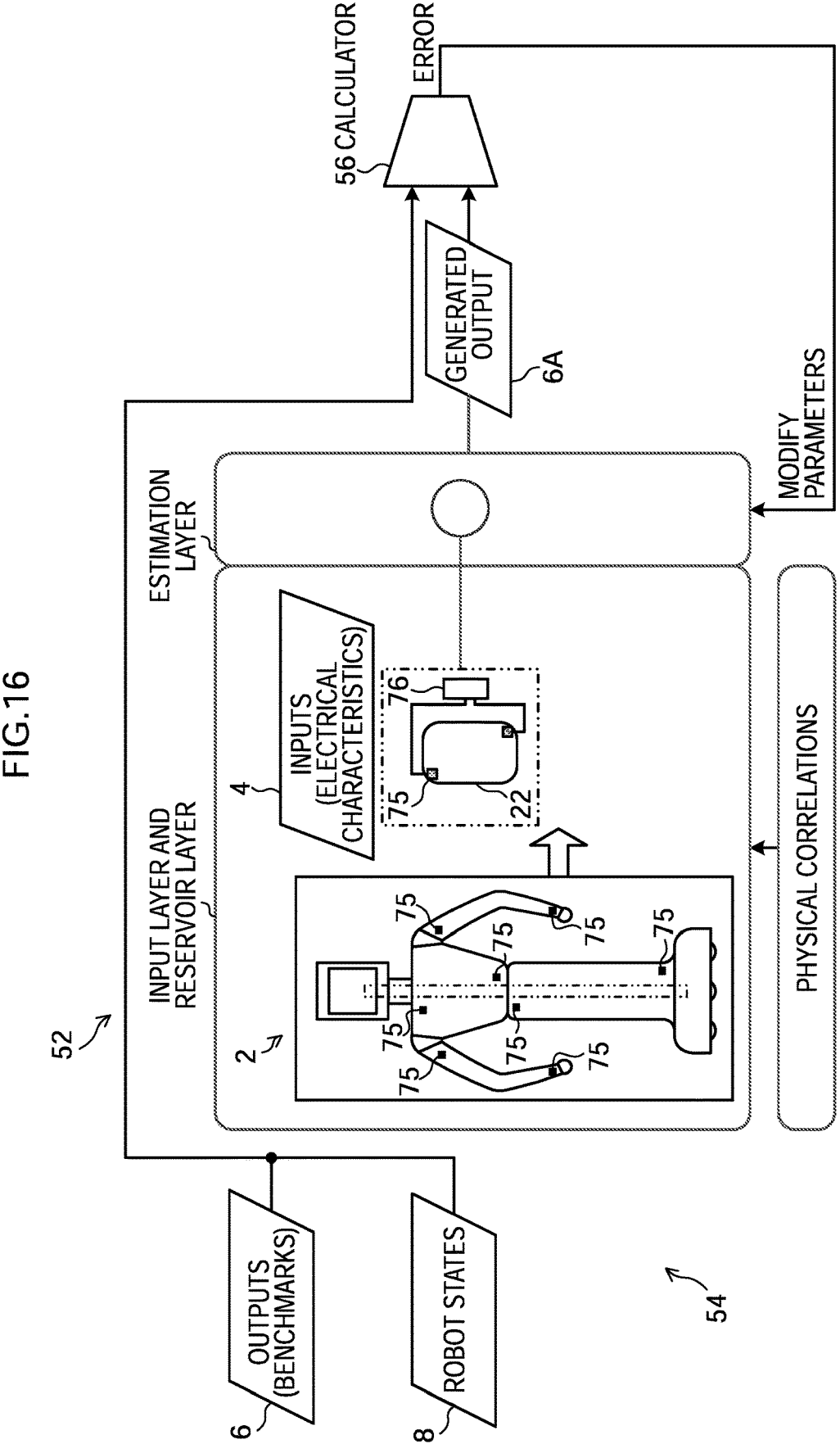
FIG. 16 is a diagram relating to learning processing at the learning processing unit according to the first exemplary embodiment.

FIG. 16 shows an example of the learning processing unit 52 treating the robot 2 with the conductive urethane 22 as a reservoir that stores data relating to state changes of the robot 2 with the conductive urethane 22 for training. The conductive urethane 22 has electrical characteristics (electrical resistance values) corresponding to each of numerous state changes. Thus, the conductive urethane 22 functions as an input layer that inputs electrical resistance values, and functions as a reservoir layer that stores data relating to state changes of the conductive urethane 22. Because the conductive urethane 22 outputs an electrical characteristic (the input data 4) that differs depending on the robot state 3 obtained after a state change, an estimation layer may estimate the robot state 3 after an applied state change from electrical resistance values of the conductive urethane 22. Therefore, it is sufficient for the learning processing to train the estimation layer.

The robot state estimation device 1 described above may be realized by, for example, a computer executing a program that describes the various functions described above.

FIG. 17 shows an example of the control device 250, which includes a computer serving as an execution device that executes processing to realize the various functions of the robot state estimation device 1.

The control device 250 that functions as the robot state estimation device 1 is equipped with a computer main body 100 shown in FIG. 17. The computer main body 100 is equipped with the CPU 102, RAM 104 of volatile memory or the like, ROM 106, auxiliary memory device 108 such as a hard disk drive (HDD) or the like, and input/output (I/O) interface 110. The CPU 102, RAM 104, ROM 106, auxiliary memory device 108 and input/output interface 110 are connected via the bus 112 to be capable of sending and receiving data and commands between one another. A communications interface 114 for communicating with external equipment is connected to the input/output interface 110. The communications interface 114 functions to acquire the input data 4 (electrical resistances) from the robot 2 including the conductive urethane 22. That is, the communications interface 114 is a detection unit and is capable of acquiring the input data 4 (electrical resistances) from the electrical characteristic detection unit 76 connected to the detection points 75 of the conductive urethane 22 disposed at the robot 2.

The control unit 115 that is a keyboard or the like, the display unit 211 that is a display or the like, the microphone 117 for voice message inputs, the speaker 118 for voice message outputs, and the driving unit 119 are connected to the input/output interface 110. The display unit 211 is disposed at the head portion 210 of the robot 2. The control unit 115, microphone 117 and speaker 118 are, for example, disposed in the interior (not shown in the drawings) of the trunk portion 220 of the robot 2. The driving unit 119 is disposed so as to drive to enable movements of parts (not shown in the drawings) in accordance with coupling of the skeleton 21 of the robot 2.

A control program 108P for causing the computer main body 100 to function as the robot state estimation device 1 that is an example of the estimation device of the present disclosure is memorized in the auxiliary memory device 108. The CPU 102 reads the control program 108P from the auxiliary memory device 108, loads the control program 108P into the RAM 104 and executes the processing. Hence, the computer main body 100 executing the control program 108P operates as the robot state estimation device 1 that is an example of the estimation device of the present disclosure.

A learning model 108M including the learning model 51 and data 108D including various kinds of data are also memorized in the auxiliary memory device 108. The control program 108P may be provided on a recording medium such as a CD-ROM or the like.

Now, the estimation processing at the robot state estimation device 1 that is executed by the computer is described.

Figure 18:
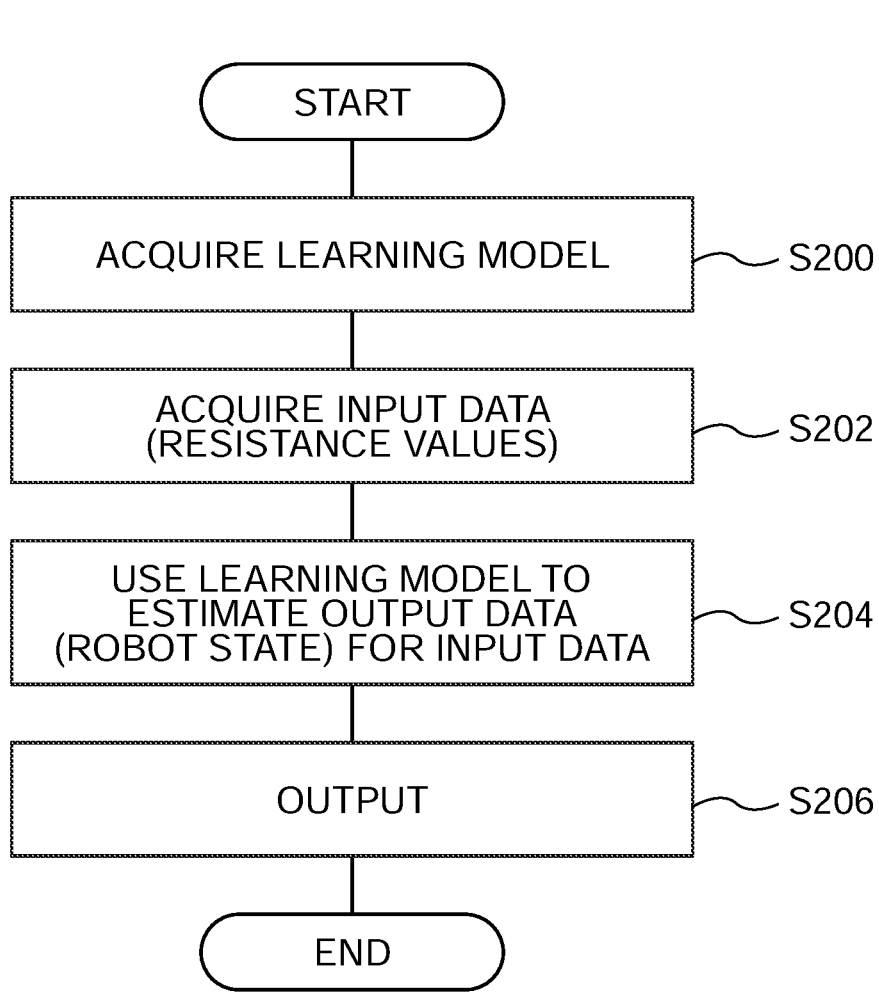
FIG. 18 is a flowchart showing an example of a flow of estimation processing according to the first exemplary embodiment.

FIG. 18 shows an example of a flow of the estimation processing at the computer main body 100 according to the executed control program 108P.

When a power supply of the computer main body 100 is turned on, the estimation processing shown in FIG. 18 is executed by the CPU 102. That is, the CPU 102 reads the control program 108P from the auxiliary memory device 108, loads the control program 108P into the RAM 104 and executes the processing.

In step S200, the CPU 102 acquires the learning model 51 by reading the learning model 51 from the learning model 108M of the auxiliary memory device 108 and loading the learning model 51 into the RAM 104. More specifically, the network model (see FIG. 14 and FIG. 16) that is a collection of inter-node connections according to weight parameters manifested as the learning model 51 is loaded into the RAM 104. Thus, the learning model 51 manifested by the combination of inter-node connections according to the weight parameters is built.

In step S202, the CPU 102 acquires an unknown set of the input data 4 (electrical resistances), which is a target for estimating a robot state after a state change applied to the conductive urethane 22, in a time series via the communications interface 114.

In step S204, the CPU 102 uses the learning model 51 acquired in step S200 to estimate the output data 6 (an unknown robot state) that corresponds to the input data 4 (the electrical resistances) acquired in step S202.

In step S206, the CPU 102 outputs the estimation result output data 6 (a robot state) via the communications interface 114, outputs data such that sound is emitted from the speaker 118, outputs data for display at the display unit 211, and ends this processing routine.

The estimation processing shown in FIG. 18 is an example of processing that is executed in the estimation method of the present disclosure.

As described above, according to the present disclosure, a robot state may be estimated from the input data 4 (electrical resistances) of the conductive urethane 22 that changes in accordance with changes of the robot state 3. That is, an unknown robot state may be estimated without using special equipment or large equipment and without directly measuring state changes of a flexible member. In concrete terms, a defect precursor state of a robot may be estimated by estimating a liquid adherence state as a robot state. Further, a defective state of a robot may be estimated by estimating a cracked state as a robot state. When a robot is estimated to be in a defect precursor state or a defective state, operations of the robot may be restricted and a warning may be outputted.

Because an electrical characteristic changes in accordance with robot states and characteristics of robot states are reflected by this electrical characteristic (time series electrical resistances), robot states may be estimated from the electrical resistance values of the conductive urethane 22 changing in time series. That is, even though the robot 2 can be in various robot states, a suitable robot state may be estimated by using the learning model described above.

With the robot state estimation device 1 according to the present exemplary embodiment, it is verified that by using the learning model 51 trained by the learning processing described above and inputting electrical characteristics of the conductive urethane 22, various robot states corresponding to the electrical characteristics may be estimated.

As described above, the present exemplary embodiment is described as employing the conductive urethane as an example of the flexible member. However, it is sufficient that the flexible member is a member with conductivity. It will be clear that the flexible member is not limited to conductive urethane.

The present exemplary embodiment is described as using the learning model 51 trained by the learning processing described above and estimating various robot states that correspond to electrical characteristics of the conductive urethane 22. This exemplary embodiment concentrates on the detection of adherence states in which a liquid adheres to the exterior portion 27 as robot states. The robot state estimation device 1 may employ a functional section that detects when an electrical characteristic time series exceeds a pre-specified liquid detection threshold as a liquid detection device that detects adherence of liquid at the robot 2.

Estimating liquid adherence states as robot states is described as an example, but this is not limiting. For example, dry states may be estimated as robot states. A dry state of the conductive urethane 22 is caused by an air leak at the robot and changes the electrical characteristic. Accordingly, a dry state may be estimated as a robot state. A defect precursor state of the robot may be estimated by estimating a dry state as a robot state.

Second Exemplary Embodiment

The meaning of the term "robot" as used in the present disclosure is intended to include a structure in which plural parts are coupled and at least one of the parts is movable. The meaning of the term "robot operation" is intended to include operations representing active modes (below referred to as active mode operations). The meaning of the term "active mode operations" is intended to include operations that represent active modes, such as postures of the robot expressed by at least one of the parts forming the structure, standing motions, movements and so forth. Examples of operations representing active modes include actions that represent static postures expressed by one or a combination of plural parts, and dynamic movements.

The meaning of the term "flexible material" as used in the present disclosure is intended to include a material that is deformable such that at least a portion is warped or the like by the application of an external force, and includes soft resilient bodies of rubber materials and the like, structures that contain fiber-form or mesh-form frameworks, and structures inside which numerous microscopic bubbles are dispersed. Examples of external forces include pressures. Examples of structures that contain fiber-form or mesh-form frameworks and of structures in which numerous microscopic bubbles are dispersed include polymer materials such as urethanes. The meaning of the term "flexible material with enhanced conductivity" is intended to include materials with conductivity, and includes materials in which a conductive material is added to a flexible material to enhance conductivity and materials in which a flexible material is conductive. A flexible material with enhanced conductivity features the function of an electrical characteristic changing in accordance with a deformation. Examples of a physical quantity that activates the function of an electrical characteristic changing in accordance with a deformation include a pressure value representing a stimulus caused by a pressure applied to the flexible material (below referred to as a pressure stimulus). Examples of a physical quantity representing an electrical characteristic that changes in accordance with a deformation of the flexible material include an electrical resistance value. Alternative examples include a voltage value and a current value. An electrical resistance value may be understood to be a volume resistance value of the flexible material.

Because a flexible material is provided with conductivity, the flexible material manifests an electrical characteristic in response to deformations caused by pressure. That is, in a flexible material with enhanced conductivity, electrical pathways are complexly connected and the electrical pathways contract or expand in accordance with deformations. The flexible material may exhibit a behavior in which an electrical pathway is temporarily cut and a behavior that causes a different connection from a previous state. Therefore, the flexible material exhibits behaviors with an electrical characteristic between positions separated by a predetermined distance (for example, positions of detection points at which electrodes are disposed) varying in accordance with the size, distribution or the like of applied forces (for example, pressure stimuli). Therefore, the electrical characteristic changes in response to the size, distribution or the like of forces (for example, pressure stimuli) applied to the flexible material.

The estimation device according to the present disclosure uses a trained learning model to estimate information relating to a robot operation from an electrical characteristic of a conductive flexible material provided at the robot. As training data, the learning model uses time series of the electrical characteristic when pressures are applied to the conductive flexible material and robot operation information representing robot operations that should be executed just after the pressures are applied to the flexible material. The learning model is trained so as to input a time series of the electrical characteristic and output robot operation information representing a robot operation that corresponds to that time series of the electrical characteristic.

In the descriptions below, a situation is described in which a sheet member serving as the conductive flexible material is disposed at an exterior portion of at least a portion of a robot. In this sheet member (below referred to as the conductive urethane), a conductive material is permeated into all or at least a portion of a urethane member. Values (pressure values) representing pressure stimuli applied to the robot, which is to say to the flexible material, are employed as the physical quantity that deforms the conductive urethane. A situation is described in which electrical resistance values of the conductive urethane are employed as the physical quantity that changes in accordance with pressure stimuli.

Figure 19:
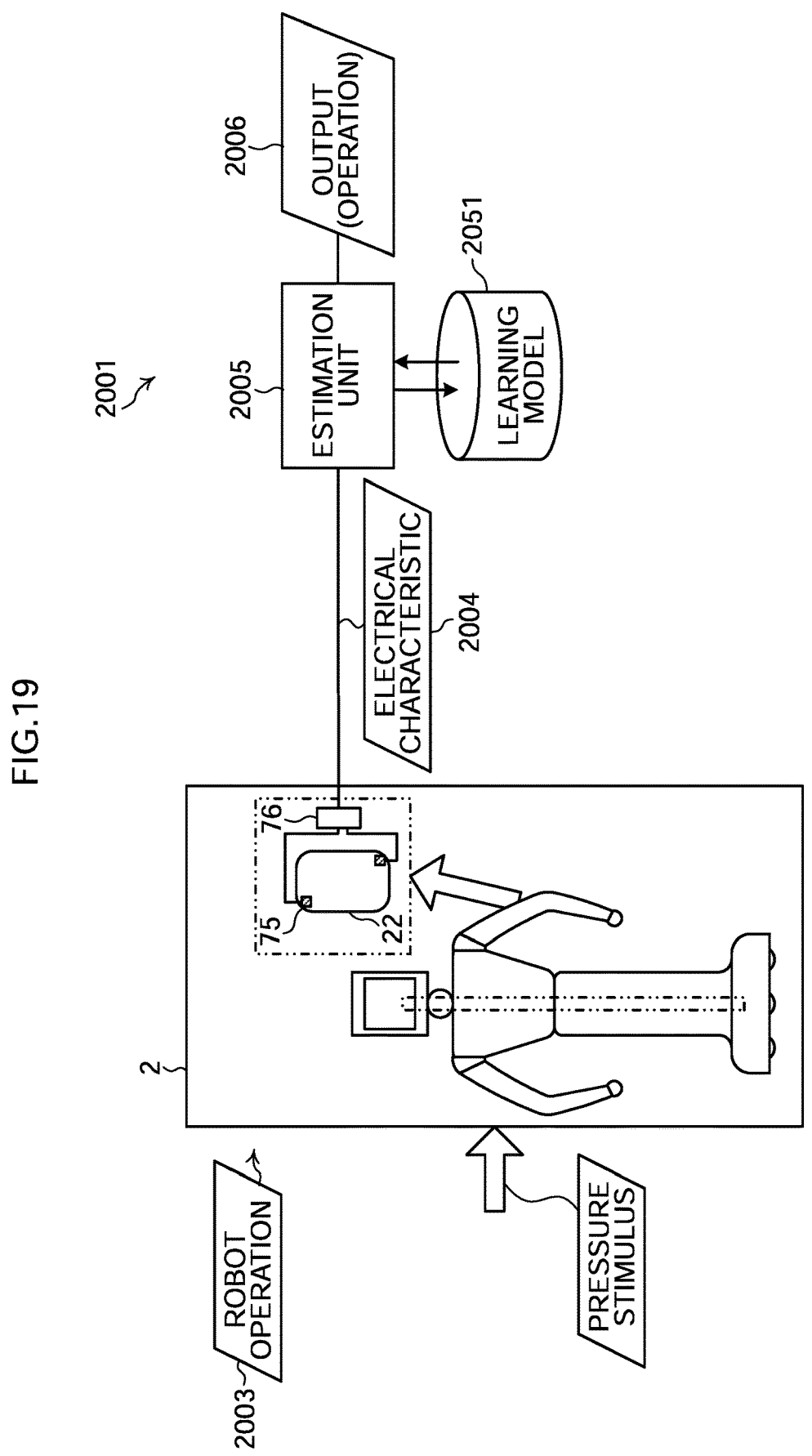
FIG. 19 is a diagram showing an example of structures of a robot operation estimation device according to a second exemplary embodiment.

FIG. 19 shows an example of structures of a robot operation estimation device 2000 that serves as the estimation device of the present disclosure.

Estimation processing at a robot operation estimation device 2001 uses a trained learning model 2051 to estimate, from an electrical characteristic of the conductive urethane 22 disposed at the robot 2, and output an operation that the robot should execute just after pressure is applied. Therefore, robot operation information representing a robot operation may be estimated without using special equipment or large equipment and without directly measuring a deformation of the exterior of the robot 2. The learning model 2051 is trained using robot operations (for example, values representing types of robot operation) as labels and using the electrical characteristic of the conductive urethane (that is, electrical resistance values of the conductive urethane disposed at the robot 2) in states in which pressure stimuli are applied just before the robot executes those robot operations as inputs. Training of the learning model 2051 is described below.

Now, structures of the robot 2 are described. FIG. 2 shows an example of the robot structures of the android robot 200 that is formed in a humanoid shape.

Figure 22:
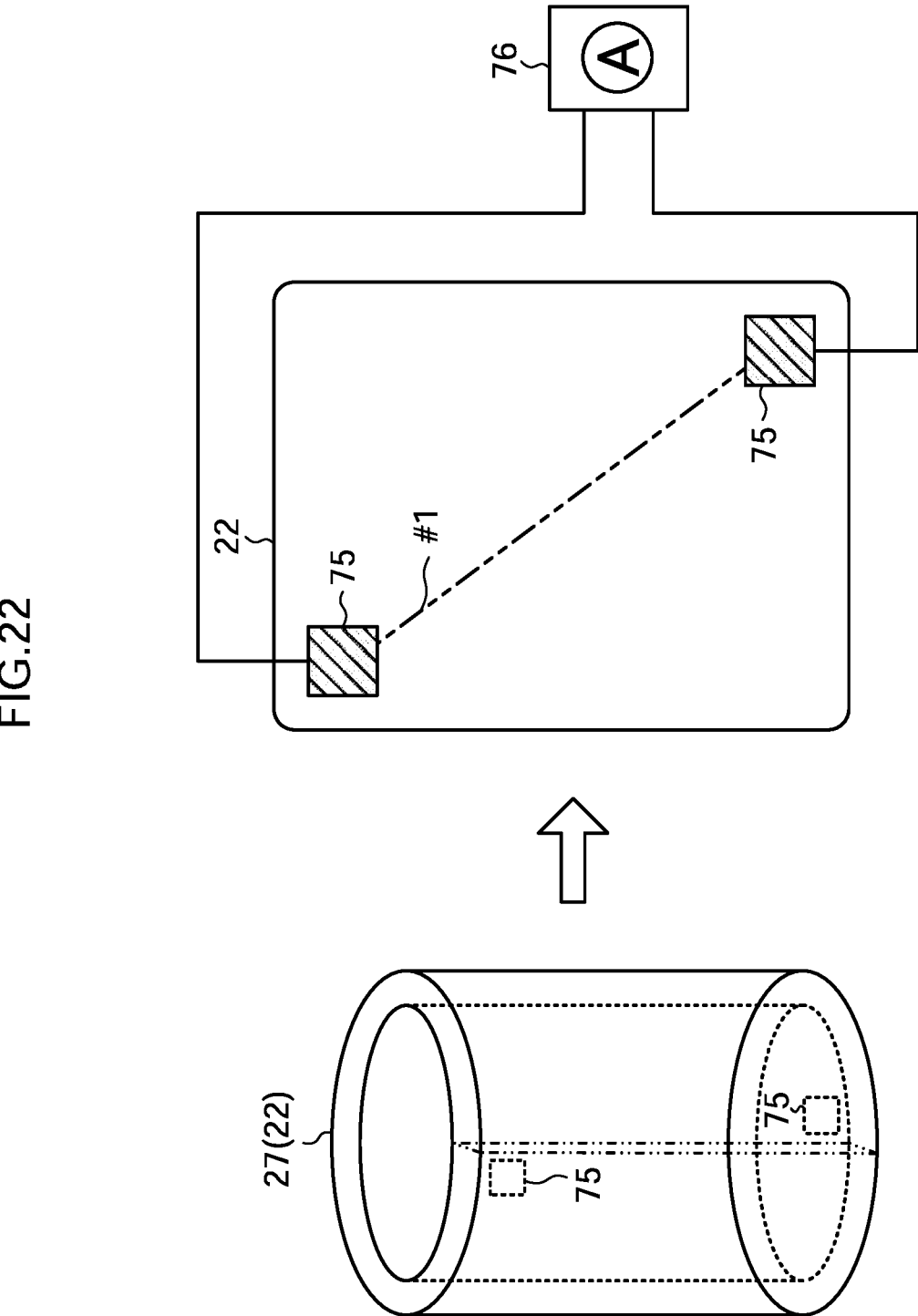
FIG. 22 is a diagram relating to detection points of a conductive member according to the second exemplary embodiment.

In the android robot 200 shown in FIG. 2, respective parts of the head portion 210, trunk portion 220, arm portions 230 (upper arms 232, forearms 234 and hands 236) and leg portions 240 (thighs 242, lower legs 244 and feet 246) are linked by the skeleton 21. In the android robot 200, the conductive urethane 22 is disposed around the skeleton 21. The conductive urethane 22 is disposed at an outer shell at the outer side of the robot 200. The conductive urethane 22 disposed at the robot 2 is connected to the electrical characteristic detection unit 76 (FIG. 22).

For example, as shown in the sectional diagram of an example of schematic structure of each upper arm 232 in FIG. 3, the inner layer 25 including structures such as an artificial muscle and the like is disposed around the skeleton 21 of the upper arm 232, and the exterior portion 27 that functions as a skin is disposed around the inner layer 25. The exterior portion 27 that functions as the skin may be disposed around the skeleton 21.

It is sufficient that the conductive urethane 22 is disposed at least at a portion of a material disposed around the skeleton 21, that is, the exterior portion 27. The conductive urethane 22 may be disposed inside and may be disposed outside the exterior portion 27 (FIG. 4). As a concrete example, the section A-A of the exterior portion 27 may be illustrated as the exterior section 27-1 in which the whole of the interior of the exterior portion 27 is constituted by the conductive urethane 22. As illustrated by the exterior section 27-2, the conductive urethane 22 may be formed at a portion of the outer side (surface side) of the exterior portion 27, and as illustrated by the exterior section 27-3, the conductive urethane 22 may be formed at the inner side (skeleton side) of the exterior portion 27. As illustrated by the exterior section 27-4, the conductive urethane 22 may be formed at a portion inside the exterior portion 27. As illustrated by the exterior section 27-5, the conductive urethane 22 may be disposed at the outer side of the material 27A with flexibility that constitutes the exterior portion 27, and as illustrated by the exterior section 27-6, the conductive urethane 22 may be disposed outside of the inner side (skeleton side) of the exterior portion 27. When the conductive urethane 22 is disposed outside of the material 27A constituting the exterior portion 27, the conductive urethane 22 and the material constituting the exterior portion 27 may simply be layered, or the conductive urethane 22 and the material constituting the exterior portion 27 may be integrated by adhesion or the like. Even when the conductive urethane 22 is disposed outside of the material constituting the exterior portion 27, because the conductive urethane 22 is a conductive urethane member, flexibility of the material constituting the exterior portion 27 is not impeded.

The conductive urethane 22 may be formed so as to have flexibility with predetermined stiffnesses. For example, as shown in FIG. 5, the conductive urethane 22 may be formed so as to have flexibility with the stiffness varying in accordance with depth. FIG. 5 is schematic diagrams relating to stiffnesses of the exterior portion of the robot: schematic diagrams relating to structures of the conductive urethane 22 are shown at the left side of the drawing and schematic diagrams relating to depth and stiffness of the conductive urethane 22 are shown at the right side of the drawing. In the examples shown in FIG. 5, if the exterior portion 27 illustrated as the exterior section 27-7 is structured with the conductive urethane 22, the conductive urethane 22 may be formed such that that the stiffness progressively increases from the outer side (surface side) of the exterior portion 27 toward the inner side (skeleton side), that is, as the depth increases. As illustrated by the exterior section 27-8, plural conductive urethanes 22 with different thicknesses may be arranged (stiffnesses: $22X<22Y<22Z$). With a structure such that the stiffness (flexibility) of the exterior portion 27 including the conductive urethane 22 varies in accordance with depth, a touch sensation similar to skin areas of the human body may be provided.

Figure 20:
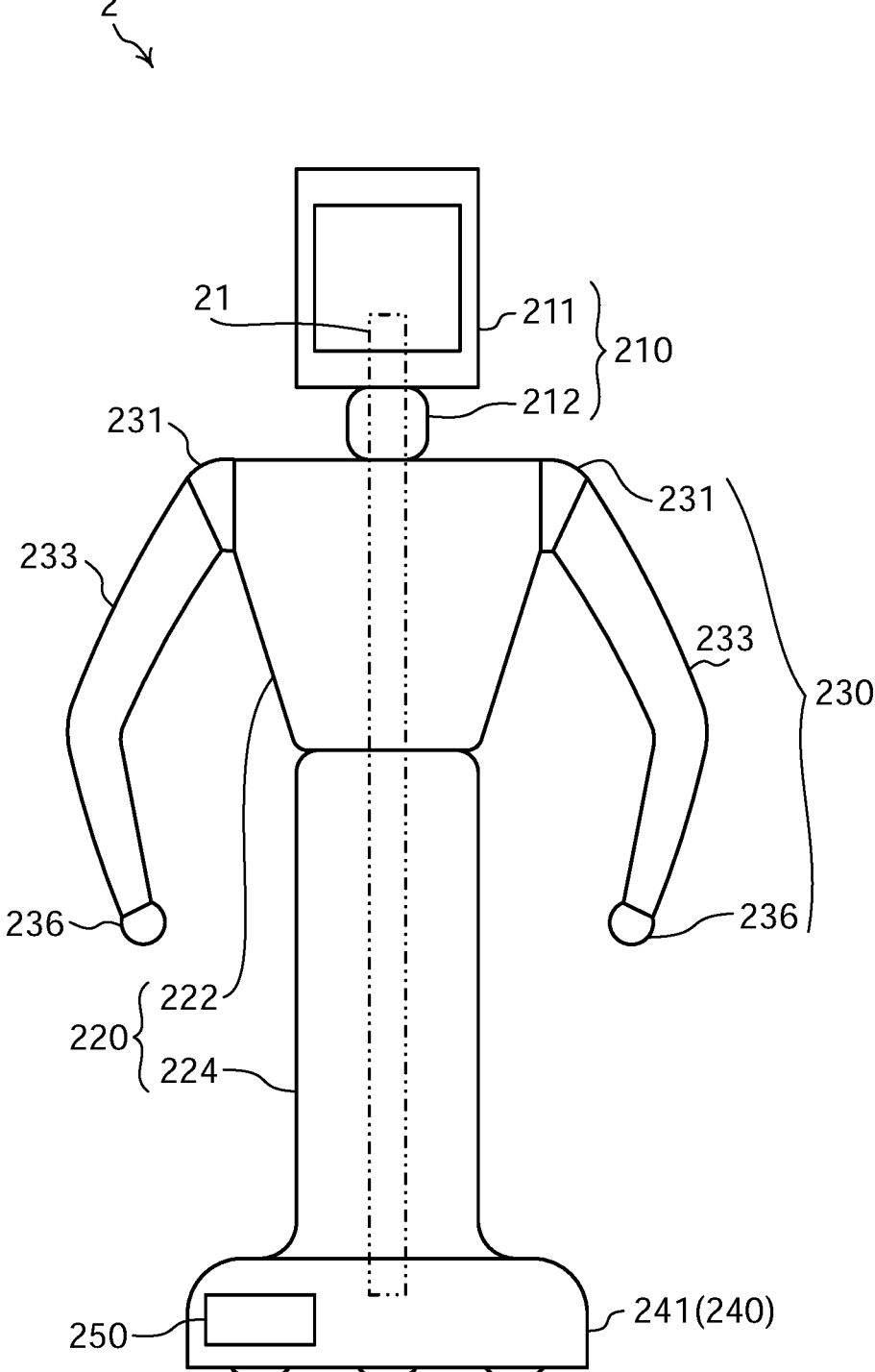
FIG. 20 is a diagram relating to a robot according to the second exemplary embodiment.

In order to simplify descriptions below, descriptions are given in which, as an example of the robot of the present disclosure, an autonomous robot system including a robot with the simplified shape shown in FIG. 20 is employed as the robot 2. The conductive urethane 22 is disposed around the skeleton 21 to serve as an outer shell, which is the outer side of the robot 2, to form exterior portions of the robot 2.

As shown in FIG. 20, the head portion 210 of the robot 2 is structured with the display unit 211 and neck portion 212, and the trunk portion 220 is structured with the upper trunk 222 and lower trunk 224. Each arm portion 230 of the robot 2 is structured with a shoulder portion 231, a limb portion 233 and a hand 236, and the leg portion 240 is structured with a base portion 241 equipped with a movement mechanism that is not shown in the drawings. The head portion 210, trunk portion 220, arm portions 230 and leg portion 240 are linked by the skeleton 21.

The limb portion 233 of each arm portion 230 is formed to be inflectable with the shoulder portion 231 as a pivot. In a structure in which the limb portion 233 of the arm portion 230 is formed to be inflectable, a member containing a resilient body that deforms linearly or nonlinearly may be employed. A resilient contraction body that produces a contraction force in a predetermined direction in response to an applied physical quantity (for example, a voltage, a supply of liquid or the like) can be mentioned as an example. As an example of a resilient contraction body, an airbag-type member of a publicly known type may be employed (for example, see Japanese Patent Application Publication No. S52-40378). An airbag-type resilient contraction body (for example, a rubber actuator) includes a main body in which an outer periphery of a tubular body structured of a soft resilient material, such as a rubber member or the like, is covered by a woven reinforcing structure of organic or inorganic polymer fibers, for example, aromatic polyamide fibers. Openings at both ends of the main body are sealed off by enclosing members. The rubber actuator deforms by expansion when a pressurized fluid is supplied to an internal cavity via a connection aperture provided in the enclosing members, producing a contracting force along the axial direction. Thus, this rubber actuator is changed in length by the expansion deformation. Note, however, that the rubber actuator is merely an example of an applicable target of the estimation device of the present disclosure; the estimation device is also applicable to members other than rubber actuators.

Figure 21:
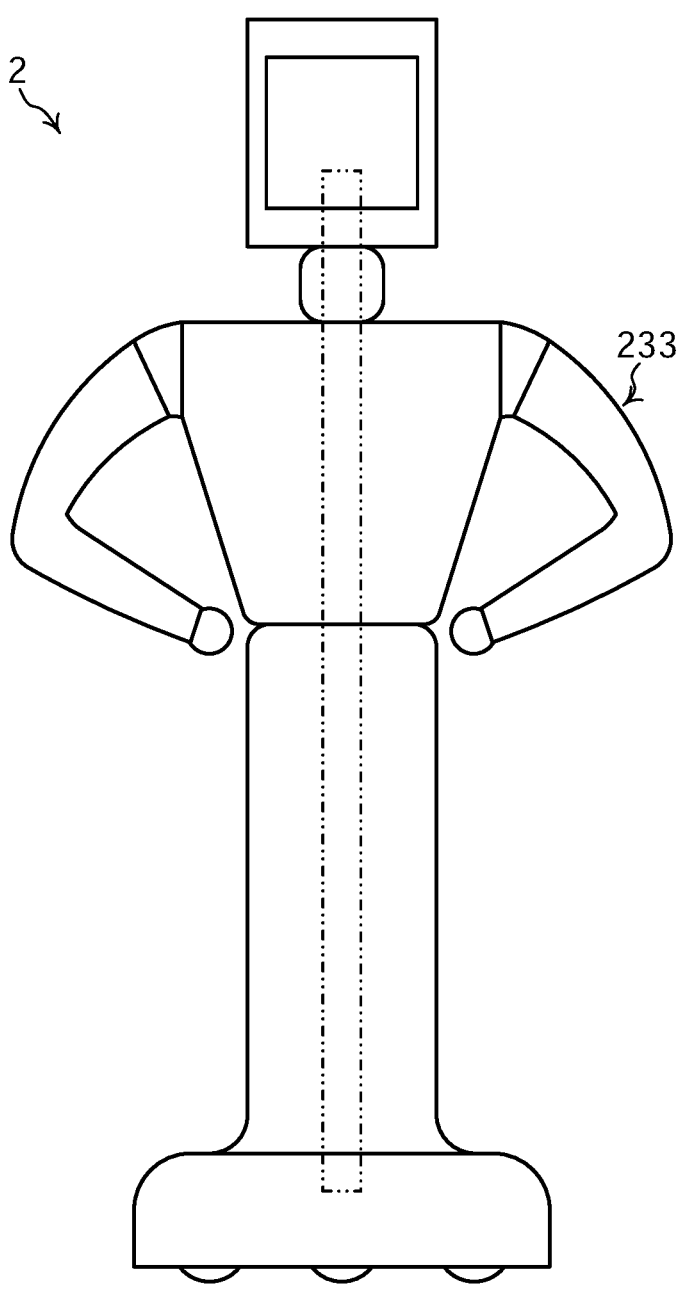
FIG. 21 is a diagram relating to the robot according to the second exemplary embodiment.

As illustrated in FIG. 21, the limb portion 233 of the robot 2 is inflected by driving of a resilient contraction member that is not shown in the drawing. A human arm may be imitated by operations of the limb portion 233.

Because the robot 2 is equipped with the unillustrated movement mechanism at the base portion 241, the robot 2 is movable. A control device 250 that controls the robot 2 is provided at the base portion 241 (FIG. 17). The control device 250 includes functional units that operate as the robot operation estimation device 2001.

The robot 2 is equipped with the control unit 115, display unit 211, microphone 117 and speaker 118 (FIG. 17). Thus, commands from users, states of users, information on responses to users and the like may be acquired and supplied.

The robot 2 is equipped with the driving unit 119 (FIG. 17) for moving parts in accordance with the coupling of the skeleton 21 at portions other than the leg portion 240 including the base portion 241. By driving of the driving unit 119 (FIG. 17) moving respective parts or moving plural coupled parts, the robot 2 may maintain various postures and conduct various actions. The driving unit 119 performs control such that a robot operation estimated by the robot operation estimation device 2001 is carried out. Thus, the robot 2 operates as an autonomous robot system.

To estimate a robot operation, the robot state estimation device 2001 detects an electrical characteristic of the conductive urethane 22 disposed at the robot 2.

As shown in FIG. 22, the electrical characteristic of the conductive urethane 22 (that is, volume resistance values, which are electrical resistance values) may be detected from signals from the plural (two in FIG. 22) detection points 75 that are disposed a distance apart. FIG. 22 illustrates a situation in which the conductive urethane 22 that is disposed as a portion of the exterior portion 27 is unfolded flat. FIG. 22 shows a detection set #1 that detects electrical resistance values from signals from the plural detection points 75, which are distanced apart and disposed at opposite corners of the conductive urethane 22. Arrangements of the plural detection points 75 are not limited to the positions shown in FIG. 22 but may be any positions provided those positions enable detection of the electrical characteristic of the conductive urethane 22. It is sufficient that the electrical characteristic detection unit 76 that detects the electrical characteristic of the conductive urethane 22 (that is, volume resistance values that are electrical resistance values) is connected to and uses outputs from the detection points 75.

The electrical resistance values detected at the robot 2 that is equipped with the conductive urethane 22 at the exterior portion 27 change from before to after a deformation of the conductive urethane 22 caused by a deformation when a pressure stimulus is applied to the exterior portion 27 of the robot 2 or the like. Therefore, urging of the robot 2 by one or more of a person or object may be detected by detecting electrical resistance values in a time series, that is, detecting a change in electrical resistance values from a state in which no pressure stimulus is applied to the robot 2 (for example, detecting an electrical resistance value that exceeds a prespecified threshold). More specifically, an urged state representing urging of the robot 2 by one or more of a person or object accompanies a pressure stimulus when the one or more of a person or object touches the robot 2. Therefore, urged states include touch states. Thus, because the conductive urethane 22 is disposed at the robot 2, urging of the robot 2 by one or more of a person or object, including touching, may be detected. The electrical resistance value changes if any one of a position, distribution and size of a pressure stimulus applied to the robot 2 changes. Therefore, detecting urged states of the robot 2 by one or more of a person or object, including touch positions, from electrical resistance values changing in time series is conceivable. In the descriptions below, the one or more of a person or object is not distinguished but collectively referred to as a body, conceptually encompassing people and things. More specifically, one of either of people and objects and combinations of people and objects are referred to as a body.

The exterior portion 27 including the conductive urethane 22 formed at the robot 2 may be formed as an integrated structure in which the exterior portion 27 including the conductive urethane 22 is formed at the outer side of the robot 2, and the exterior portion 27 including the conductive urethane 22 may be formed separately at respective parts.

To improve a detection accuracy of the electrical characteristic at a single conductive urethane 22, a greater number of detection points than the (two) detection points shown in FIG. 22 may be used.

As examples, one row or a plural number of rows in which plural conductive urethane pieces at which the respective detection points are disposed may be arrayed to form the conductive urethane 22, and the electrical characteristic may be detected from each of the plural conductive urethane pieces. For example, the conductive urethane pieces 23 (FIG. 9) may be arrayed to form the conductive urethane 22 (FIG. 10 and FIG. 11). The example shown in FIG. 9 illustrates a first detection set #1 and a second detection set #2. The first detection set #1 detects an electrical resistance value according to signals from the detection points 75A that are distanced apart and disposed at opposite corner positions. The second detection set #2 detects an electrical resistance value according to signals from the detection points 75B that are distanced apart and disposed at the other opposite corner positions. In the example shown in FIG. 10, the conductive urethane pieces 23 (FIG. 9) are arrayed (4×1) in a length direction of the exterior portion 27 to form the conductive urethane 22, and the conductive urethane pieces 23, in sequence, constitute a first detection set #1 to an eighth detection set #8. In the example shown in FIG. 11 the first detection set #1 of each conductive urethane piece 23 (FIG. 9) is employed, and the conductive urethane pieces 23 are arrayed (4×2) in the length direction and a width direction of the exterior portion 27 to form the conductive urethane 22 and constitute a first detection set #1 to an eighth detection set #8.

As an alternative example, a detection range of the conductive urethane 22 may be segmented, detection points may be provided at each segmented detection range, and the electrical characteristic may be detected for each detection range. For example, specifying regions corresponding to the size of the conductive urethane pieces 23 shown in FIG. 10 and FIG. 11 as detection ranges, disposing detection points at each of the specified detection ranges, and detecting the electrical characteristic in each detection range is applicable.

As shown in FIG. 19, the robot operation estimation device 2001 is equipped with an estimation unit 2005. The estimation unit 2005 inputs time series input data 2004 representing sizes of electrical resistance (electrical resistance values) of the conductive urethane 22. The input data 2004 corresponds to a pressure stimulus applied just before a robot operation 2003 of the robot 2. As an estimation result, the estimation unit 2005 outputs output data 2006 representing robot operation information that represents the robot operation 2003. The estimation unit 2005 includes the trained learning model 2051.

The learning model 2051 is a model that has been trained to compute the robot operation 2003 to be executed just after a pressure stimulus is applied, which is to say a type of robot operation of the robot 2 (the output data 2006), from electrical resistances (the input data 2004) of the conductive urethane 22 that are changed by the pressure stimulus. The learning model 2051 is, for example, a model that defines a trained neural network, which is manifested as a collection of information of weights (strengths) of connections between nodes (neurons) structuring the neural network.

Figure 23:
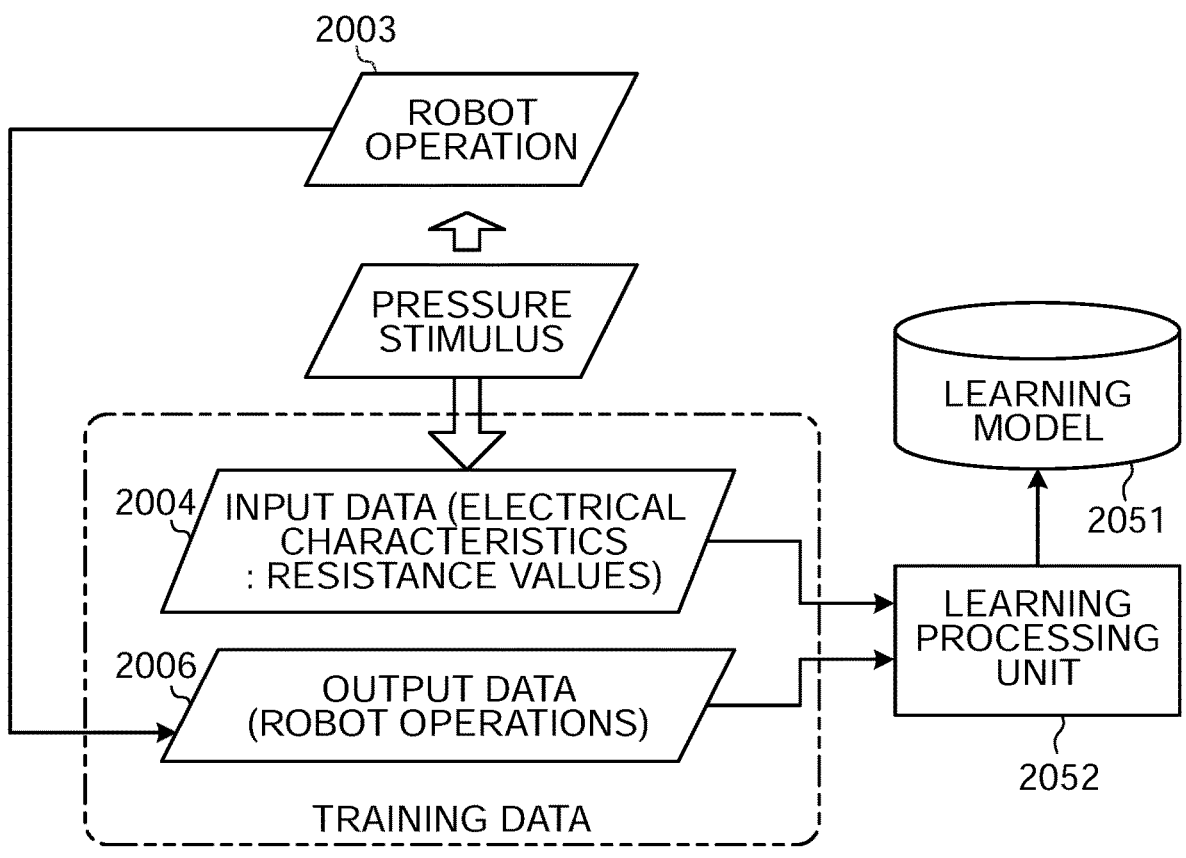
FIG. 23 is a diagram relating to learning processing according to the second exemplary embodiment.

The learning model 2051 is generated by learning processing at a learning processing unit 2052 (FIG. 23). The learning processing unit 2052 uses electrical characteristics of the conductive urethane 22 (the input data 2004) that change with pressure stimuli to conduct the learning processing. That is, the learning processing unit 2052 uses the robot operations 2003 as labels and large amounts of data of time series measurements of electrical resistances of the conductive urethane 22 as training data. More specifically, the training data includes a large amount of sets of input data including electrical resistance values (the input data 2004) and robot operation information (the output data 2006) representing the robot operations 2003 corresponding to the input data. The learning processing unit 2052 associates time series information by assigning information representing a measurement time to each electrical resistance value of the conductive urethane 22 (the input data 2004). This time series information may be associated by assigning information representing measurement times to sets of time series electrical resistance values of the conductive urethane 22 in periods defined as just before the robot operations 2003.

Now the learning processing unit 2052 is described.

In the learning processing conducted by the learning processing unit 2052, the exterior portion 27 of the robot 2 at which the conductive urethane 22 is disposed as described above is employed as a detection unit, and types of the robot operations 2003 and electrical resistance values from the conductive urethane 22 (the input data 2004) are used as training data.

For example, data corresponding to types of robot operations is used as training data. In concrete terms, a user OP is instructed to apply a pressure stimulus in which energy of a pressure or the like is applied to the robot 2 just before a robot operation of a predetermined type. Electrical resistance values at this time are detected and associated with the type of robot operation, and are used as training data. The exterior portion 27 of the robot 2 is deformed by the applied energy of a pressure or the like and electrical resistance values of the conductive urethane 22 change. A time series of electrical resistance values may be detected and associated with the type of robot operation, and may be used as training data.

Data corresponding to types of robot operation is used as training data. More specifically, the user OP is instructed to apply a predetermined pressure stimulus that is to apply energy of a pressure or the like to the robot 2 just before a robot operation of a predetermined type. Electrical resistance values at this time are detected and associated with the type of robot operation, and are used as training data. The exterior portion 27 of the robot 2 is deformed by the applied energy of a pressure or the like and electrical resistance values of the conductive urethane 22 change. A time series of electrical resistance values may be detected and associated with the type of robot operation, and may be used as training data. Robot operations may include operations of the robot acting on a body. The robot 2 may be a robot that aids rehabilitation of bodies or may function as a nursing care robot that conducts nursing care of bodies, or the like.

Figure 24:
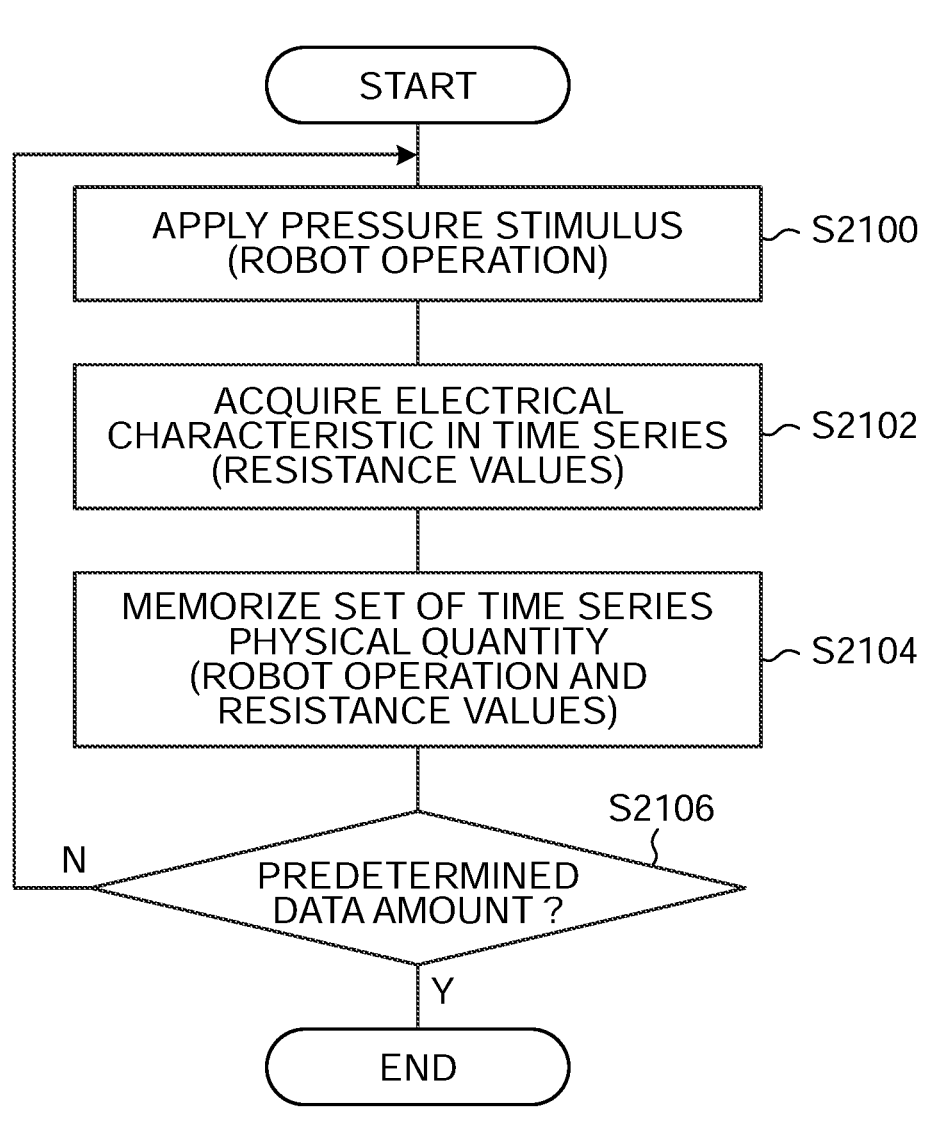
FIG. 24 is a flowchart showing an example of training data collection processing according to the second exemplary embodiment.

The learning processing unit 2052 may be structured with a computer including a CPU, which is not shown in the drawings. The learning processing unit 2052 executes training data collection processing and the learning processing. FIG. 24 shows an example of the training data collection processing executed by the unillustrated CPU. In step S2100, the learning processing unit 2052 gives an instruction to apply a pressure stimulus that is to be applied to the robot 2 just before a predetermined robot operation. In step S2102, the learning processing unit 2052 acquires a time series of electrical resistance values of the conductive urethane 22 that change in accordance with the pressure stimulus. In step S2104, the learning processing unit 2052 assigns robot operation information representing a type of the robot operation 2003 to the acquired time series of electrical resistance values as a label and memorizes the same. The learning processing unit 2052 repeats the processing described above until a pre-specified number of sets of robot operation information and electrical resistance values of the conductive urethane 22 is reached or until a pre-specified time has passed (results of the determination in step S106 are negative until the result is affirmative). Thus, the learning processing unit 2052 may acquire and memorize electrical resistance values of the conductive urethane 22 in time series for each type of the robot operations 2003. The learning processing unit 2052 uses the memorized sets of respective types of robot operation and electrical resistance values of the conductive urethane 22 as the training data.

Now, when the robot 2 is urged in association with a pressure stimulus of a body touching the robot 2 or the like, an electrical characteristic (the electrical resistance values) changes to increase with larger urging forces (pushing forces) from an urged state in which the body touches the exterior portion 27. Therefore, at least an urged state in which a body touches the exterior portion 27 may be detected by detecting that an electrical characteristic time series exceeds a pre-specified threshold for touch detection. Accordingly, providing at least robot operations corresponding to urged states in which bodies touch the exterior portion 27 are estimated, using electrical characteristic time series corresponding to urging forces (pushing forces) that identify touching urged states as the training data is applicable.

Figure 29:
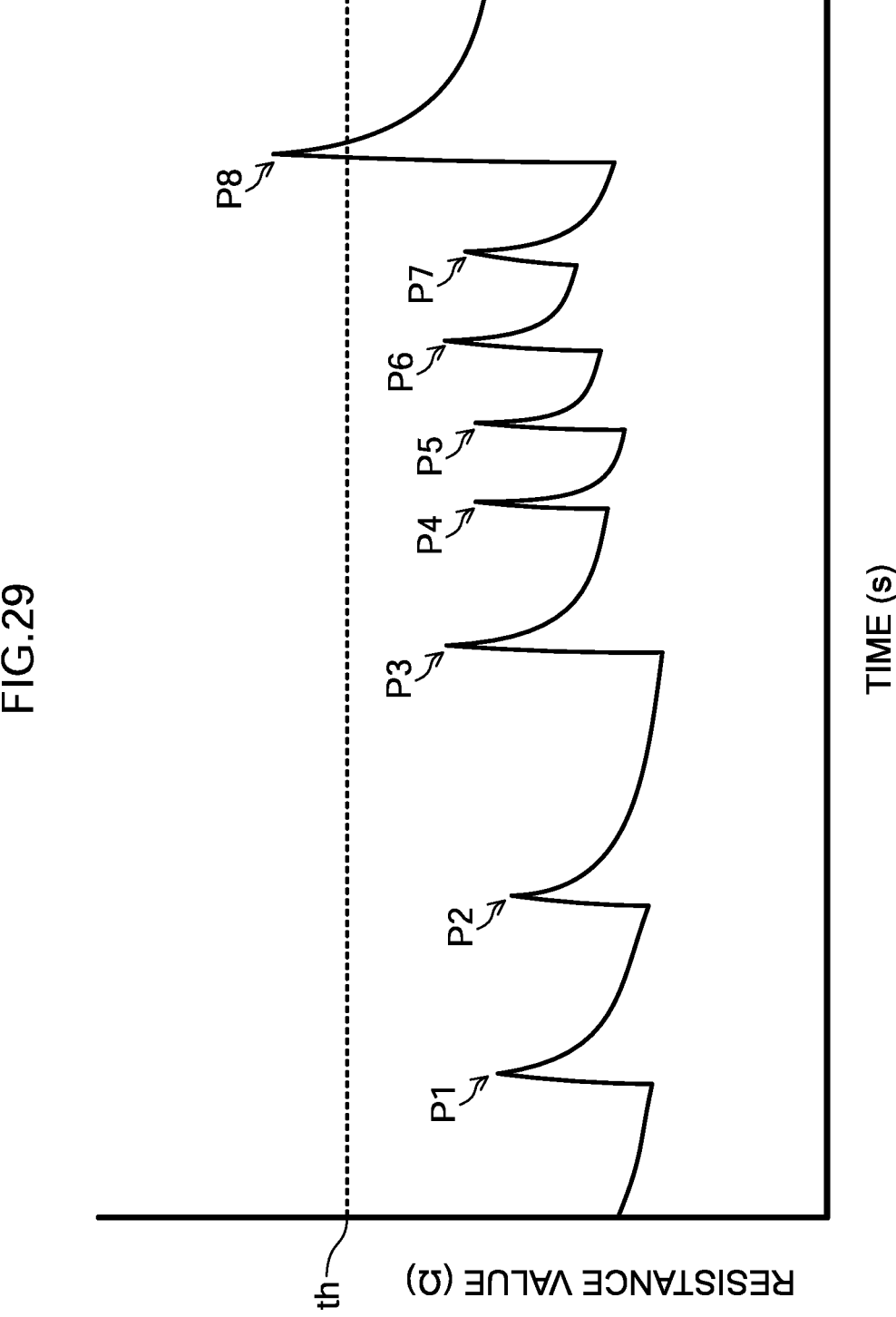
FIG. 29 is a diagram showing a characteristic relating to a robot according to the exemplary embodiment.

FIG. 29 shows an example of an electrical characteristic of the limb portion 233 of the robot 2. FIG. 29 depicts an electrical characteristic of the conductive urethane 22 when the limb portion 233 of the robot 2 is pushed by a hand of a user with various urging forces (pushing forces with peak values P1 to P8). The peak values P1 to P7 are pressure stimuli that do not attain the level of touching by a body, and the peak value P8 is a pressure stimulus for when a body touches the limb portion 233.

As shown in FIG. 29, each of the electrical characteristic time series of the conductive urethane 22 (the electrical characteristic before, after and including the respective peak values P1 to P8) is a characteristic pattern of a pressure stimulus when the limb portion 233 is touched and urged in accordance with an urging force (pushing force) from a user. That is, a pattern in which the electrical resistance value rises sharply when the limb portion 233 is pushed by the hand of the user and the electrical resistance value falls steadily when the pressure is released (the hand of the user moves away) is manifested as a characteristic pattern. In the example shown in FIG. 29, the peak value P8 produces a larger electrical resistance value than the peak values P1 to P7. Therefore, urged states in which bodies touch the exterior portion 27 may be detected by setting an electrical resistance value exceeding the peak values P1 to P7 as a threshold th. Thus, the learning processing unit 2052 learns by using electrical characteristic time series corresponding to urging forces (pushing forces) that identify touching urged states just before a robot operation as training data.

Pressure stimuli that are not limited to touch detection may be identified by physical quantities such as positions of parts of the robot 2, relative positional relationships of plural parts, distributions, sizes and frequencies of pressure stimuli of the parts, and so forth. Therefore, electrical characteristic time series of the conductive urethane 22 are encompassed by the feature of a time series physical quantity that represents pressure stimuli. In the present exemplary embodiment, because the conductive urethane 22 is utilized, an electrical characteristic (volume resistance) reflecting these physical quantities may be detected in time series.

When a pressure stimulus to be applied just before a robot operation is applied to the exterior portion 27 of the robot 2, the electrical characteristic (electrical resistance value) changes to increase. Therefore, the pressure stimulus may be detected by detecting the electrical characteristic time series. Thus, using electrical characteristic time series corresponding to types of robot operation as the training data is applicable.

Now, an example of the training data described above is shown in tables. Table 2 is an example in which data associating time series electrical resistance value data (r) with types of robot operation is used as training data relating to the types of robot operation. Table 3 is an example in which data associating time series electrical resistance value data (R) with types of robot operation is used as training data relating to types of robot operation that act on a person.

TABLE 2

| Time series electrical resistance value data | Type of robot operation |
| --- | --- |
| r11, r12, r13, . . . r1n | Power on/off |
| r21, r22, r23, . . . r2n | Stop operation |
| r31, r32, r23, . . . r3n | Reduce speed of operation |
| . . . | . . . |

TABLE 3

| Time series electrical resistance value data | Type of robot operation |
| --- | --- |
| R11, R12, R13, . . . R1n | Embrace |
| R21, R22, R23, . . . R2n | Stroke |
| R31, R32, R23, . . . R3n | Pat |
| . . . | . . . |

Now, the learning processing at the learning processing unit 2052 is described. FIG. 24 is a diagram showing functions of the unillustrated CPU of the learning processing unit 2052 in the learning processing.

The unillustrated CPU of the learning processing unit 2052 includes the generator 54 and the calculator 56 as functional sections. A generator 2054 features a function of generating outputs in consideration of inputs that are before-and-after relationships of electrical resistance values acquired in time series.

As training data, the learning processing unit 2052 retains numerous sets of the input data 2004 described above (electrical resistance values) and the output data 2006 that is robot operation information representing types of the robot operations 2003 corresponding to the input data 2004 (electrical resistance values).

The generator 2054 includes an input layer 2540, intermediate layers 2542 and an output layer 2544, constituting a publicly known neural network (NN). Because a neural network is a publicly known technology, detailed descriptions are not given here. However, the intermediate layers 2542 include numerous node groups (neuron groups) with inter-node connections and feedback connections. Data is inputted from the input layer 2540 to the intermediate layers 2542 and data of computation results from the intermediate layers 2542 is outputted to the output layer 2544.

The generator 2054 is a neural network that generates generated output data 2006A representing robot operation information from the inputted input data 2004 (electrical resistances). The generated output data 2006A is data in which robot operation information is estimated from the input data 2004 (electrical resistances). The generator 2054 generates generated output data representing robot operation information from the input data 2004 (electrical resistances) inputted in a time series. By learning using numerous sets of the input data 2004 (electrical resistances), the generator 2054 becomes capable of generating the generated output data 2006A to be close to a type of robot operation that should be executed just after a pressure stimulus is applied to the robot 2, that is, the conductive urethane 22. From another perspective, the electrical characteristics that are the input data 2004 inputted in time series may be understood as patterns. By learning these patterns, the generator 2054 becomes capable of generating the generated output data 2006A close to a type of robot operation that should be executed just after a pressure stimulus is applied to the robot 2, which is to say the conductive urethane 22.

The calculator 56 compares the generated output data 2006A with the output data 2006 of the training data, and calculates an error in the comparison results. The learning processing unit 2052 inputs the generated output data 2006A and the output data 2006 of the training data to a calculator 2056. In response, the calculator 2056 calculates an error between the generated output data 2006A and the output data 2006 of the training data, and outputs signals representing the calculation results.

On the basis of the error calculated by the calculator 2056, the learning processing unit 2052 tunes weight parameters of the inter-node connections to train the generator 2054. More specifically, weight parameters of inter-node connections between the input layer 2540 and the intermediate layers 2542 of the generator 54, weight parameters of inter-node connections in the intermediate layers 2542, and weight parameters of inter-node connections between the intermediate layers 2542 and the output layer 2544 are respectively fed back to the generator 2054 using a technique such as, for example, gradient descent, error back propagation or the like. Thus, connections between all the nodes are optimized so as to minimize differences between the generated output data 2006A and the training data output data 2006, using the output data 2006 of training data as benchmarks.

The learning model 2051 is generated by the learning processing of the learning processing unit 2052. The learning model 2051 is manifested by the learning processing unit 2052 as a collection of information of weight parameters (weights or strengths) of inter-node connections of training results.

FIG. 26 shows an example of flow of the learning processing. In step S2110, the learning processing unit 2052 acquires the input data 2004 (electrical resistances) labeled with information representing types of robot operation, which is the training data of results measured in time series. In step S2112, the learning processing unit 2052 uses the training data of results measured in time series to generate the learning model 2051. That is, the learning processing unit 2052 obtains a collection of information of weight parameters (weights or strengths) of inter-node connections of the training results that is trained using the numerous sets of training data as described above. In step S2114, the learning processing unit 2052 memorizes data manifested as the collection of information of weight parameters (weights or strengths) of inter-node connections of the training results to serve as the learning model 2051.

The generator 2054 may also use a recurrent neural network with a function that generates outputs with consideration to before-and-after relationships of the time series inputs, or may use an alternative method.

In the robot operation estimation device 2001 described above, the trained generator 2054 (that is, the data manifested as a collection of information of weight parameters of inter-node connections of training results) generated by the method of which an example is illustrated above is used as the learning model 2051. When the learning model 2051 that is used is sufficiently trained, identifying types of robot operation from time series electrical resistance values of the conductive urethane 22 disposed at the robot 2, which is to say the exterior portion 27, is conceivable.

The processing carried out by the learning processing unit 2052 is an example of processing of a learning model generation device of the present disclosure. The robot operation estimation device 2001 is an example of the estimation unit and the estimation device of the present disclosure. The output data 2006 that is information representing the types of robot operations 2003 is an example of robot operation information of the present disclosure.

As described above, in the conductive urethane 22 electrical pathways are complexly connected as described above. The conductive urethane 22 exhibits behaviors such as contractions and extensions of the electrical pathways, temporary cut-offs and new connections in accordance with deformations, and consequently exhibits behaviors with electrical characteristics that differ depending on applied forces (for example, pressure stimuli). This means the conductive urethane 22 may be treated as a reservoir storing data relating to deformations of the conductive urethane 22. That is, the robot operation estimation device 2001 may employ the conductive urethane 22 in a neural network (below referred to as a PRCN) known as physical reservoir computing (PRC). Because PRC and a PRCN are publicly known technologies, detailed descriptions are not given here. That is, PRC and a PRCN are excellently applicable to estimation of information relating to deformations of the conductive urethane 22.

Figure 27:
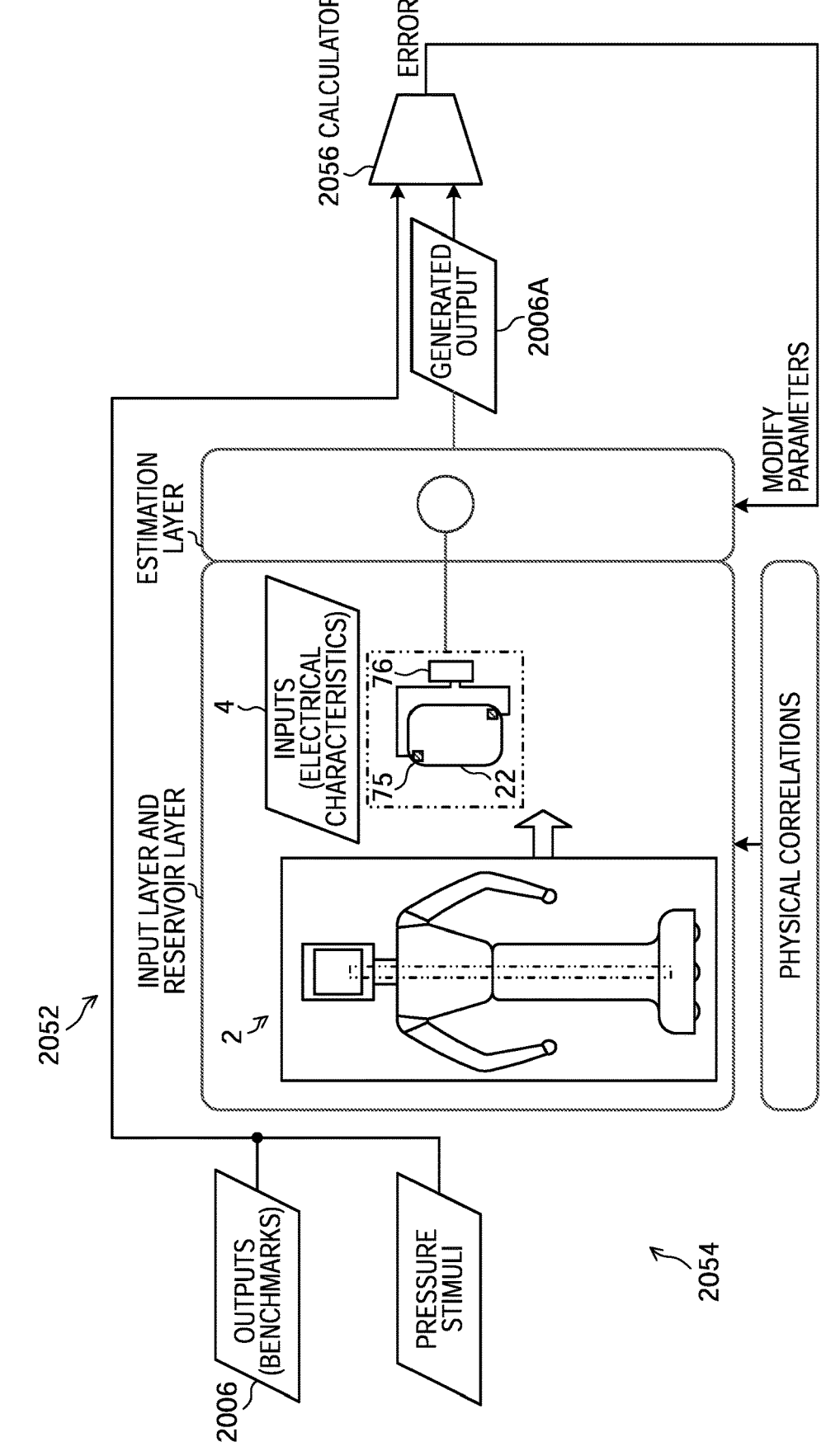
FIG. 27 is a diagram relating to learning processing at the learning processing unit according to the second exemplary embodiment.

FIG. 27 shows an example of the learning processing unit 2052 treating the robot 2 including the conductive urethane 22 as a reservoir that stores data relating to deformations of the robot 2 including the conductive urethane 22 for training. The conductive urethane 22 has an electrical characteristic (electrical resistance values) corresponding to each of numerous pressure stimuli. Thus, the conductive urethane 22 functions as an input layer that inputs electrical resistance values, and functions as a reservoir layer that stores data relating to deformations of the conductive urethane 22. Because the conductive urethane 22 outputs an electrical characteristic (the input data 2004) that differs depending on a pressure stimulus applied just before the robot operation 2003, an estimation layer may estimate an applied type of the robot operation 2003 from electrical resistance values of the conductive urethane 22. Therefore, it is sufficient for the learning processing to train the estimation layer.

The robot operation estimation device 2001 described above may be realized by, for example, a computer executing a program that describes the various functions described above.

FIG. 17 shows an example of the control device 250, which includes a computer serving as an execution device that executes processing to realize the various functions of the robot operation estimation device 2001.

The control device 250 that functions as the robot operation estimation device 2001 is equipped with the computer main body 100 shown in FIG. 17. The computer main body 100 is equipped with the CPU 102, RAM 104 of volatile memory or the like, ROM 106, auxiliary memory device 108 such as a hard disk drive (HDD) or the like, and input/output (I/O) interface 110. The CPU 102, RAM 104, ROM 106, auxiliary memory device 108 and input/output interface 110 are connected via the bus 112 to be capable of sending and receiving data and commands between one another. The communications interface 114 for communicating with external equipment is connected to the input/output interface 110. The communications interface 114 functions to acquire the input data 2004 (electrical resistances) from the robot 2 including the conductive urethane 22. That is, the communications interface 114 is a detection unit and is capable of acquiring the input data 2004 (electrical resistances) from the electrical characteristic detection unit 76 connected to the detection points 75 of the conductive urethane 22 disposed at the robot 2.

The control unit 115 that is a keyboard or the like, the display unit 211 that is a display or the like, the microphone 117 for voice message inputs, the speaker 118 for voice message outputs, and the driving unit 119 are connected to the input/output interface 110. The display unit 211 is disposed at the head portion 210 of the robot 2. The control unit 115, microphone 117 and speaker 118 are, for example, disposed in the interior (not shown in the drawings) of the trunk portion 220 of the robot 2. The driving unit 119 is disposed so as to drive to enable movements of parts (not shown in the drawings) in accordance with coupling of the skeleton 21 of the robot 2.

The control program 108P for causing the computer main body 100 to function as the robot operation estimation device 2001 that is an example of the estimation device of the present disclosure is memorized in the auxiliary memory device 108. The CPU 102 reads the control program 108P from the auxiliary memory device 108, loads the control program 108P into the RAM 104 and executes the processing. Hence, the computer main body 100 executing the control program 108P operates as the robot operation estimation device 2001 that is an example of the estimation device of the present disclosure.

The learning model 108M including the learning model 2051 and the data 108D including various kinds of data are also memorized in the auxiliary memory device 108. The control program 108P may be provided on a recording medium such as a CD-ROM or the like.

Now, the estimation processing at the robot operation estimation device 2001 that is executed by the computer is described.

Figure 28:
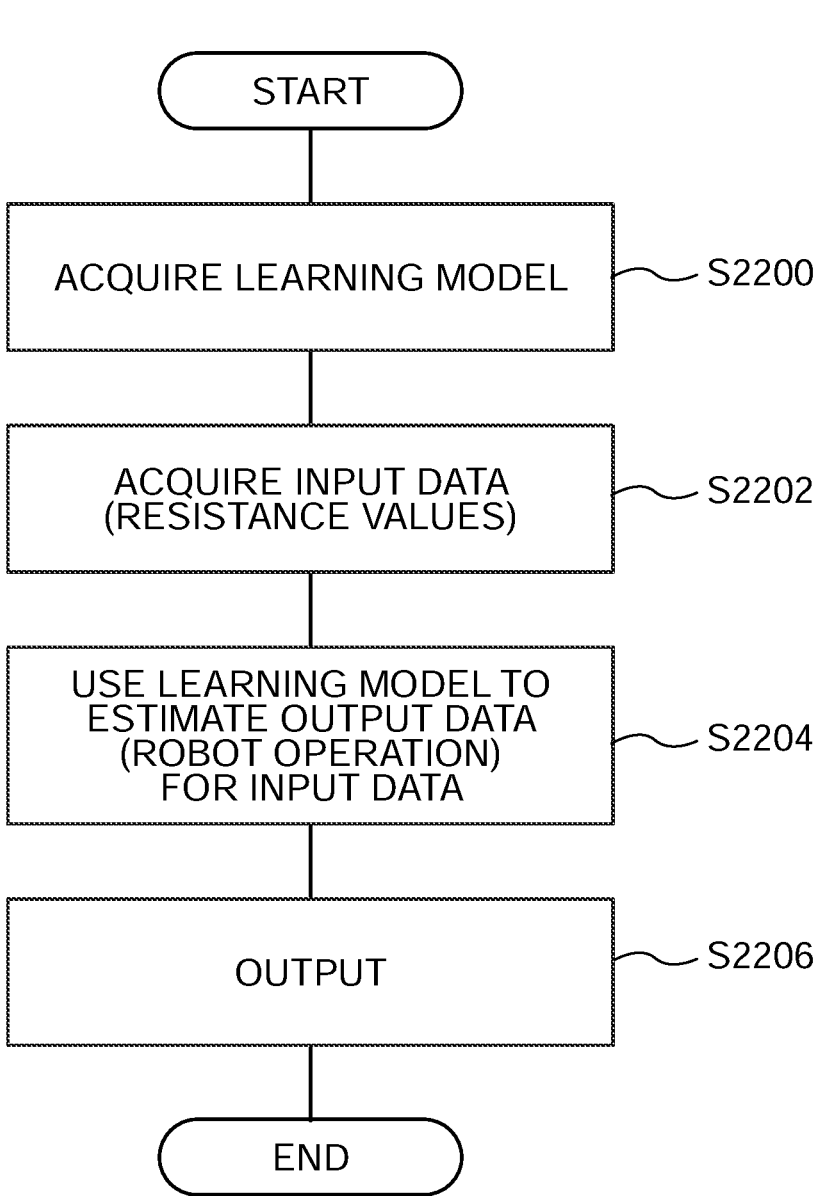
FIG. 28 is a flowchart showing an example of a flow of estimation processing according to the second exemplary embodiment.

FIG. 28 shows an example of a flow of the estimation processing at the computer main body 100 according to the executed control program 108P.

When a power supply of the computer main body 100 is turned on, the estimation processing shown in FIG. 28 is executed by the CPU 102. That is, the CPU 102 reads the control program 108P from the auxiliary memory device 108, loads the control program 108P into the RAM 104 and executes the processing.

Figure 25:
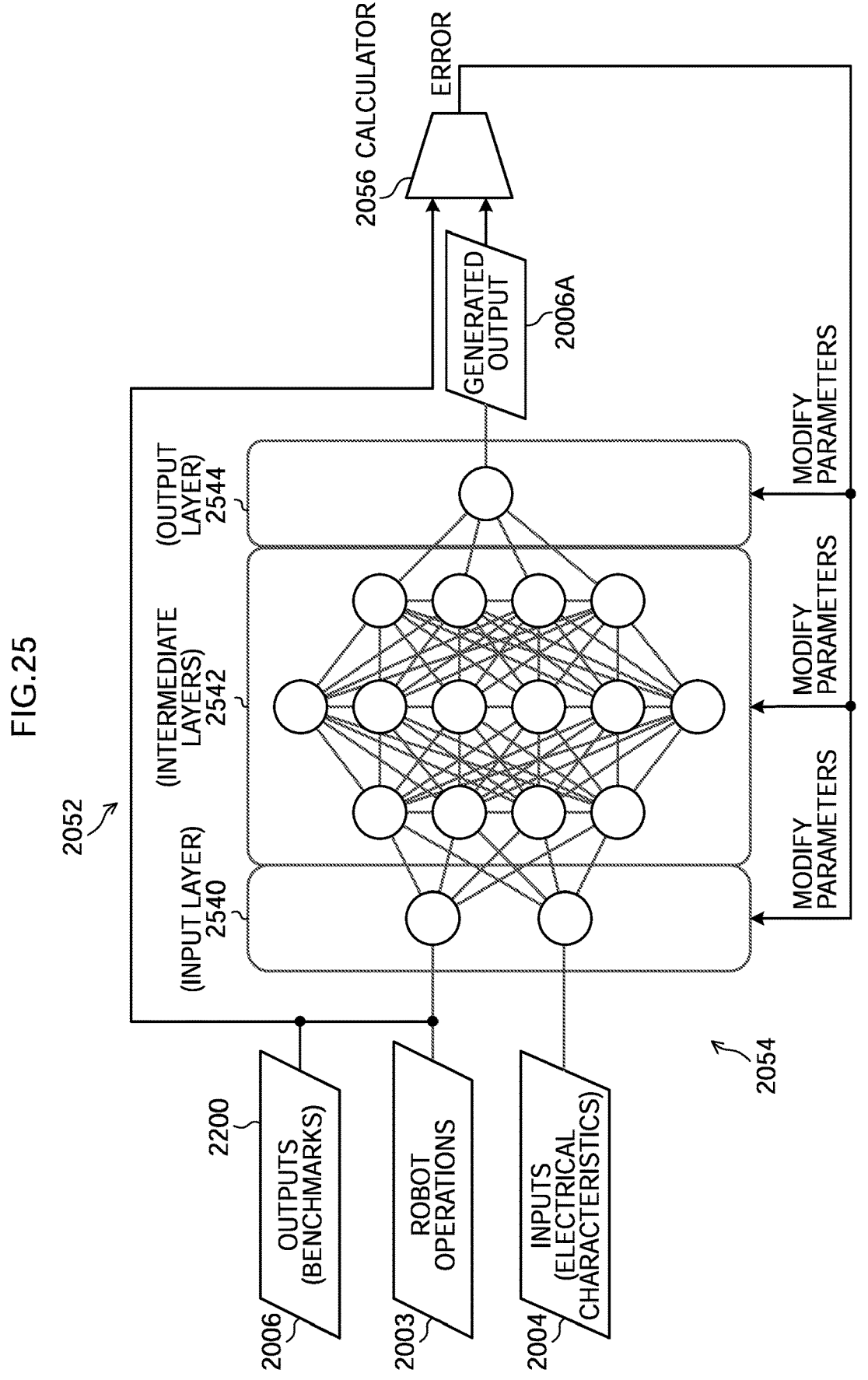
FIG. 25 is a diagram relating to learning processing at a learning processing unit according to the second exemplary embodiment.

In step S2200, the CPU 102 acquires the learning model 2051 by reading the learning model 2051 from the learning model 108M of the auxiliary memory device 108 and loading the learning model 2051 into the RAM 104. More specifically, the network model (see FIG. 25 and FIG. 27) that is a collection of inter-node connections according to weight parameters manifested as the learning model 2051 is loaded into the RAM 104. Thus, the learning model 2051 manifested by the combination of inter-node connections according to the weight parameters is built.

In step S2202, the CPU 102 acquires an unknown set of the input data 2004 (electrical resistances), which is a target for estimating a robot operation that should be executed just after a pressure stimulus is applied to the conductive urethane 22, in a time series via the communications interface 114.

In step S2204, the CPU 102 uses the learning model 2051 acquired in step S2200 to estimate the output data 2006 (an unknown type of robot operation) that corresponds to the input data 2004 (electrical resistances) acquired in step S2202.

In step S2206, the CPU 102 outputs the estimation result output data 2006 (a type of robot operation) via the communications interface 114, outputs data such that sound is emitted from the speaker 118, outputs data for display at the display unit 211, and ends this processing routine. On the basis of the estimation result output data 2006 (the type of robot operation), the control device 250 maintains various postures of the robot 2 and conducts various actions. For example, when the estimated type of robot operation is "power on/off", the control device 250 switches a power supply of the robot 2 on or off. In this way, the exterior portion 27 of the robot 2 functions as a large switch. When the estimated type of robot operation is "stop operation", the control device 250 stops operations of the robot 2. Thus, when a pressure stimulus corresponding to a user falling over is detected, operations of the robot 2 may be stopped and the user may be supported. When the estimated type of robot operation is "retreat", the robot 2 retreats from the pressure stimulus. Thus, the applied pressure stimulus may be avoided.

The estimation processing shown in FIG. 28 is an example of processing that is executed in the estimation method of the present disclosure.

As described above, according to the present disclosure, a type of robot operation may be estimated from the input data 2004 (electrical resistances) of the conductive urethane 22 that changes in accordance with a pressure stimulus applied just before the robot operation 2003. That is, a type of robot operation that should be executed just after may be estimated without using special equipment or large equipment and without directly measuring a deformation of a flexible member. Because the robot executes an operation in response to a pressure stimulus on the conductive urethane 22 just after the pressure stimulus, communication between a person and the robot is more natural.

Because an electrical characteristic changes in accordance with pressure stimuli applied just before robot operations and characteristics of the pressure stimuli are reflected by this electrical characteristic (time series electrical resistances), types of robot operation may be estimated from the electrical resistance values of the conductive urethane 22 changing in time series. That is, even though the robot 2 can execute various robot operations, a suitable type of robot operation may be estimated by using the learning model described above.

With the robot operation estimation device 2001 according to the present exemplary embodiment, various types of robot operation corresponding to electrical characteristics may be estimated by using the learning model 2051 trained by the learning processing described above and inputting electrical characteristics of the conductive urethane 22.

As described above, the present exemplary embodiment is described as employing the conductive urethane as an example of the flexible member. However, it is sufficient that the flexible member is a member with conductivity. It will be clear that the flexible member is not limited to conductive urethane.

The present exemplary embodiment is described as using the learning model 2051 trained by the learning processing described above and estimating various types of robot operation that correspond to the electrical characteristics of the conductive urethane 22. This exemplary embodiment concentrates on the detection of touch states in which a body touches the exterior portion 27 just before a robot operation. The robot operation estimation device 2001 may be employed as a touch detection device that detects touches of bodies on the robot 2 from electrical characteristic time series.

Electrical characteristics of the conductive urethane 22 may be detected separately at a front portion (chest) and a rear portion (back) of the trunk portion 220, in which case a type of robot operation to be executed just after an operation such as an embrace from the front, a tackle from the rear or the like may be estimated.

Third Exemplary Embodiment

The meaning of the term "robot" as used in the present disclosure is intended to include movable portions that are deformed by application of a pressure. The meaning of the term "movable portion" is intended to include tubular members that may be inflected by application of a pressure. The meaning of the term "touch state" is intended to include a touch state of a movable portion against a target object applying a pressure. Examples of a target object include a tubular passage that includes a cavity surrounded by peripheral wall faces, in which a cross-sectional area of the cavity is relatively small (narrow) and a length is relatively long (deep). Below, this passage is referred to as a "narrow passage". Examples of a touch state include a passage inflection state manifested by a movable portion that is inserted in the passage inflecting against and touching the passage. Alternative examples of the touch state include a target object surface state that is manifested by the movable portion touching on a surface of the target object.

The meaning of the term "flexible material" as used in the present disclosure is intended to include a material that is deformable such that at least a portion is warped by the application of an external force or the like, and includes soft resilient bodies of rubber materials and the like, structures that contain at least one of fiber-form and mesh-form frameworks, and structures inside which numerous microscopic bubbles are dispersed. Examples of external forces include pressures. Examples of structures that contain at least one of fiber-form and mesh-form frameworks and of structures in which numerous microscopic bubbles are dispersed include polymer materials such as urethanes. The meaning of the term "flexible material with enhanced conductivity" is intended to include materials with conductivity, and includes materials in which a conductive material is added to a flexible material to enhance conductivity and materials in which a flexible material is conductive. A flexible material with enhanced conductivity features the function of an electrical characteristic changing in accordance with a deformation. Examples of a physical quantity that activates the function of an electrical characteristic changing in accordance with a deformation include a pressure value representing a stimulus caused by a pressure applied to the flexible material (below referred to as a pressure stimulus). Examples of a physical quantity representing an electrical characteristic that changes in accordance with a deformation of the flexible material include an electrical resistance value. Alternative examples include a voltage value and a current value. An electrical resistance value may be taken to be a volume resistance value of the flexible material.

Because a flexible material is provided with conductivity, the flexible material manifests an electrical characteristic in response to deformations caused by pressure. That is, in a flexible material with enhanced conductivity, electrical pathways are complexly connected and the electrical pathways contract or expand in accordance with deformations. The flexible material may exhibit a behavior in which an electrical pathway is temporarily cut and a behavior that causes a different connection from a previous state. Therefore, the flexible material exhibits behaviors with an electrical characteristic between positions separated by a predetermined distance (for example, positions of detection points at which electrodes are disposed) varying in accordance with the size, distribution or the like of applied forces (for example, pressure stimuli). Therefore, the electrical characteristic changes in response to the size, distribution or the like of forces (for example, pressure stimuli) applied to the flexible material.

The estimation device according to the present disclosure uses a trained learning model to estimate a touch state of a movable portion of a robot on a target object from an electrical characteristic of a conductive flexible material provided at the movable portion. As training data, the learning model uses time series of the electrical characteristic when pressures are applied to the conductive flexible material and touch state information representing touch states of the movable portion on target objects that apply pressure to the flexible material. The learning model is trained so as to input a time series of the electrical characteristic and output touch state information representing a touch state corresponding to that time series of the electrical characteristic.

In the descriptions below, a situation is described in which a sheet member serving as the conductive flexible material is disposed at at least a portion of an external portion of a robot. In this sheet member (below referred to as conductive urethane), a conductive material is blended with all or at least a portion of a urethane member. Values (pressure values) representing pressure stimuli applied to the robot, which is to say to the flexible material, are employed as the physical quantity that deforms the conductive urethane. A situation is described in which electrical resistance values of the conductive urethane are employed as the physical quantity that changes in accordance with pressure stimuli.

Figure 30:
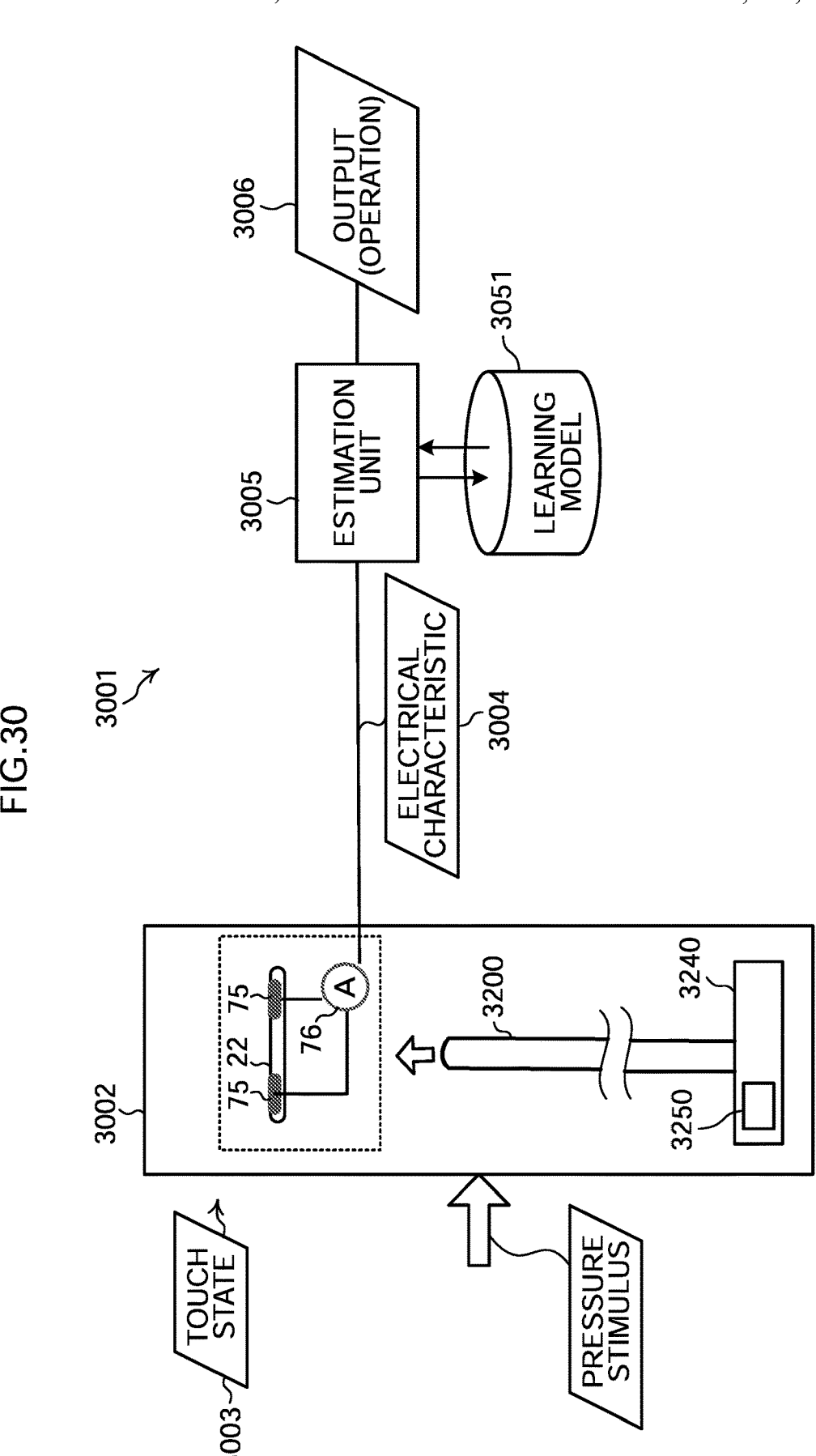
FIG. 30 is a diagram showing an example of structures of a touch state estimation device according to a third exemplary embodiment.

FIG. 30 shows an example of structures of a touch state estimation device 3001 that serves as the estimation device of the present disclosure.

Estimation processing at the touch state estimation device 3001 uses a trained learning model 3051 to estimate and output a touch state of a movable portion 3200 on a target object, which is an unknown touch state on a target object, from an electrical characteristic of the conductive urethane 22, which is disposed at the movable portion 3200 of a robot 3002. Therefore, touch state information representing a touch state of the movable portion 3200 on a target object may be estimated without using special equipment or large equipment and without directly measuring a deformation of the movable portion 3200. The learning model 3051 is trained using touch states of the movable portion 3200 on target objects (for example, values representing touch states) as labels and using the electrical characteristic of the conductive urethane 22 (that is, electrical resistance values of the conductive urethane 22 disposed at the robot 3002) in those touch states of the movable portion of the robot as inputs. Training of the learning model 3051 is described below.

The robot 3002 shown in FIG. 30 operates as an inspection robot that inspects inflection states and surface states of target objects. The robot 3002, includes the movable portion 3200 and a base portion 3240. The movable portion 3200 is detachably installed at the base portion 3240. During usage, an operator detaches the movable portion 3200 from the base portion 3240, inserts the movable portion 3200 into a target object such as a narrow passage or the like, and conducts an inspection. The movable portion 3200 and base portion 3240 are electronically connected wirelessly or by wire. The base portion 3240 is equipped with a control device 3250 that controls the robot 3002. The control device 3250 includes functional units that operate as the touch state estimation device 3001.

Figure 31A:
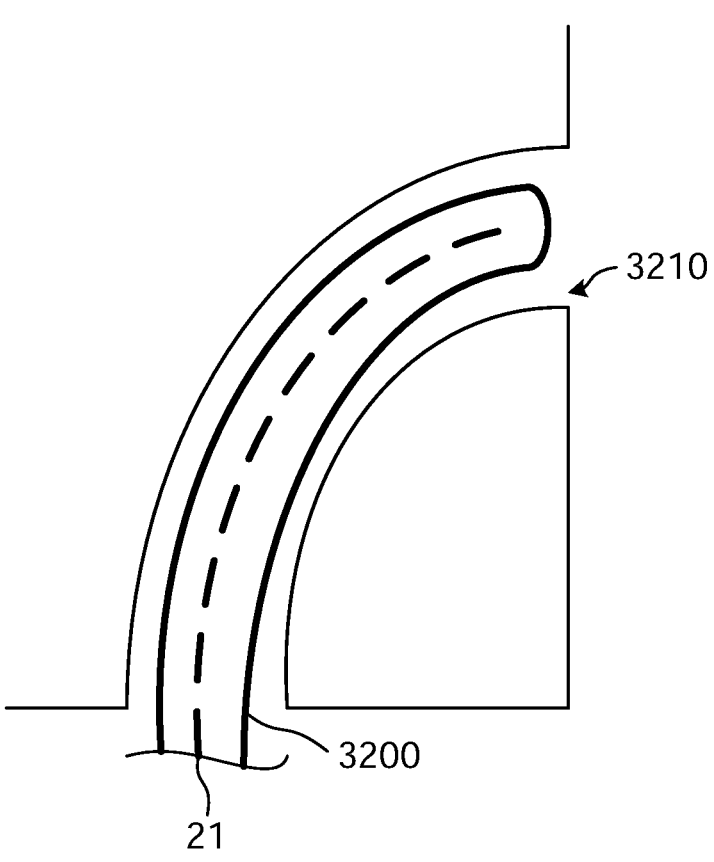
FIG. 31A is a diagram relating to a usage state of a movable portion according to the third exemplary embodiment.
Figure 31B:
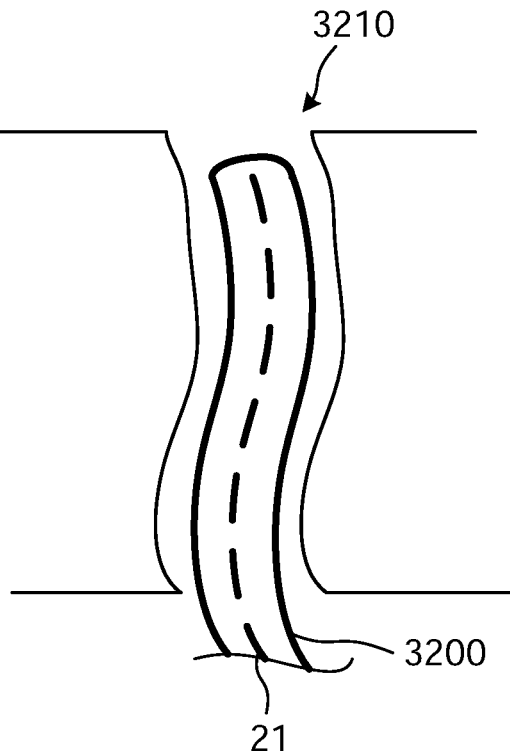
FIG. 31B is a diagram relating to a usage state of the movable portion according to the third exemplary embodiment.
Figure 31C:
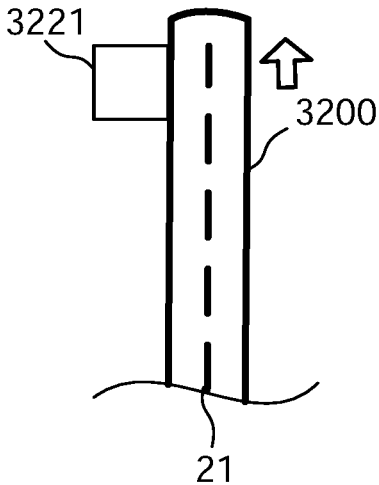
FIG. 31C is a diagram relating to a usage state of the movable portion according to the third exemplary embodiment.

States of use of the movable portion 3200 of the robot 3002 are now described with reference to FIG. 31A to FIG. 31C. FIG. 31A and FIG. 31B, show examples in which the movable portion 3200 is inserted into a narrow passage 3210. FIG. 31C shows an example in which the movable portion 3200 touches a surface of a body 3221.

The movable portion 3200 shown in FIG. 31A is inserted into the narrow passage 3210 that inflects to the right side. The inflection state of the narrow passage 3210 is manifested by the movable portion 3200 inflecting and touching against the narrow passage 3210. In the movable portion 3200, the conductive urethane 22 is disposed around a core member 21. Thus, the conductive urethane 22 is disposed at the exterior at the outer side of the movable portion 3200. The conductive urethane 22 disposed at the movable portion 3200 is connected to the electrical characteristic detection unit 76 (FIG. 8) via the detection points 75 that are electrodes or the like.

The movable portion 3200 shown in FIG. 31B is inserted into the narrow passage 3210 that inflects to left and right (meandering). Similarly to the example in FIG. 31A, the inflection state of the narrow passage 3210 is manifested by the movable portion 3200 inflecting and touching against the narrow passage 3210. The term "inflection state" as used herein is intended to represent states of inflection such as, for example, inflection to a right side, inflection to a left side, inflections to left and right (meanders) and so forth. Because the electrical characteristic of the conductive urethane 22 changes in accordance with inflection states of the narrow passage 3210, inflection states of the narrow passage 3210 may be identified by detecting the electrical characteristic of the conductive urethane 22.

The movable portion 3200 shown in FIG. 31C touches so as to rub against a surface of the body 3221. This body 3221 is not limited to a passage; any body of which a surface state is to be estimated is applicable. The surface state of the body 3221 is manifested by the movable portion 3200 touching against the body 3221. The term "surface state" as used herein expresses, for example, states of a surface such as, for example, rough, smooth and so forth. Because the electrical characteristic of the conductive urethane 22 changes in accordance with surface states of the body 3221, surface states of the body 3221 may be identified by detecting the electrical characteristic of the conductive urethane 22.

For example, as shown in a sectional diagram of an example of schematic structures of the movable portion 3200 in FIG. 3, the inner layer 25 is disposed around the core member 21 of the movable portion 3200, and the exterior portion 27 that functions as a skin is disposed around the inner layer 25. The inner layer 25 is not necessary; the exterior portion 27 that functions as the skin may be disposed around the core member 21. The core member 21 is constituted of, for example, a resilient material that is capable of inflecting in accordance with pressures from outside and the like.

The conductive urethane 22 is a material disposed around the core member 21. That is, it is sufficient that the conductive urethane 22 is disposed at least at a portion of the exterior portion 27. The conductive urethane 22 may be disposed inside and may be disposed outside (FIG. 4). As a concrete example, the section A-A of the exterior portion 27 may be illustrated as the exterior section 27-1 in which the whole of the interior of the exterior portion 27 is constituted by the conductive urethane 22. As illustrated by the exterior section 27-2, the conductive urethane 22 may be formed at a portion of the outer side (surface side) of the exterior portion 27, and as illustrated by the exterior section 27-3, the conductive urethane 22 may be formed at the inner side (core member side) of the exterior portion 27. As illustrated by the exterior section 27-4, the conductive urethane 22 may be formed at a portion inside the exterior portion 27. As illustrated by the exterior section 27-5, the conductive urethane 22 may be disposed at the outer side of the material 27A with flexibility that constitutes the exterior portion 27, and as illustrated by the exterior section 27-6, the conductive urethane 22 may be disposed outside of the inner side (core member side) of the exterior portion 27. When the conductive urethane 22 is disposed outside of the material 27A constituting the exterior portion 27, the conductive urethane 22 and the material constituting the exterior portion 27 may simply be layered, or the conductive urethane 22 and the material constituting the exterior portion 27 may be integrated by adhesion or the like. Even when the conductive urethane 22 is disposed outside of the material constituting the exterior portion 27, because the conductive urethane 22 is a conductive urethane member, flexibility of the material constituting the exterior portion 27 is not impeded.

In order to simplify descriptions below, descriptions are given in which, as an example of the robot of the present disclosure, an inspection robot system including the movable portion 3200 shown in FIG. 30 is employed as the robot 3002. The conductive urethane 22 is disposed around the core member 21 to serve as the exterior, which is the outer side of the movable portion 3200, to form exterior portions of the robot 3002.

To estimate a touch state of the movable portion 3200 on the narrow passage 3210, the touch state estimation device 3001 detects an electrical characteristic of the conductive urethane 22 disposed at the movable portion 3200.

As shown in FIG. 8, the electrical characteristic of the conductive urethane 22 (that is, volume resistance values, which are electrical resistance values) may be detected from signals from the plural (two in FIG. 8) detection points 75 that are disposed a distance apart. FIG. 8 illustrates a situation in which the conductive urethane 22 that is disposed as a portion of the exterior portion 27 is unfolded flat. FIG. 8 shows a detection set #1, in which the detection points 75 are offset to side edge portions of the conductive urethane 22, that detects an electrical resistance value from signals from the plural detection points 75, which are distanced apart and disposed at opposite corners of the conductive urethane 22. Arrangements of the plural detection points 75 are not limited to the positions shown in FIG. 8 but may be any positions provided those positions enable detection of the electrical characteristic of the conductive urethane 22. For example, it is sufficient that the plural detection points 75 are disposed apart. The detection points 75 are not limited to arrangements at side edge portions but may be at central portions, and may be in a combination of a side edge portion and a central portion. It is also sufficient that the electrical characteristic detection unit 76 that detects the electrical characteristic of the conductive urethane 22 (that is, volume resistance values that are electrical resistance values) is connected to and uses outputs from the detection points 75.

The electrical resistance values detected at the movable portion 3200 that is equipped with the conductive urethane 22 at the exterior portion 27 change from before to after a deformation of the conductive urethane 22 caused by a deformation when a pressure stimulus is applied to the exterior portion 27 of the movable portion 3200 or the like. Therefore, urging of the movable portion 3200 by a target object may be detected by detecting electrical resistance values in a time series, that is, detecting a change in electrical resistance values from a state in which no pressure stimulus is applied to the movable portion 3200 (for example, detecting an electrical resistance value that exceeds a pre-specified threshold). More specifically, an urged state representing urging of a target object on the movable portion 3200 accompanies a pressure stimulus when the target object touches the movable portion 3200. Therefore, urged states include touch states. Thus, because the conductive urethane 22 is disposed at the movable portion 3200, urging of a target object on the movable portion 3200, including touching, may be detected. The electrical resistance value changes if any one of a position, distribution and size of a pressure stimulus applied to the movable portion 3200 changes. Therefore, detecting urged states of target objects on the movable portion 3200, including touch positions, from electrical resistance values changing in time series is conceivable.

The exterior portion 27 including the conductive urethane 22 that is formed at the movable portion 3200 may be formed as an integrated structure in which the exterior portion 27 including the conductive urethane 22 is formed at the outer side of the movable portion 3200, and the exterior portion 27 including the conductive urethane 22 may be formed separately at respective parts.

To improve a detection accuracy of the electrical characteristic at a single conductive urethane 22, a greater number of detection points than the (two) detection points shown in FIG. 8 may be used.

As examples, one row or a plural number of rows in which plural conductive urethane pieces at which the respective detection points are disposed may be arrayed to form the conductive urethane 22, and the electrical characteristic may be detected from each of the plural conductive urethane pieces. For example, the conductive urethane pieces 23 (FIG. 9) may be arrayed to form the conductive urethane 22 (FIG. 10 and FIG. 11). The example shown in FIG. 9 illustrates a first detection set #1 and a second detection set #2. The first detection set #1 detects an electrical resistance value according to signals from the detection points 75A that are distanced apart and disposed at opposite corner positions. The second detection set #2 detects an electrical resistance value according to signals from the detection points 75B that are distanced apart and disposed at the other opposite corner positions. In the example shown in FIG. 10, the conductive urethane pieces 23 (FIG. 9) are arrayed (4×1) in a length direction of the exterior portion 27 to form the conductive urethane 22, and the conductive urethane pieces 23, in sequence, constitute a first detection set #1 to an eighth detection set #8. In the example shown in FIG. 11 the first detection set #1 of each conductive urethane piece 23 (FIG. 9) is employed, and the conductive urethane pieces 23 are arrayed (4×2) in the length direction and a width direction of the exterior portion 27 to form the conductive urethane 22 and constitute a first detection set #1 to an eighth detection set #8.

As an alternative example, a detection range of the conductive urethane 22 may be segmented, detection points may be provided at each segmented detection range, and the electrical characteristic may be detected for each detection range. For example, specifying regions corresponding to the size of the conductive urethane pieces 23 shown in FIG. 10 and FIG. 11 as detection ranges, disposing detection points at each of the specified detection ranges, and detecting the electrical characteristic in each detection range is applicable.

As shown in FIG. 30, the touch state estimation device 3001 is equipped with an estimation unit 3005. The estimation unit 3005 inputs time series input data 3004 representing sizes of electrical resistance (electrical resistance values) of the conductive urethane 22. More specifically, the estimation unit 3005 inputs the electrical characteristic (that is, volume resistance values that are electrical resistance values) outputted from the electrical characteristic detection unit 76 connected to the detection points 75 of the conductive urethane 22. The input data 3004 corresponds to a touch state 3003 of the movable portion 3200. As an estimation result, the estimation unit 3005 outputs output data 3006 representing a physical quantity (a touch state value) that represents the touch state 3003. The estimation unit 3005 includes the trained learning model 3051.

The learning model 3051 is a model that has been trained to compute a touch state of the movable portion 3200 on a target object, which is to say an inflection state or surface state of the target object (the output data 3006) from electrical resistances (the input data 3004) of the conductive urethane 22 that are changed by a pressure stimulus corresponding to the touch state 3003. The learning model 3051 is, for example, a model that defines a trained neural network, which is manifested as a collection of information of weights (strengths) of connections between nodes (neurons) structuring the neural network.

Figure 32:
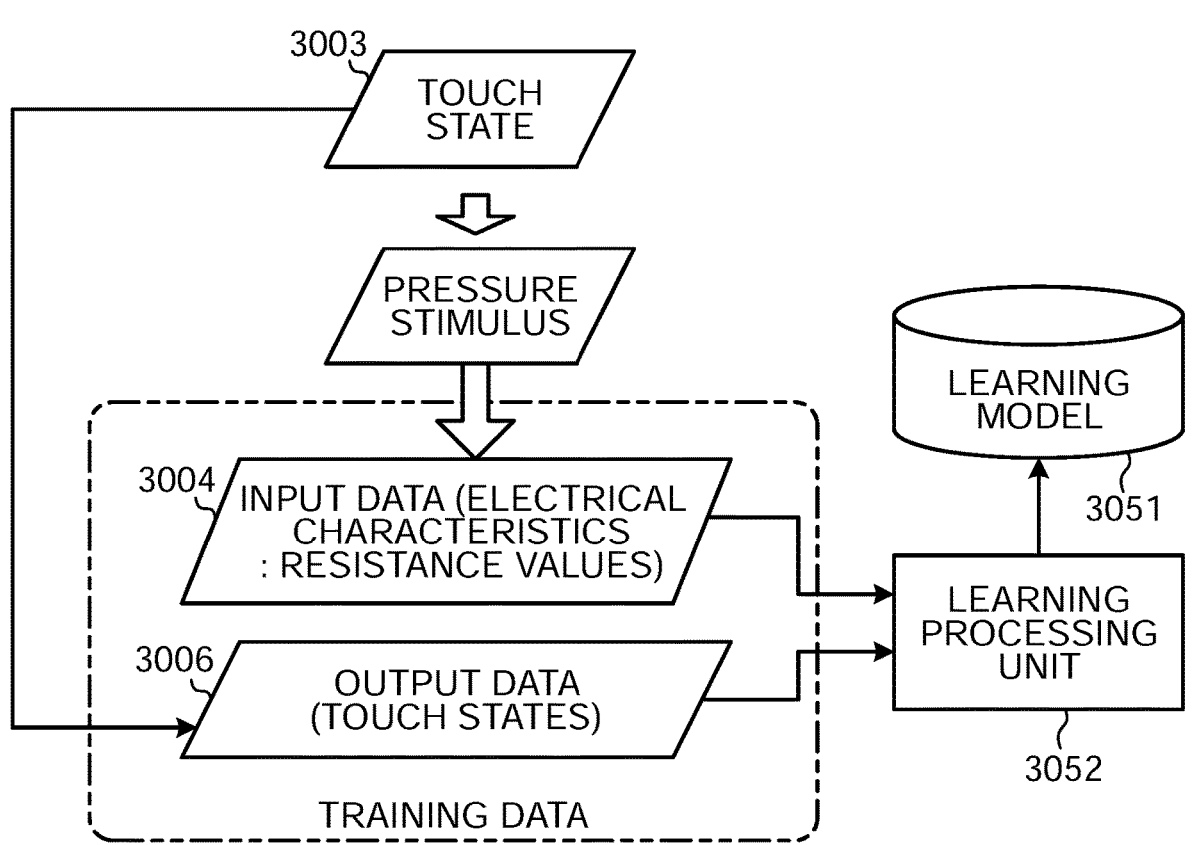
FIG. 32 is a diagram relating to learning processing according to the third exemplary embodiment.

The learning model 3051 is generated by learning processing at a learning processing unit 3052 (FIG. 32). The learning processing unit 3052 uses electrical characteristics of the conductive urethane 22 (the input data 3004) that change with pressure stimuli according to the touch states 3003 to conduct the learning processing. That is, the learning processing unit 3052 uses the touch states 3003 as labels and large amounts of data of time series measurements of electrical resistance of the conductive urethane 22 as training data. More specifically, the training data includes a large amount of sets of input data including electrical resistance values (the input data 3004) and information (the output data 3006) representing the touch states 3003 corresponding to the input data. The learning processing unit 3052 associates time series information by assigning information representing a measurement time to each electrical resistance value of the conductive urethane 22 (the input data 3004). This time series information may be associated by assigning the information representing measurement times to sets of time series electrical resistance values of the conductive urethane 22 in periods defined as the touch states 3003.

Now the learning processing unit 3052 is described.

In the learning processing conducted by the learning processing unit 3052, the exterior portion 27 of the movable portion 3200 at which the conductive urethane 22 is disposed as described above is employed as a detection unit, and the touch states 3003 and electrical resistance values from the conductive urethane 22 (the input data 3004) are used as training data.

For example, data corresponding to touch states representing inflection states of target objects (narrow passages) is used as training data. In concrete terms, the movable portion 3200 is inserted into a narrow passage formed in a predetermined inflection state, the movable portion 3200 goes into a state of inflection and touching in accordance with the narrow passage, electrical resistance values at this time are detected and associated with the touch state (a touch state value), and are used as training data. The exterior portion 27 of the robot 3002 is deformed by the inflection and touching of the movable portion 3200 against the narrow passage and electrical resistance values of the conductive urethane 22 change. A time series of electrical resistance values may be detected and associated with the touch state (touch state value), and may be used as training data.

Data corresponding to touch states representing surface states of a target object may also be used as training data (this is not limited to narrow passages; various target objects may be used as a target). In concrete terms, the movable portion 3200 is caused to touch so as to rub against a surface of a target object with a predetermined surface state, electrical resistance values at this time are detected and associated with the surface state, and are used as training data. The exterior portion 27 of the robot 3002 is deformed by touching the surface of the target object and electrical resistance values of the conductive urethane 22 change. A time series of electrical resistance values may be detected and associated with a touch state (a touch state value), and may be used as training data.

Figure 33:
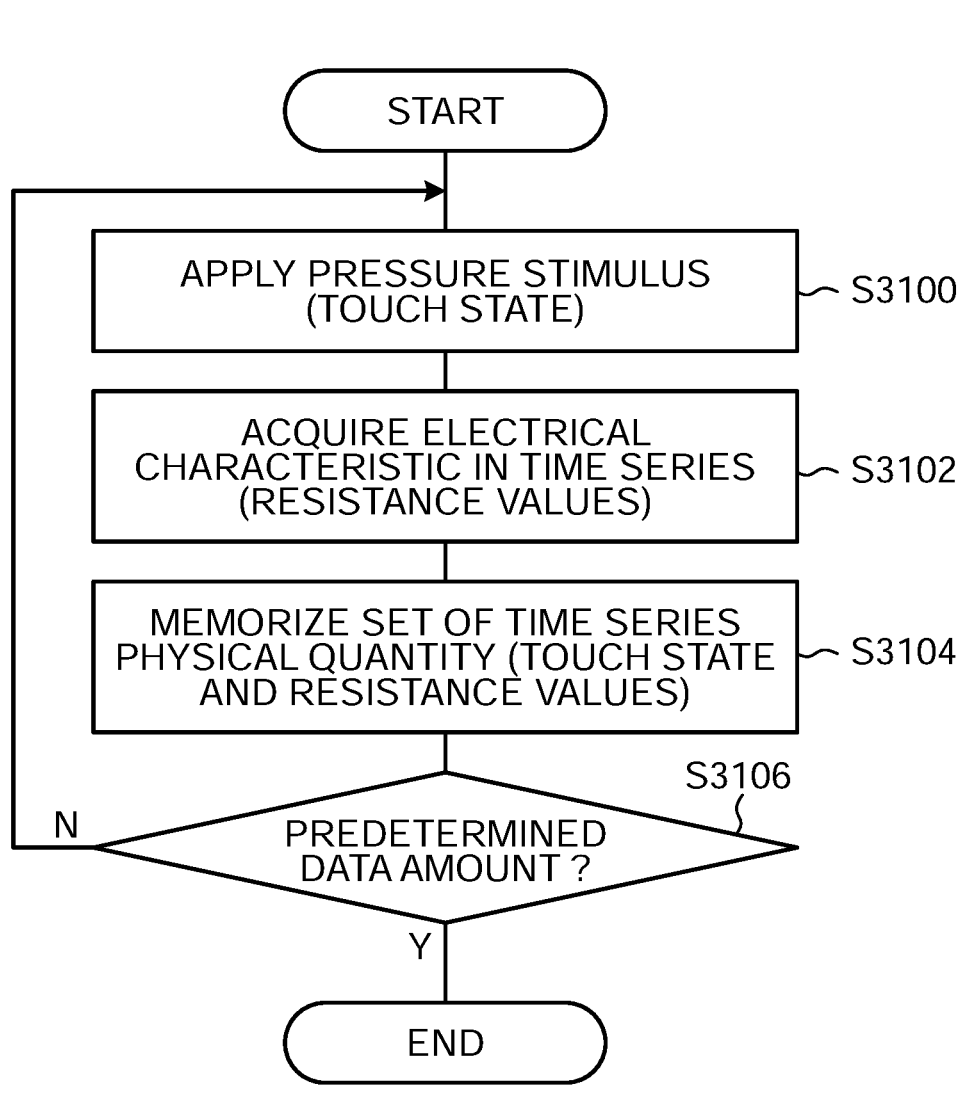
FIG. 33 is a flowchart showing an example of training data collection processing according to the third exemplary embodiment.

The learning processing unit 3052 may be structured with a computer including a CPU, which is not shown in the drawings. The learning processing unit 3052 executes training data collection processing and learning processing. FIG. 33 shows an example of the training data collection processing executed by the unillustrated CPU. In step S3100, the learning processing unit 3052 gives an instruction to attain a touch state as described above. In step S3102, the learning processing unit 3052 acquires a time series of electrical resistance values of the conductive urethane 22 that change in accordance with a pressure stimulus corresponding to the touch state. In step S3104, the learning processing unit 3052 assigns touch state information representing the touch state 3003 to the acquired time series electrical resistance values as a label and memorizes the same. The learning processing unit 3052 repeats the processing described above until a pre-specified number of sets of these touch state values and electrical resistance values of the conductive urethane 22 is reached or until a pre-specified time has passed (results of the determination in step S3106 are negative until the result is affirmative). Thus, the learning processing unit 3052 may acquire and memorize electrical resistance values of the conductive urethane 22 in time series for each of the touch states 3003. The learning processing unit 3052 uses the memorized sets of respective touch states and time series electrical resistance values of the conductive urethane 22 as the training data.

Now, when the movable portion 3200 is urged in association with a pressure stimulus of a target object touching the movable portion 3200 or the like, an electrical characteristic (the electrical resistance values) changes to increase with larger urging forces (pushing forces) from an urged state in which the target object touches the exterior portion 27. Therefore, an urged state in which a target object touches the exterior portion 27 may be detected by detecting that an electrical characteristic time series exceeds a pre-specified threshold for touch detection. Accordingly, providing urged states in which target objects touch the exterior portion 27 are detected, using electrical characteristic time series corresponding to urging forces (pushing forces) that identify touching urged states as the training data is applicable.

FIG. 29 shows an example of an electrical characteristic of the movable portion 3200 of the robot 3002. FIG. 3-16 depicts an electrical characteristic of the conductive urethane 22 when the movable portion 3200 of the robot 3002 is pushed by a hand of a user with various urging forces (pushing forces with peak values P1 to P8). The peak values P1 to P7 are pressure stimuli that do not attain the level of touching by a target object, and the peak value P8 is a pressure stimulus for when a target object touches the movable portion 3200.

As shown in FIG. 29, each of the electrical characteristic time series of the conductive urethane 22 (the electrical characteristics before, after and including the respective peak values P1 to P8) is a characteristic pattern of a touch state when the movable portion 3200 is touched and urged in accordance with an urging force (pushing force) from a target object. That is, a pattern in which the electrical resistance value rises sharply when the movable portion 3200 is pushed by the target object and the electrical resistance value falls steadily when the pressure is released (the target object moves away) is manifested as a characteristic pattern. In the example shown in FIG. 29, the peak value P8 produces a larger electrical resistance value than the peak values P1 to P7. Therefore, touch states in which target objects touch the exterior portion 27 may be detected by setting an electrical resistance value exceeding the peak values P1 to P7 as a threshold th. Thus, the learning processing unit 3052 learns by using electrical characteristic time series corresponding to urging forces (pushing forces) that identify touching urged states as training data.

Thus, when a pressure stimulus at the movable portion 3200 changes in accordance with a touch state and an electrical characteristic corresponding to the change of the pressure stimulus is acquired in a time series, the electrical characteristic time series may be associated with the touch state and memorized. Sets of electrical characteristic time series and touch state information representing the touch states may be used as the training data.

Now, an example of the training data described above is shown in tables. Table 4 is an example in which data associating time series electrical resistance value data (r) with inflection state values is used as training data relating to inflection states of a target object (for example, a narrow passage). Table 5 is an example in which data associating time series electrical resistance value data (R) with surface state values is used as training data relating to surface states of a target object.

TABLE 4

| Time series electrical resistance value data | Inflection state |
| --- | --- |
| r11, r12, r13, . . . r1n | Inflecting to the right side |
| r21, r22, r23, . . . r2n | Inflecting to the left side |
| r31, r32, r23, . . . r3n | Inflecting to the left and |

TABLE 4-continued

| Time series electrical resistance value data | Inflection state |
|---|---|
| | right (meandering) |
| r41, r42, r43, . . . r4n | . . . |
| . . . | . . . |

TABLE 5

| Time series electrical resistance value data | Surface state |
|---|---|
| R11, R12, R13, . . . R1m | Rough |
| R21, R22, R23, . . . R2m | Smooth |
| R31, R32, R23, . . . R3m | . . . |
| R41, R42, R43, . . . R4m | . . . |
| . . . | . . . |

Figure 34:
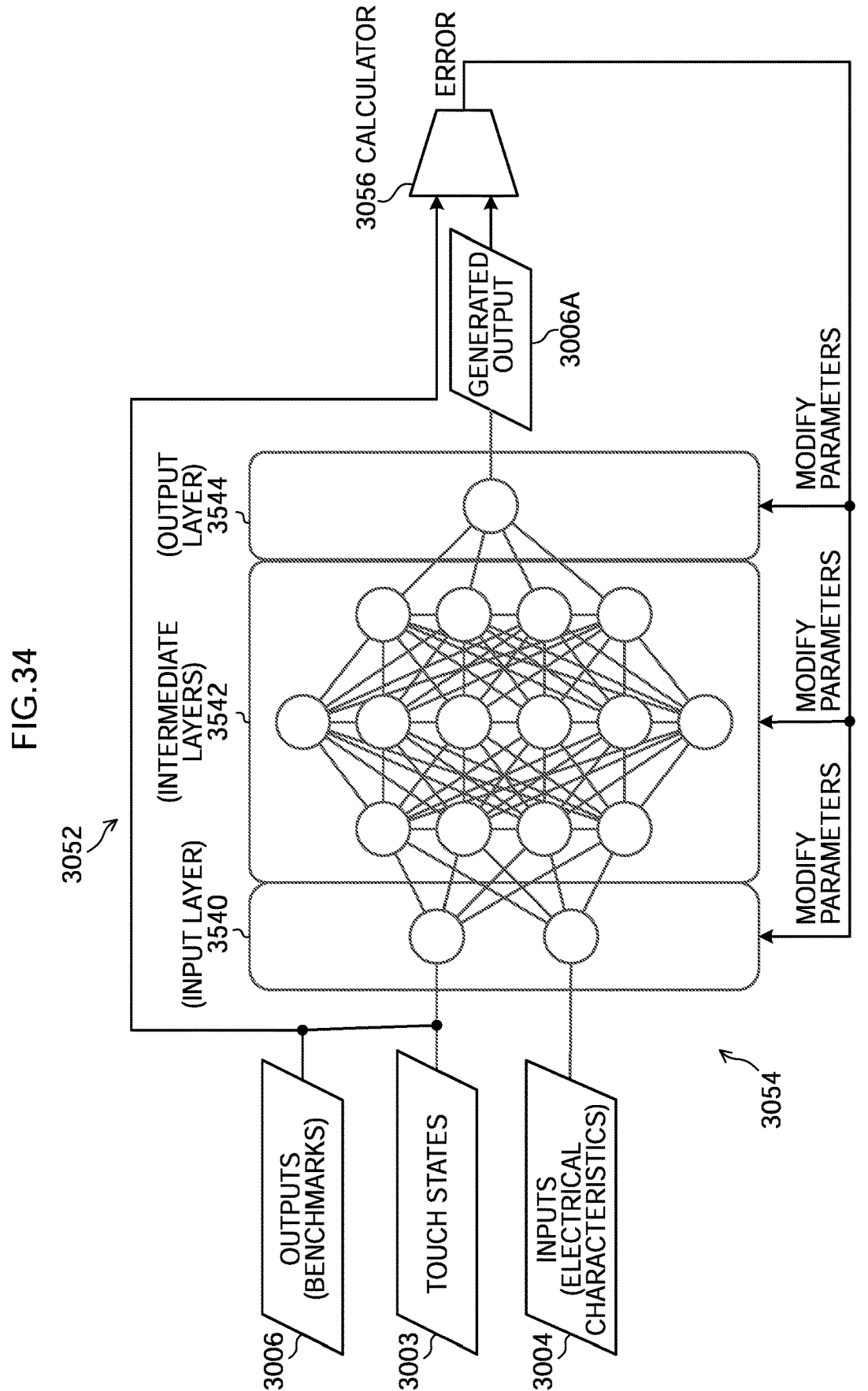
FIG. 34 is a diagram relating to learning processing at a learning processing unit according to the third exemplary embodiment.

Now, the learning processing at the learning processing unit 3052 is described. FIG. 34 is a diagram showing functions of the unillustrated CPU of the learning processing unit 3052 in the learning processing.

The unillustrated CPU of the learning processing unit 3052 includes a generator 3054 and a calculator 3056 as functional sections. The generator 3054 features a function of generating outputs in consideration of inputs that are before-and-after relationships of electrical resistance values acquired in time series.

As training data, the learning processing unit 3052 retains numerous sets of the input data 3004 described above (electrical resistance values) and the output data 3006 that is the touch states 3003 corresponding to the input data 3004 (electrical resistance values).

The generator 3054 includes an input layer 3540, intermediate layers 3542 and an output layer 3544, constituting a publicly known neural network (NN). Because a neural network is a publicly known technology, detailed descriptions are not given here. However, the intermediate layers 3542 include numerous node groups (neuron groups) with inter-node connections and feedback connections. Data is inputted from the input layer 3540 to the intermediate layers 3542 and data of computation results from the intermediate layers 3542 is outputted to the output layer 3544.

The generator 3054 is a neural network that generates generated output data 3006A representing a touch state from the inputted input data 3004 (electrical resistances). The generated output data 3006A is data in which a touch state is estimated from the input data 3004 (electrical resistances). The generator 3054 generates generated output data representing a state close to a touch state from the input data 3004 (electrical resistances) inputted in a time series. By learning using numerous sets of the input data 3004 (electrical resistances), the generator 3054 becomes capable of generating the generated output data 3006A to be close to a touch state in which a pressure stimulus is applied to the movable portion 3200, that is, the conductive urethane 22. From another perspective, the electrical characteristics that are the input data 3004 inputted in time series may be understood as patterns. By learning these patterns, the generator 3054 becomes capable of generating the generated output data 3006A close to a touch state in which a pressure stimulus is applied to the movable portion 3200, which is to say the conductive urethane 22.

The calculator 3056 compares the generated output data 3006A with the output data 3006 of the training data, and calculates an error in the comparison results. The learning processing unit 3052 inputs the generated output data 3006A and the output data 3006 of the training data to the calculator 3056. In response, the calculator 3056 calculates an error between the generated output data 3006A and the output data 3006 of the training data, and outputs signals representing the calculation results.

On the basis of the error calculated by the calculator 3056, the learning processing unit 3052 tunes weight parameters of the inter-node connections to train the generator 3054. More specifically, weight parameters of inter-node connections between the input layer 3540 and the intermediate layers 3542 of the generator 3054, weight parameters of inter-node connections in the intermediate layers 3542, and weight parameters of inter-node connections between the intermediate layers 3542 and the output layer 3544 are respectively fed back to the generator 3054 using a technique such as, for example, gradient descent, error back propagation or the like. That is, connections between all the nodes are optimized so as to minimize differences between the generated output data 3006A and the training data output data 3006, using the output data 3006 of training data as benchmarks.

The learning model 3051 is generated by the learning processing of the learning processing unit 3052. The learning model 3051 is manifested by the learning processing unit 3052 as a collection of information of weight parameters (weights or strengths) of inter-node connections of training results.

Figure 35:
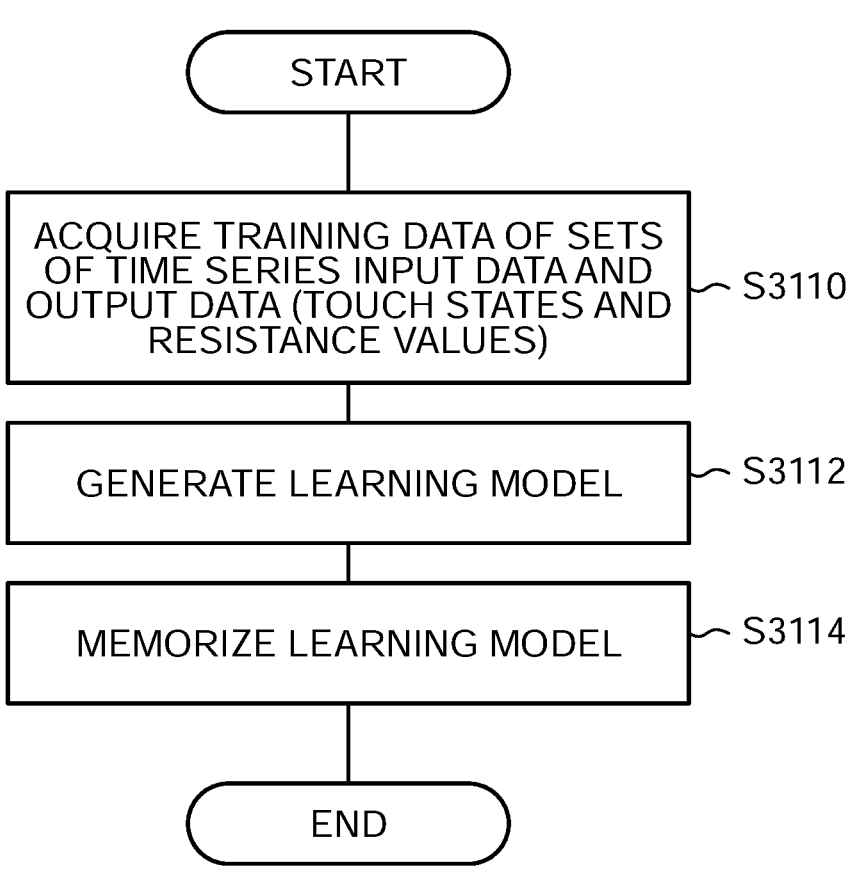
FIG. 35 is a flowchart showing an example of a flow of learning processing according to the third exemplary embodiment.

FIG. 35 shows an example of flow of the learning processing. In step S3110, the learning processing unit 3052 acquires the input data 3004 (electrical resistances) labeled with information representing touch states, which is the training data of results measured in time series. In step S3112, the learning processing unit 3052 uses the training data of results measured in time series to generate the learning model 3051. That is, the learning processing unit 3052 obtains a collection of information of weight parameters (weights or strengths) of inter-node connections of the training results that is trained using the numerous sets of training data as described above. In step S3114, the learning processing unit 3052 memorizes data manifested as the collection of information of weight parameters (weights or strengths) of inter-node connections of the training results to serve as the learning model 3051.

The generator 3054 may also use a recurrent neural network with a function that generates outputs with consideration to before-and-after relationships of the time series inputs, or may use an alternative method.

In the touch state estimation device 3001 described above, the trained generator 3054 (that is, the data manifested as a collection of information of weight parameters of inter-node connections of training results) generated by the method of which an example is illustrated above is used as the learning model 3051. When the learning model 3051 that is used is sufficiently trained, identifying touch states from time series electrical resistance values of the conductive urethane 22 disposed at the robot 3002, which is to say the exterior portion 27, is conceivable.

The processing carried out by the learning processing unit 3052 is an example of processing of the learning model generation device of the present disclosure. The touch state estimation device 3001 is an example of the estimation unit and the estimation device of the present disclosure. The output data 3006 that is information representing the touch states 3003 is an example of touch state information of the present disclosure.

As described above, in the conductive urethane 22 electrical pathways are complexly connected as described above. The conductive urethane 22 exhibits behaviors such as contractions and extensions of the electrical pathways, temporary cut-offs and new connections in accordance with deformations, and consequently exhibits behaviors with electrical characteristics that differ depending on applied forces (for example, pressure stimuli). This means the conductive urethane 22 may be treated as a reservoir storing data relating to deformations of the conductive urethane 22. That is, the touch state estimation device 3001 may employ the conductive urethane 22 in a neural network (below referred to as a PRCN) known as physical reservoir computing (PRC). Because PRC and a PRCN are publicly known technologies, detailed descriptions are not given here. That is, PRC and a PRCN are excellently applicable to estimation of information relating to deformations of the conductive urethane 22.

Figure 36:
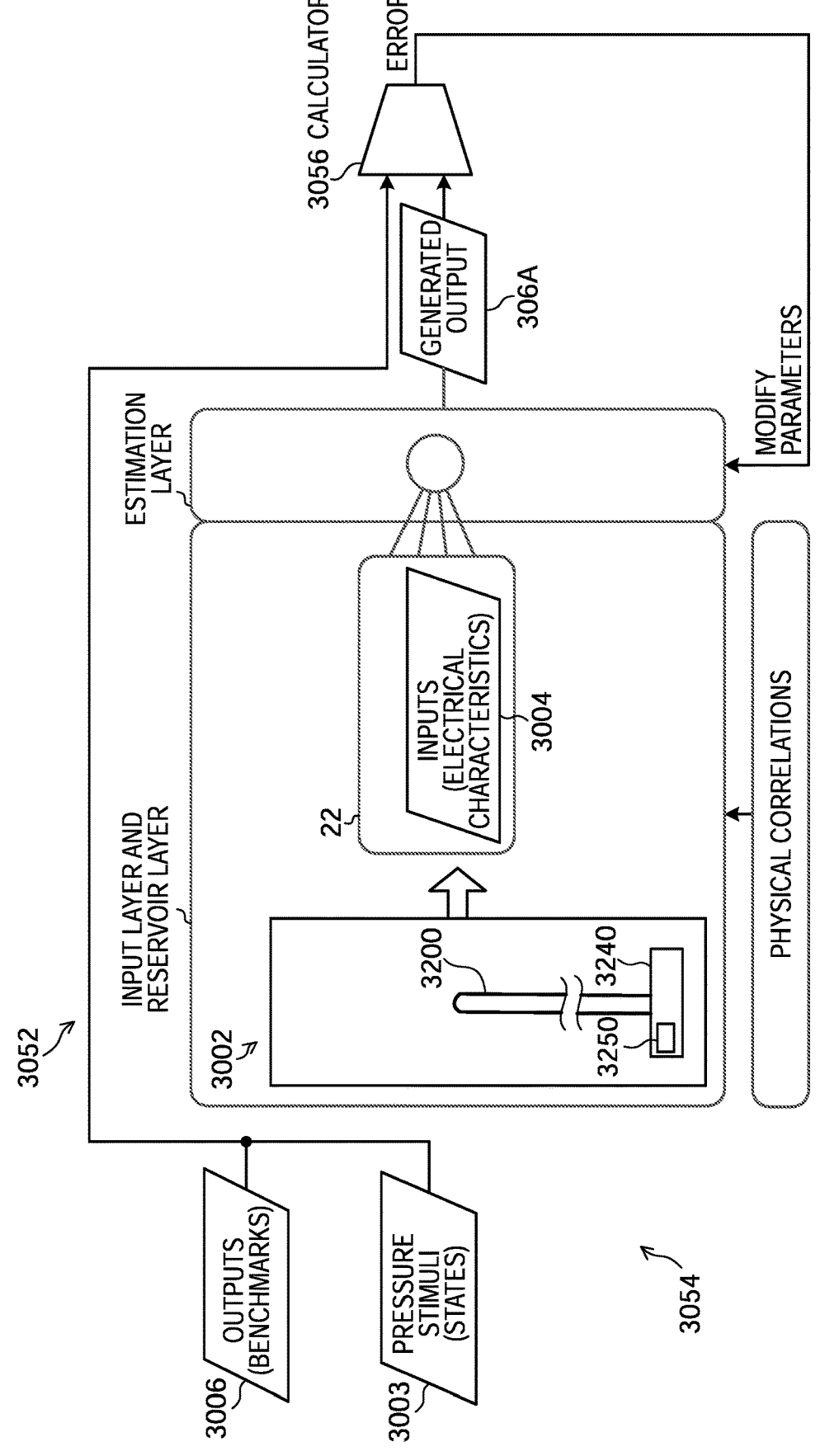
FIG. 36 is a diagram relating to learning processing at the learning processing unit according to the third exemplary embodiment.

FIG. 36 shows an example of the learning processing unit 3052 treating the robot 3002 including the conductive urethane 22 as a reservoir that stores data relating to deformations of the robot 3002 including the conductive urethane 22 for training. The conductive urethane 22 has an electrical characteristic (electrical resistance values) corresponding to each of numerous pressure stimuli. Thus, the conductive urethane 22 functions as an input layer that inputs electrical resistance values, and functions as a reservoir layer that stores data relating to deformations of the conductive urethane 22. Because the conductive urethane 22 outputs an electrical characteristic (the input data 3004) that differs depending on a pressure stimulus applied according to the touch state 3003, an estimation layer may estimate an applied touch state 3003 from electrical resistance values of the conductive urethane 22. Therefore, it is sufficient for the learning processing to train the estimation layer.

The touch state estimation device 3001 described above may be realized by, for example, a computer executing a program that describes the various functions described above.

Figure 37:
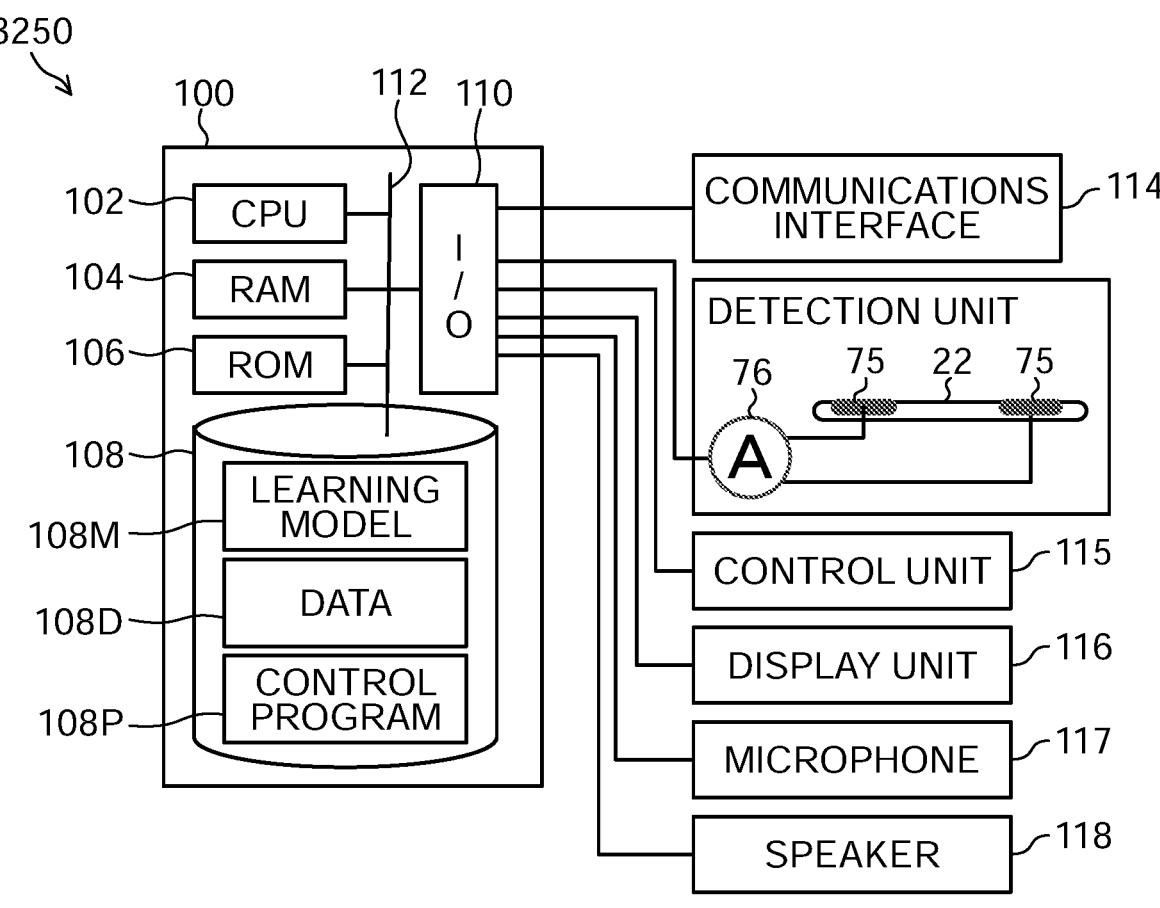
FIG. 37 is a diagram showing an example of structures of the touch state estimation device according to the third exemplary embodiment.

FIG. 37 shows an example of the control device 3250, which includes a computer serving as an execution device that executes processing realizing various functions of the touch state estimation device 3001.

The control device 3250 that functions as the touch state estimation device 3001 is equipped with the computer main body 100 shown in FIG. 37. The computer main body 100 is equipped with the CPU 102, RAM 104 of volatile memory or the like, ROM 106, auxiliary memory device 108 such as a hard disk drive (HDD) or the like, and input/output (I/O) interface 110. The CPU 102, RAM 104, ROM 106, auxiliary memory device 108 and input/output interface 110 are connected via the bus 112 to be capable of sending and receiving data and commands between one another. The communications interface 114 for communicating with external equipment is connected to the input/output interface 110. The communications interface 114 functions to acquire the input data 3004 (electrical resistances) from the robot 3002 that is equipped with the movable portion 3200 including the conductive urethane 22. That is, the communications interface 114 is a detection unit and is capable of acquiring the input data 3004 (electrical resistances) from the electrical characteristic detection unit 76 connected to the detection points 75 of the conductive urethane 22 disposed at the movable portion 3200 of the robot 3002.

The control unit 115 that is a keyboard or the like, the display unit 116 that is a display or the like, the microphone 117 for voice message inputs and the speaker 118 for voice message outputs are connected to the input/output interface 110.

The control program 108P for causing the computer main body 100 to function as the touch state estimation device 3001 that is an example of the estimation device of the present disclosure is memorized in the auxiliary memory device 108. The CPU 102 reads the control program 108P from the auxiliary memory device 108, loads the control program 108P into the RAM 104 and executes the processing. Hence, the computer main body 100 executing the control program 108P operates as the touch state estimation device 3001 that is an example of the estimation device of the present disclosure.

The learning model 108M including the learning model 3051 and the data 108D including various kinds of data are also memorized in the auxiliary memory device 108. The control program 108P may be provided on a recording medium such as a CD-ROM or the like.

Now, the estimation processing at the touch state estimation device 3001 that is executed by the computer is described.

FIG. 38 shows an example of a flow of the estimation processing according to the control program 108P executed by the computer main body 100.

When a power supply of the computer main body 100 is turned on, the estimation processing shown in FIG. 38 is executed by the CPU 102. That is, the CPU 102 reads the control program 108P from the auxiliary memory device 108, loads the control program 108P into the RAM 104 and executes the processing.

In step S3200, the CPU 102 acquires the learning model 3051 by reading the learning model 3051 from the learning model 108M of the auxiliary memory device 108 and loading the learning model 3051 into the RAM 104. More specifically, the network model (see FIG. 34 and FIG. 36) that is a collection of inter-node connections according to weight parameters manifested as the learning model 3051 is loaded into the RAM 104. Thus, the learning model 3051 manifested by the combination of inter-node connections according to the weight parameters is built.

In step S3202, the CPU 102 acquires an unknown set of the input data 3004 (electrical resistances), which is a target for estimating a touch state caused by a pressure stimulus applied to the conductive urethane 22, in a time series via the communications interface 114.

In step S3204, the CPU 102 uses the learning model 3051 acquired in step S3200 to estimate the output data 3006 (an unknown touch state) that corresponds to the input data 3004 (electrical resistances) acquired in step S3202.

In step S3206, the CPU 102 outputs the estimation result output data 3006 (a touch state) via the communications interface 114, outputs data such that sound is emitted from the speaker 118, outputs data for display at the display unit 116, and ends this processing routine.

The estimation processing shown in FIG. 38 is an example of processing that is executed in the estimation method of the present disclosure.

As described above, according to the present disclosure, a touch state of the movable portion 3200 on a target object may be estimated from the input data 3004 (electrical resistances) of the touch state 3003 that changes in accordance with a pressure stimulus against the conductive urethane 22. That is, an unknown touch state may be estimated without using special equipment or large equipment and without directly measuring deformation of a flexible member.

Because an electrical characteristic changes in accordance with touch states of the movable portion 3200 on target objects and characteristics of touch states are reflected by this electrical characteristic (time series electrical resistances), touch states of the movable portion 3200 on target objects may be estimated from the electrical resistance values of the conductive urethane 22 changing in time series. That is, even though the movable portion 3200 of the robot 3002 can be in various touch states, a suitable touch state may be estimated by using the learning model described above.

In the touch state estimation device 3001 according to the present exemplary embodiment, it is verified that, by using the learning model 3051 trained by the learning processing described above and inputting electrical characteristics of the conductive urethane 22, various touch states corresponding to the electrical characteristics may be estimated.

As described above, the present exemplary embodiment is described as employing the conductive urethane as an example of the flexible member. However, it is sufficient that the flexible member is a member with conductivity. It will be clear that the flexible member is not limited to conductive urethane.

The present exemplary embodiment is described as using the learning model 3051 trained by the learning processing described above and estimating various touch states that correspond to electrical characteristics of the conductive urethane 22. This exemplary embodiment concentrates on the detection of states in which a target object touches the exterior portion 27 as the touch states. The touch state estimation device 3001 may employ a functional section that detects when an electrical characteristic time series exceeds a pre-specified touch detection threshold as a touch detection device that detects touches of the robot 3002 on target objects.

Fourth Exemplary Embodiment

The meaning of the term "robot" as used in the present disclosure is intended to include a structure in which plural parts are coupled and at least one of the parts is movable. Examples of robots include nursing care robots, pet robots, guide dog robots, service dog robots and so forth; any robot that touches people may be a target. The term "user identification information" is intended to include information for uniquely identifying a user who is touching a robot and applying energy such as a pressure or the like to one or more parts structuring the robot.

The meaning of the term "flexible material" as used in the present disclosure is intended to include a material that is deformable such that at least a portion is warped by the application of an external force or the like, and includes soft resilient bodies of rubber materials and the like, structures that contain at least one of fiber-form and mesh-form frameworks, and structures inside which numerous microscopic bubbles are dispersed. Examples of external forces include pressures. Examples of structures that contain at least one of fiber-form and mesh-form frameworks and of structures in which numerous microscopic bubbles are dispersed include polymer materials such as urethanes. The meaning of the term "flexible material with enhanced conductivity" is intended to include materials with conductivity, and includes materials in which a conductive material is added to a flexible material to enhance conductivity and materials in which a flexible material is conductive. A flexible material with enhanced conductivity features the function of an electrical characteristic changing in accordance with a deformation. Examples of a physical quantity that activates the function of an electrical characteristic changing in accordance with a deformation include a pressure value representing a stimulus caused by a pressure applied to the flexible material (below referred to as a pressure stimulus). Examples of a physical quantity representing an electrical characteristic that changes in accordance with a deformation of the flexible material include an electrical resistance value. Alternative examples include a voltage value and a current value. An electrical resistance value may be taken to be a volume resistance value of the flexible material.

Because a flexible material is provided with conductivity, the flexible material manifests an electrical characteristic in response to deformations caused by pressure. That is, in a flexible material with enhanced conductivity, electrical pathways are complexly connected and the electrical pathways contract or expand in accordance with deformations. The flexible material may exhibit a behavior in which an electrical pathway is temporarily cut and a behavior that causes a different connection from a previous state. Therefore, the flexible material exhibits behaviors with an electrical characteristic between positions separated by a predetermined distance (for example, positions of detection points at which electrodes are disposed) varying in accordance with the size, distribution or the like of applied forces (for example, pressure stimuli). Therefore, the electrical characteristic changes in response to the size, distribution or the like of forces (for example, pressure stimuli) applied to the flexible material.

The estimation device according to the present disclosure uses a trained learning model to estimate identification information of a user, who is touching a robot and applying pressure to a flexible material, from an electrical characteristic of a conductive flexible material provided at the robot. As training data for respective users, the learning model uses time series of the electrical characteristic when pressures are applied to the conductive flexible material and identification information of the users touching the robot and applying pressure to the flexible material. The learning model is trained so as to input a time series of the electrical characteristic and output identification information of a user who corresponds to that time series of the electrical characteristic.

In the descriptions below, a situation is described in which a sheet member serving as the conductive flexible material is disposed at at least a portion of an external portion of a robot. In this sheet member (below referred to as conductive urethane), a conductive material is blended with all or at least a portion of a urethane member. Values (pressure values) representing pressure stimuli applied to the robot, which is to say to the flexible material, are employed as the physical quantity that deforms the conductive urethane. A situation is described in which electrical resistance values of the conductive urethane are employed as the physical quantity that changes in accordance with pressure stimuli.

FIG. 39 shows an example of structures of an identification information estimation device 4001 that serves as the estimation device of the present disclosure.

Estimation processing at the identification information estimation device 4001 uses a trained learning model 4051 to estimate and output identification information of an unknown user touching the robot 2 from an electrical characteristic of the conductive urethane 22 disposed at the robot 2. Each user touching the robot 2 (for example, a handshake or the like) has a characteristic touch state (for example, a manner of handshaking and the like). For example, a handshake of a user A, a handshake of a user B and so forth may be estimated from the electrical characteristic of the conductive urethane 22 by concentrating on deformations of the conductive urethane 22 according to touch state characteristics, that is, on differences in the electrical characteristic. Thus, identification information of a user may be estimated from the electrical characteristic of the conductive urethane 22. Therefore, identification information of a user may be estimated without using special equipment or large equipment and without directly measuring deformation of the exterior of the robot 2. The learning model 4051 is trained using touch states (for example, handshakes) and user identification information (for example, "user A") as labels and using the electrical characteristic of the conductive urethane (that is, electrical resistance values of the conductive urethane disposed at the robot 2) for the user identification information as inputs. Training of the learning model 4051 is described below.

Figure 40:
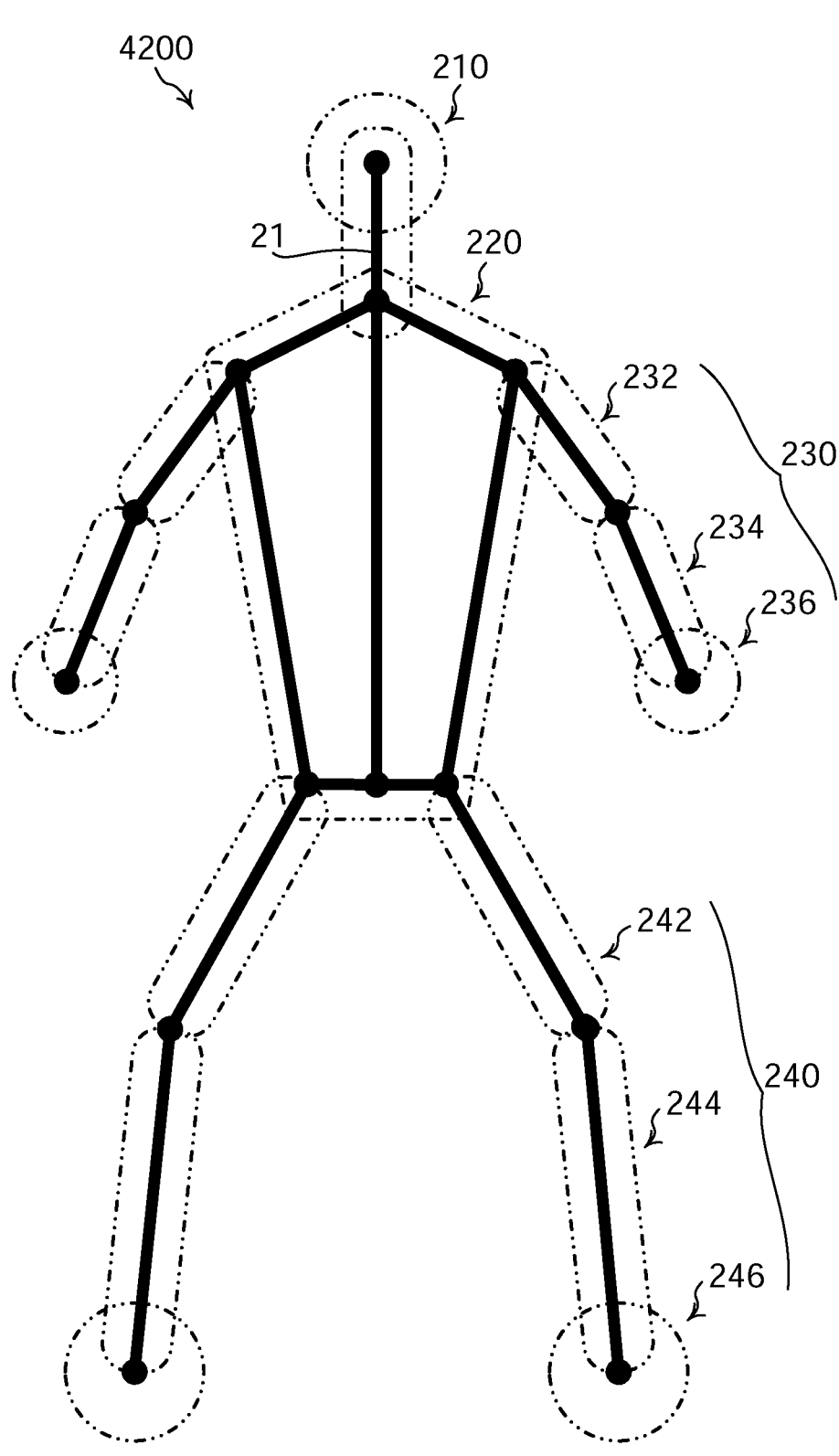
FIG. 40 is a diagram relating to a robot according to the fourth exemplary embodiment.

Now, structures of the robot 2 are described. FIG. 40 shows an example of robot structure of a nursing care robot 4200 that is formed in a humanoid shape. The humanoid nursing care robot 4200 is equipped with functions for, for example, mutual contact with users such as handshaking and the like, supporting autonomy of users, embracing users, supporting transfer movements of users and so forth. The nursing care robot 4200 is not restricted to a humanoid shape. It is sufficient that the nursing care robot 4200 is equipped with functions for touching and providing nursing care to users.

In the nursing care robot 4200 shown in FIG. 40, respective parts of the head portion 210, trunk portion 220, arm portions 230 (upper arms 232, forearms 234 and hands 236) and leg portions 240 (thighs 242, lower legs 244 and feet 246) are linked by the skeleton 21. In the nursing care robot 4200, the conductive urethane 22 is disposed around the skeleton 21. The conductive urethane 22 is disposed at the exterior at the outer side of the nursing care robot 4200. The conductive urethane 22 disposed at the robot 2 is connected to the electrical characteristic detection unit 76 (FIG. 8) via the detection points 75 that are electrodes or the like.

For example, as shown in a sectional diagram of an example of schematic structure of each upper arm 232 in FIG. 3, the inner layer 25 including structures such as an artificial muscle and the like is disposed around the skeleton 21 of the upper arm 232, and the exterior portion 27 that functions as a skin is disposed around the inner layer 25. The inner layer 25 is not necessary; the exterior portion 27 that functions as the skin may be disposed around the core member 21.

It is sufficient that the conductive urethane 22 is disposed at least at a portion of a material disposed around the skeleton 21, that is, the exterior portion 27. The conductive urethane 22 may be disposed inside and may be disposed outside the exterior portion 27 (FIG. 4). As a concrete example, the section A-A of the exterior portion 27 may be illustrated as the exterior section 27-1 in which the whole of the interior of the exterior portion 27 is constituted by the conductive urethane 22. As illustrated by the exterior section 27-2, the conductive urethane 22 may be formed at a portion of the outer side (surface side) of the exterior portion 27, and as illustrated by the exterior section 27-3, the conductive urethane 22 may be formed at the inner side (skeleton side) of the exterior portion 27. As illustrated by the exterior section 27-4, the conductive urethane 22 may be formed at a portion inside the exterior portion 27. As illustrated by the exterior section 27-5, the conductive urethane 22 may be disposed at the outer side of the material 27A with flexibility that constitutes the exterior portion 27, and as illustrated by the exterior section 27-6, the conductive urethane 22 may be disposed outside of the inner side (skeleton side) of the exterior portion 27. When the conductive urethane 22 is disposed outside of the material 27A constituting the exterior portion 27, the conductive urethane 22 and the material constituting the exterior portion 27 may simply be layered, or the conductive urethane 22 and the material constituting the exterior portion 27 may be integrated by adhesion or the like. Even when the conductive urethane 22 is disposed outside of the material constituting the exterior portion 27, because the conductive urethane 22 is a conductive urethane member, flexibility of the material constituting the exterior portion 27 is not impeded.

Figure 41:
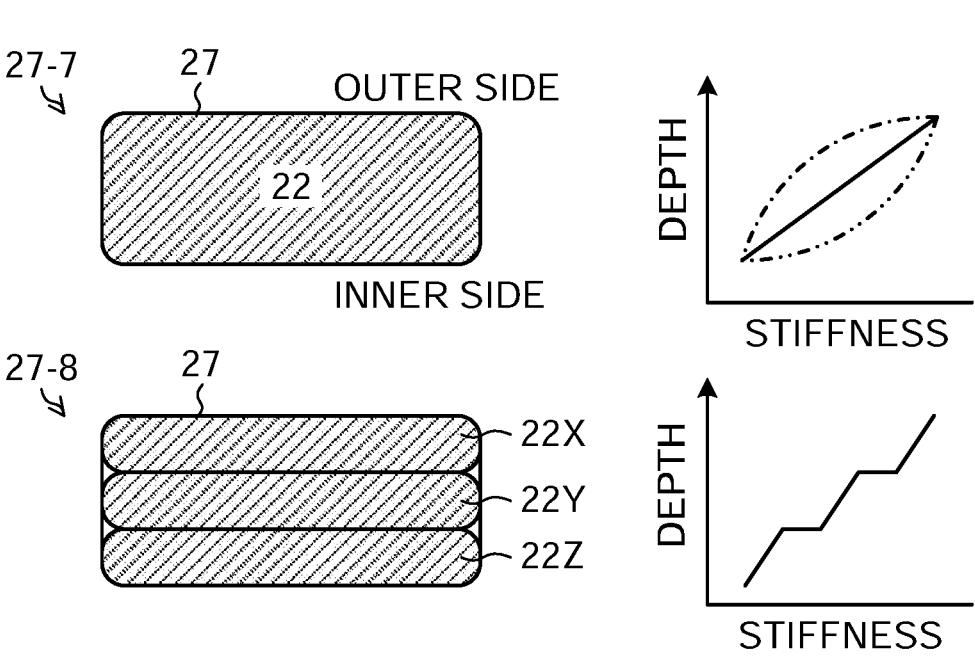
FIG. 41 is schematic diagrams relating to hardness of an exterior portion of the robot according to the fourth exemplary embodiment.

The conductive urethane 22 may be formed so as to have flexibility with predetermined stiffnesses. For example, as shown in FIG. 41, the conductive urethane 22 may be formed so as to have flexibility with the stiffness varying in accordance with depth. In the examples shown in FIG. 41, if the exterior portion 27 illustrated as the exterior section 27-7 is structured with the conductive urethane 22, the conductive urethane 22 may be formed such that that the stiffness progressively increases from the outer side (surface side) of the exterior portion 27 toward the inner side (skeleton side), that is, as the depth increases. As illustrated by the exterior section 27-8, plural conductive urethanes 22 with different thicknesses may be arranged (stiffnesses: 22X<22Y<22Z). With a structure such that the stiffness (flexibility) of the exterior portion 27 including the conductive urethane 22 varies in accordance with depth, a touch sensation similar to skin areas of the human body may be provided.

In order to simplify descriptions below, descriptions are given in which, as an example of the robot of the present disclosure, an autonomous nursing care robot system including a robot with the simplified shape shown in FIG. 6 is employed as the robot 2. The conductive urethane 22 is disposed around the skeleton 21 to serve as the exterior, which is the outer side of the robot 2, to form exterior portions of the robot 2.

As shown in FIG. 6, the head portion 210 of the robot 2 is structured with the display unit 211 and neck portion 212, and the trunk portion 220 is structured with the upper trunk 222 and lower trunk 224. Each arm portion 230 of the robot 2 is structured with the shoulder portion 231, limb portion 233 and hand 236, and the leg portion 240 is structured with the base portion 241 equipped with a movement mechanism that is not shown in the drawings. The head portion 210, trunk portion 220, arm portions 230 and leg portion 240 are linked by the skeleton 21.

In the robot 2 shown in FIG. 6, the exterior portion 27 including the conductive urethane 22 is disposed at respective outer sides of the trunk portion 220 (the upper trunk 222 and lower trunk 224), each arm portion 230 (the shoulder portion 231, limb portion 233 and hand 236) and the leg portion 240 (the base portion 241). The exterior portion 27 may be structured by a single sheet, and may be respectively disposed at each part. When the exterior portion 27 including the conductive urethane 22 is respectively disposed at each part, portions of the exterior portion 27 may be disposed so as to overlap. The conductive urethane 22 disposed at the robot 2 is connected to the electrical characteristic detection unit 76 (FIG. 8) via the detection points 75 that are electrodes or the like.

The limb portion 233 of each arm portion 230 is formed to be inflectable with the shoulder portion 231 as a pivot. In a structure in which the limb portion 233 of the arm portion 230 is formed to be inflectable, a member containing a resilient body that deforms linearly or nonlinearly may be employed. A resilient contraction body that produces a contraction force in a predetermined direction in response to an applied physical quantity (for example, a voltage, a supply of liquid or the like) can be mentioned as an example. As an example of a resilient contraction body, an airbag-type member of a publicly known type may be employed (for example, see Japanese Patent Application Publication No. S52-40378). An airbag-type resilient contraction body (for example, a rubber actuator) includes a main body in which an outer periphery of a tubular body structured of a soft resilient material, such as a rubber member or the like, is covered by a woven reinforcing structure of organic or inorganic polymer fibers, for example, aromatic polyamide fibers. Openings at both ends of the main body are sealed off by enclosing members. The rubber actuator deforms by expansion when a pressurized fluid is supplied to an internal cavity via a connection aperture provided in the enclosing members, producing a contracting force along the axial direction. Thus, this rubber actuator is changed in length by the expansion deformation. Note, however, that the rubber actuator is merely an example of an applicable target of the estimation device of the present disclosure; the estimation device is also applicable to members other than rubber actuators.

As illustrated in FIG. 7, the limb portion 233 of the robot 2 is inflected by driving of a resilient contraction member that is not shown in the drawing. A human arm may be imitated by operations of the limb portion 233.

Because the robot 2 is equipped with the unillustrated movement mechanism at the base portion 241, the robot 2 is movable. The control device 250 that controls the robot 2 is provided at the base portion 241 (FIG. 17). The control device 250 includes functional units that operate as the identification information estimation device 4001.

The robot 2 is equipped with the control unit 115, display unit 211, microphone 117 and speaker 118 (FIG. 17). Thus, commands from users, states of users, information on responses to users and the like may be acquired and supplied.

The robot 2 is equipped with the driving unit 119 (FIG. 17) for moving parts in accordance with the coupling of the skeleton 21 at portions other than the leg portion 240 including the base portion 241. By driving of the driving unit 119 (FIG. 17) moving respective parts or moving plural coupled parts, the robot 2 may maintain various postures and conduct various actions. Thus, the robot 2 operates as an autonomous nursing care robot system.

To estimate user identification information, the identification information estimation device 4001 detects an electrical characteristic of the conductive urethane 22 disposed at the robot 2.

As shown in FIG. 8, the electrical characteristic of the conductive urethane 22 (that is, volume resistance values, which are electrical resistance values) may be detected from signals from the plural (two in FIG. 8) detection points 75 that are disposed a distance apart. FIG. 8 illustrates a situation in which the conductive urethane 22 that is disposed as a portion of the exterior portion 27 is unfolded flat. FIG. 8 shows a detection set #1, in which the detection points 75 are offset to side edge portions of the conductive urethane 22, that detects an electrical resistance value from signals from the plural detection points 75, which are distanced apart and disposed at opposite corners of the conductive urethane 22. Arrangements of the plural detection points 75 are not limited to the positions shown in FIG. 8 but may be any positions provided those positions enable detection of the electrical characteristic of the conductive urethane 22. For example, it is sufficient that the plural detection points 75 are disposed apart. The detection points

75 are not limited to arrangements at side edge portions but may be at central portions, and may be in a combination of a side edge portion and a central portion. It is also sufficient that the electrical characteristic detection unit 76 that detects the electrical characteristic of the conductive urethane 22 (that is, volume resistance values that are electrical resistance values) is connected to and uses outputs from the detection points 75.

The electrical resistance values detected at the robot 2 that is equipped with the conductive urethane 22 at the exterior portion 27 change from before to after a deformation of the conductive urethane 22 caused by a deformation when a pressure stimulus is applied to the exterior portion 27 of the robot 2 or the like. Therefore, a touch by a user on the robot 2 may be detected by detecting electrical resistance values in a time series, that is, detecting a change in the electrical resistance values from a state in which no pressure stimulus is applied to the robot 2 (for example, detecting an electrical resistance value that exceeds a pre-specified threshold). More specifically, a touch state representing a user touch on the robot 2 accompanies a pressure stimulus. Thus, because the conductive urethane 22 is disposed at the robot 2, a user touch on the robot 2 may be detected. The electrical resistance value changes if any one of a position, distribution and size of a pressure stimulus applied to the robot 2 changes. Therefore, detecting touch states, including touch positions of users on the robot 2, from electrical resistance values changing in time series is conceivable.

The exterior portion 27 including the conductive urethane 22 formed at the robot 2 may be formed as an integrated structure in which the exterior portion 27 including the conductive urethane 22 is formed at the outer side of the robot 2, and the exterior portion 27 including the conductive urethane 22 may be formed separately at respective parts.

To improve a detection accuracy of the electrical characteristic at a single conductive urethane 22, a greater number of detection points than the (two) detection points shown in FIG. 8 may be used.

As examples, one row or a plural number of rows in which plural conductive urethane pieces at which the respective detection points are disposed may be arrayed to form the conductive urethane 22, and the electrical characteristic may be detected from each of the plural conductive urethane pieces. For example, the conductive urethane pieces 23 (FIG. 9) may be arrayed to form the conductive urethane 22 (FIG. 10 and FIG. 11). The example shown in FIG. 9 illustrates a first detection set #1 and a second detection set #2. The first detection set #1 detects an electrical resistance value according to signals from the detection points 75A that are distanced apart and disposed at opposite corner positions. The second detection set #2 detects an electrical resistance value according to signals from the detection points 75B that are distanced apart and disposed at the other opposite corner positions. In the example shown in FIG. 10, the conductive urethane pieces 23 (FIG. 9) are arrayed (4×1) in a length direction of the exterior portion 27 to form the conductive urethane 22, and the conductive urethane pieces 23, in sequence, constitute a first detection set #1 to an eighth detection set #8. In the example shown in FIG. 11 the first detection set #1 of each conductive urethane piece 23 (FIG. 9) is employed, and the conductive urethane pieces 23 are arrayed (4×2) in the length direction and a width direction of the exterior portion 27 to form the conductive urethane 22 and constitute a first detection set #1 to an eighth detection set #8.

As an alternative example, a detection range of the conductive urethane 22 may be segmented, detection points may be provided at each segmented detection range, and the electrical characteristic may be detected for each detection range. For example, specifying regions corresponding to the size of the conductive urethane pieces 23 shown in FIG. 10 and FIG. 11 as detection ranges, disposing detection points at each of the specified detection ranges, and detecting the electrical characteristic in each detection range is applicable.

As shown in FIG. 39, the identification information estimation device 4001 is equipped with an estimation unit 4005. The estimation unit 4005 inputs time series input data 4004 representing sizes of electrical resistance (electrical resistance values) of the conductive urethane 22. More specifically, the estimation unit 4005 inputs the electrical characteristic (that is, volume resistance values that are electrical resistance values) outputted from the electrical characteristic detection unit 76 connected to the detection points 75 of the conductive urethane 22. The input data 4004 corresponds to a touch state 4003 of a corresponding user of the robot 2. As an estimation result, the estimation unit 4005 outputs output data 4006 representing a physical quantity (a touch state value) that represents the touch state 4003 and user identification information associated with the touch state 4003. The estimation unit 4005 includes the trained learning model 4051.

The learning model 4051 is a model that has been trained to compute a touch state of a user on the robot 2 and identification information of a user associated with the touch state (the output data 4006) from electrical resistances (the input data 4004) of the conductive urethane 22 that are changed by a pressure stimulus according to the touch state 4003. The learning model 4051 is, for example, a model that defines a trained neural network, which is manifested as a collection of information of weights (strengths) of connections between nodes (neurons) structuring the neural network.

Figure 42:
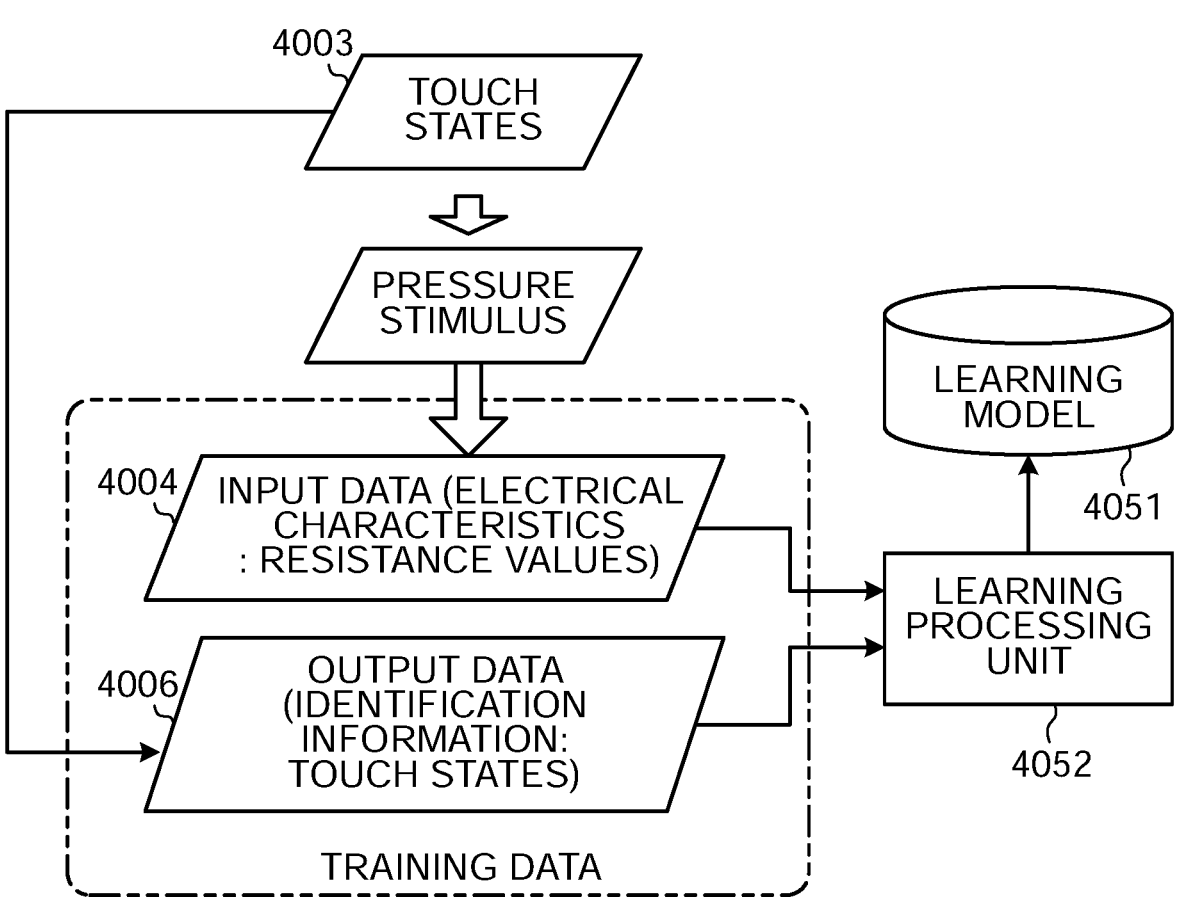
FIG. 42 is a diagram relating to learning processing according to the fourth exemplary embodiment.

The learning model 4051 is generated by learning processing at a learning processing unit 4052 (FIG. 42). The learning processing unit 4052 uses electrical characteristics of the conductive urethane 22 (the input data 4004) that change with pressure stimuli according to the touch states 4003 to conduct the learning processing. That is, the learning processing unit 4052 uses the touch states 4003 and user identification information associated with the touch states 4003 as labels and large amounts of data of time series measurements of electrical resistance of the conductive urethane 22 as training data. More specifically, the training data includes a large amount of sets of input data including electrical resistance values (the input data 4004) and information (the output data 4006) representing the touch states 4003 corresponding to the input data. The learning processing unit 4052 associates time series information by assigning information representing a measurement time to each electrical resistance value of the conductive urethane 22 (the input data 4004). This time series information may be associated by assigning the information representing measurement times to sets of time series electrical resistance values of the conductive urethane 22 in periods defined as the touch states 4003.

Now the learning processing unit 4052 is described.

In the learning processing conducted by the learning processing unit 4052, the exterior portion 27 of the robot 2 at which the conductive urethane 22 is disposed as described above is employed as a detection unit, and the touch states 4003, the user identification information associated with the touch states 4003, and electrical resistance values from the conductive urethane 22 (the input data 4004) are used as training data.

For example, touch states of users on the robot 2 and user identification information associated with the touch states are used as training data. In concrete terms, each user is instructed to touch the robot 2 in a predetermined posture or touch the robot 2 in association with a movement so as to produce a predetermined touch state in which energy such as a pressure or the like is applied to at least one of the parts. Electrical resistance values at these times are detected, are associated with the touch states and identification information of the users, and are used as training data. The exterior portion 27 is deformed by the energy such as pressure or the like being applied to the at least one part from the user, and electrical resistance values of the conductive urethane 22 change. Therefore, the electrical resistance values may be detected in time series, associated with the touch states (touch state values) and user identification information, and used as the training data. The learning model 4051 is trained so as to output identification information of a user in response to touch states of the user on each of plural different parts (regions).

The learning processing unit 4052 may be structured with a computer including a CPU, which is not shown in the drawings. The learning processing unit 4052 executes training data collection processing and learning processing. FIG. 43 shows an example of training data collection processing executed by the unillustrated CPU. In step S4100, the learning processing unit 4052 gives an instruction to attain a user touch state as described above. In step S4102, the learning processing unit 4052 acquires a time series of electrical resistance values of the conductive urethane 22 that change in accordance with a pressure stimulus according to the touch state. In step S4104, the learning processing unit 4052 assigns touch state information representing the touch state 4003 and user identification information to the acquired time series of electrical resistance values as a label and memorizes the same. The learning processing unit 4052 repeats the processing described above until a pre-specified number of sets of these touch state values, user identification information and electrical resistance values of the conductive urethane 22 is reached or until a pre-specified time has passed (results of the determination in step S4106 are negative until the result is affirmative). Thus, the learning processing unit 4052 may acquire and memorize electrical resistance values of the conductive urethane 22 in time series for the respective touch states 4003 for each user. The learning processing unit 4052 uses the memorized sets of time series of the electrical resistance values of the conductive urethane 22 for the respective touch states as the training data for each user.

The identification information estimation device 4001 may be equipped with a learning unit 4007. The learning unit 4007 collects new training data for each user from estimation results that are obtained using the learning model 4051 for estimation, and uses the collected training data for each user to continually train the learning model 4051. In other words, the identification information estimation device 4001 is equipped with a function for continuously self-teaching the learning model 4051. Thus, estimation accuracy of the user identification information may be further improved. The self-teaching by the learning unit 4007 is similar to the learning processing by the learning processing unit 4052.

Now, when the exterior portion 27 is urged in association with a pressure stimulus of a user touching the robot 2 or the like in a touch state, an electrical characteristic (electrical resistance values) changes to increase with larger urging forces (pushing forces) from an urged state in which the user touches the exterior portion 27. Therefore, at least an urged state in which a user touches the exterior portion 27 may be detected by detecting that an electrical characteristic time series exceeds a pre-specified threshold for touch detection. Accordingly, providing at least urged states in which users touch the exterior portion 27 are detected, using electrical characteristic time series corresponding to urging forces (pushing forces) that identify touching urged states as the training data is applicable.

FIG. 29 shows an example of an electrical characteristic of the limb portion 233 of the robot 2. FIG. 29 depicts an electrical characteristic of the conductive urethane 22 when the limb portion 233 of the robot 2 is pushed by a hand of a user with various urging forces (pushing forces with peak values P1 to P8). The peak values P1 to P7 are pressure stimuli that do not attain the level of a user touch, and the peak value P8 is a touch state when a user touches the limb portion 233.

As shown in FIG. 29, each of the electrical characteristic time series of the conductive urethane 22 (the electrical characteristics before, after and including the respective peak values P1 to P8) is a characteristic pattern of a touch state when the limb portion 233 is touched and urged in accordance with an urging force (pushing force) from a user. That is, a pattern in which the electrical resistance value rises sharply when the limb portion 233 is pushed by the hand of the user and the electrical resistance value falls steadily when the pressure is released (the hand of the user moves away) is manifested as a characteristic pattern. In the example shown in FIG. 29, the peak value P8 produces a larger electrical resistance value than the peak values P1 to P7. Therefore, urged states in which users touch the exterior portion 27 may be detected by setting an electrical resistance value exceeding the peak values P1 to P7 as a threshold th. Thus, the learning processing unit 4052 learns by using electrical characteristic time series corresponding to urging forces (pushing forces) that identify touching urged states as training data.

The characteristic patterns representing touch states differ depending on the user touching the robot 2. For example, a characteristic pattern representing a handshake with user A differs from a characteristic pattern representing a handshake with user B. Thuis, users may be identified from the characteristic patterns representing touch states.

Therefore, when a pressure stimulus at the robot 2 changes in accordance with a touch state and an electrical characteristic corresponding to the change of the pressure stimulus is acquired in a time series, the electrical characteristic time series may be associated with the user identification information associated with the touch state and memorized. Sets of these electrical characteristic time series, touch state values representing touch states, and user identification information associated with the touch state values may be used as the training data.

Now, an example of the training data described above is shown in tables. Table 6 is an example in which data associating time series electrical resistance value data (r) with touch state values and user identification information is used as training data. Table 7 is an example of data that, taking account of coupling of the parts of the robot 2, associates sets of characteristic data (J) representing time series electrical resistance values detected at the parts with touch state values and user identification information. These sets include characteristics of touch states for each included characteristic data (J), that is, a characteristic pattern. The respective sets of characteristic data (J) are all used as training data. For example, the plural sets of characteristic data (J) detected at the robot 2, touch state values (in Table 7, "embrace with both arms", which is a value representing an action by the robot on a user), and user identification information (in Table 7, a value shown as "user A") are used as training data.

TABLE 6

| Time series electrical resistance value data | Identification information (touch state) |
|---|---|
| r11, r12, r13, . . . r1n | User A (handshake) |
| r21, r22, r23, . . . r2n | User B (handshake) |
| r31, r32, r23, . . . r3n | User C (handshake) |
| r41, r42, r43, . . . r4n | . . . |
| . . . | . . . |

TABLE 7

| No | Time series electrical resistance value data | Identification information (touch state) |
|---|---|---|
| 1 | Characteristic data of head portion (J1) | User A (embrace with both arms) |
| | Characteristic data of right arm portion (J2) | |
| | Characteristic data of left arm portion (J3) | |
| | Characteristic data of trunk portion (J4) | |
| | Characteristic data of leg portion (J5) | |
| . . . . . . | | . . . |

Figure 44:
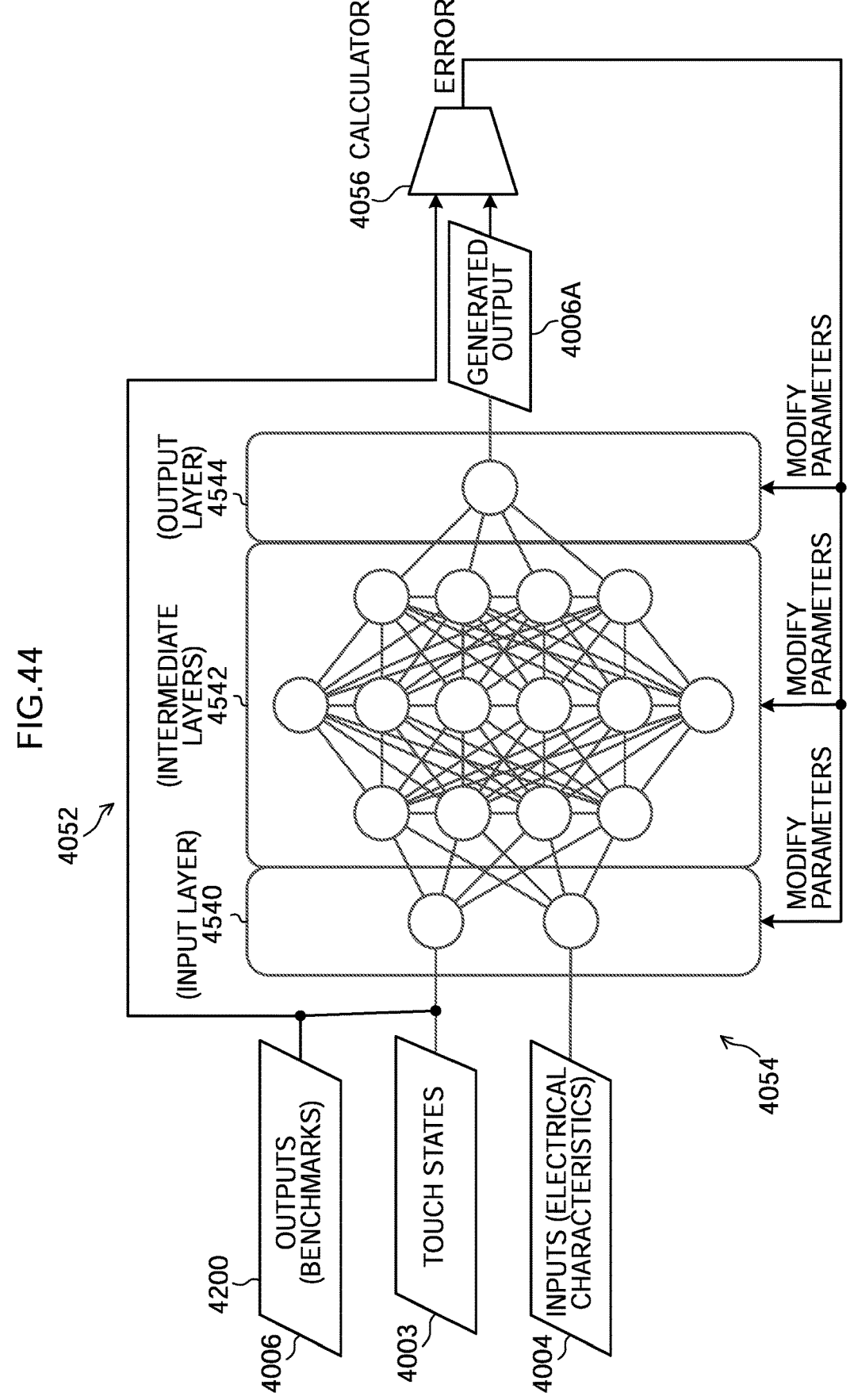
FIG. 44 is a diagram relating to learning processing at a learning processing unit according to the fourth exemplary embodiment.

Now, the learning processing at the learning processing unit 4052 is described. FIG. 44 is a diagram showing functions of the unillustrated CPU of the learning processing unit 4052 in the learning processing.

The unillustrated CPU of the learning processing unit 4052 includes a generator 4054 and a calculator 4056 as functional sections. The generator 4054 features a function of generating outputs in consideration of inputs that are before-and-after relationships of electrical resistance values acquired in time series.

As training data, the learning processing unit 4052 retains numerous sets of the input data 4004 described above (electrical resistance values) and the output data 4006 that is the touch states 4003 corresponding to the input data 4004 (electrical resistance values) and user identification information.

The generator 4054 includes an input layer 4540, intermediate layers 4542 and an output layer 4544, constituting a publicly known neural network (NN). Because a neural network is a publicly known technology, detailed descriptions are not given here. However, the intermediate layers 4542 include numerous node groups (neuron groups) with inter-node connections and feedback connections. Data is inputted from the input layer 4540 to the intermediate layers 4542 and data of computation results from the intermediate layers 4542 is outputted to the output layer 4544.

The generator 4054 is a neural network that generates generated output data 4006A representing identification information of a user from the inputted input data 4004 (electrical resistances). The generated output data 4006A is data in which a touch state and user identification information are estimated from the input data 4004 (electrical resistances). The generator 4054 generates generated output data representing a state close to a touch state from the input data 4004 (electrical resistances) inputted in a time series. By learning using numerous sets of the input data 4004 (electrical resistances), the generator 4054 becomes capable of generating the generated output data 4006A to be close to a touch state in which a pressure stimulus is applied to the robot 2, that is, the conductive urethane 22. From another perspective, the electrical characteristics that are the input data 4004 inputted in time series may be understood as patterns. By learning these patterns, the generator 4054 becomes capable of generating the generated output data 4006A close to a touch state in which a pressure stimulus is applied to the robot 2, which is to say the conductive urethane 22.

The calculator 4056 compares the generated output data 4006A with the output data 4006 of the training data, and calculates an error in the comparison results. The learning processing unit 4052 inputs the generated output data 4006A and the output data 4006 of the training data to the calculator 4056. In response, the calculator 4056 calculates an error between the generated output data 4006A and the output data 4006 of the training data, and outputs signals representing the calculation results.

On the basis of the error calculated by the calculator 4056, the learning processing unit 4052 tunes weight parameters of the inter-node connections to train the generator 4054. More specifically, weight parameters of inter-node connections between the input layer 4540 and the intermediate layers 4542 of the generator 4054, weight parameters of inter-node connections in the intermediate layers 4542, and weight parameters of inter-node connections between the intermediate layers 4542 and the output layer 4544 are respectively fed back to the generator 4054 using a technique such as, for example, gradient descent, error back propagation or the like. That is, connections between all the nodes are optimized so as to minimize differences between the generated output data 4006A and the training data output data 4006, using the training data output data 4006 as benchmarks.

The learning model 4051 is generated by the learning processing of the learning processing unit 4052. The learning model 4051 is manifested by the learning processing unit 4052 as a collection of information of weight parameters (weights or strengths) of inter-node connections of training results.

Figure 45:
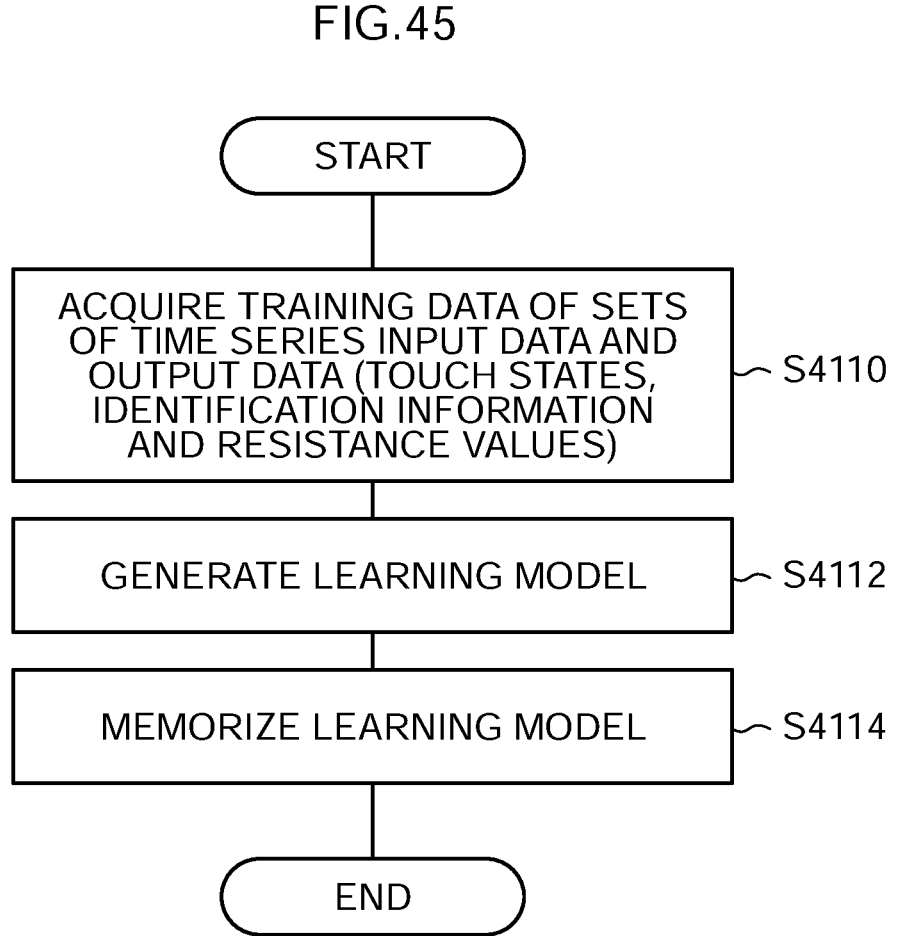
FIG. 45 is a flowchart showing an example of a flow of learning processing according to the fourth exemplary embodiment.

FIG. 45 shows an example of flow of the learning processing. In step S4110, the learning processing unit 4052 acquires the input data 4004 (electrical resistances) labeled with information representing touch states and user identification information, which is the training data of results measured in time series. In step S4112, the learning processing unit 4052 uses the training data of results measured in time series to generate the learning model 4051. That is, the learning processing unit 4052 obtains a collection of information of weight parameters (weights or strengths) of inter-node connections of the training results that is trained using the numerous sets of training data as described above. In step S4114, the learning processing unit 4052 memorizes data manifested as the collection of information of weight parameters (weights or strengths) of inter-node connections of the training results to serve as the learning model 4051.

The generator 4054 may also use a recurrent neural network with a function that generates outputs with consideration to before-and-after relationships of the time series inputs, or may use an alternative method.

In the identification information estimation device 4001 described above, the trained generator 4054 (that is, the data manifested as a collection of information of weight parameters of inter-node connections of training results) generated by the method of which an example is illustrated above is used as the learning model 4051. When the learning model 4051 that is used is sufficiently trained, identifying touch states and user identification information from time series electrical resistance values of the conductive urethane 22 disposed at the robot 2, which is to say the exterior portion 27, is conceivable.

The processing carried out by the learning processing unit 4052 is an example of processing of the learning model generation device of the present disclosure. The identification information estimation device 4001 is an example of the estimation unit and the estimation device of the present disclosure. The output data 4006 that is information representing the touch states 4003 and user identification information is an example of identification information of the present disclosure.

As described above, in the conductive urethane 22 electrical pathways are complexly connected as described above. The conductive urethane 22 exhibits behaviors such as contractions and extensions of the electrical pathways, temporary cut-offs and new connections in accordance with deformations, and consequently exhibits behaviors with electrical characteristics that differ depending on applied forces (for example, pressure stimuli). This means the conductive urethane 22 may be treated as a reservoir storing data relating to deformations of the conductive urethane 22. That is, the identification information estimation device 4001 may employ the conductive urethane 22 in a neural network (below referred to as a PRCN) known as physical reservoir computing (PRC). Because PRC and a PRCN are publicly known technologies, detailed descriptions are not given here. That is, PRC and a PRCN are excellently applicable to estimation of information relating to deformations of the conductive urethane 22.

Figure 46:
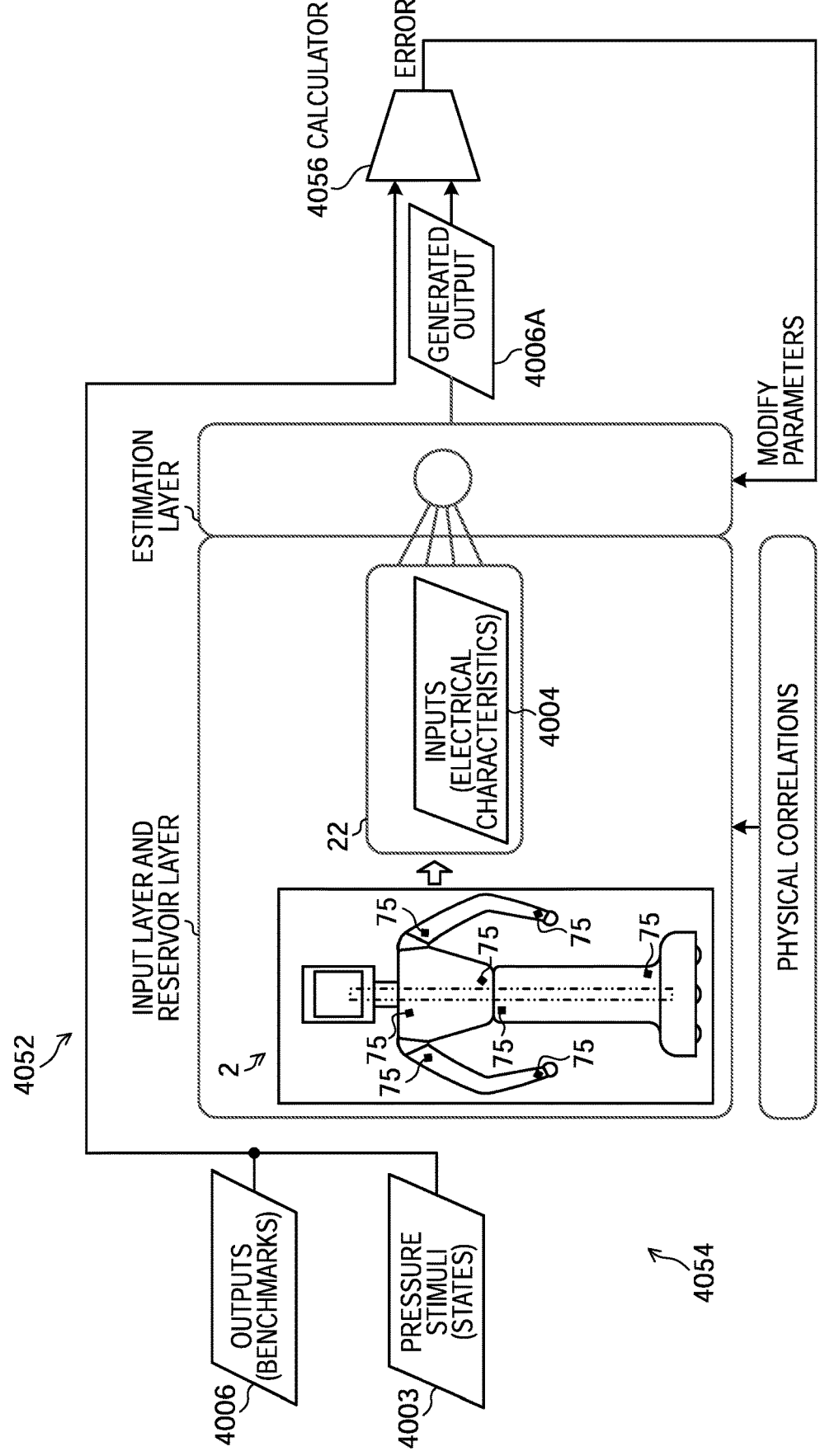
FIG. 46 is a diagram relating to learning processing at the learning processing unit according to the fourth exemplary embodiment.

FIG. 46 shows an example of the learning processing unit 4052 treating the robot 2 including the conductive urethane 22 as a reservoir that stores data relating to deformations of the robot 2 including the conductive urethane 22 for training. The conductive urethane 22 has an electrical characteristic (electrical resistance values) corresponding to each of numerous pressure stimuli. Thus, the conductive urethane 22 functions as an input layer that inputs electrical resistance values, and functions as a reservoir layer that stores data relating to deformations of the conductive urethane 22. Because the conductive urethane 22 outputs an electrical characteristic (the input data 4004) that differs depending on a pressure stimulus applied according to the touch state 4003, an estimation layer may estimate the applied touch state 4003 from electrical resistance values of the conductive urethane 22. Therefore, it is sufficient for the learning processing to train the estimation layer.

The identification information estimation device 4001 described above may be realized by, for example, a computer executing a program that describes the various functions described above.

FIG. 17 shows an example of the control device 250, which includes a computer serving as an execution device that executes processing to realize various functions of the identification information estimation device 4001.

The control device 250 that functions as the identification information estimation device 4001 is equipped with the computer main body 100 shown in FIG. 17. The computer main body 100 is equipped with the CPU 102, RAM 104 of volatile memory or the like, ROM 106, auxiliary memory device 108 such as a hard disk drive (HDD) or the like, and input/output (I/O) interface 110. The CPU 102, RAM 104, ROM 106, auxiliary memory device 108 and input/output interface 110 are connected via the bus 112 to be capable of sending and receiving data and commands between one another. The communications interface 114 for communicating with external equipment is connected to the input/ output interface 110. The communications interface 114 functions to acquire the input data 4004 (electrical resistances) from the robot 2 including the conductive urethane 22. That is, the communications interface 114 is a detection unit and is capable of acquiring the input data 4004 (electrical resistances) from the electrical characteristic detection unit 76 connected to the detection points 75 of the conductive urethane 22 disposed at the robot 2.

The control unit 115 that is a keyboard or the like, the display unit 211 that is a display or the like, the microphone 117 for voice message inputs, the speaker 118 for voice message outputs, and the driving unit 119 are connected to the input/output interface 110. The display unit 211 is disposed at the head portion 210 of the robot 2. The control unit 115, microphone 117 and speaker 118 are, for example, disposed in the interior (not shown in the drawings) of the trunk portion 220 of the robot 2. The driving unit 119 is disposed so as to drive to enable movements of parts (not shown in the drawings) in accordance with coupling of the skeleton 21 of the robot 2.

The control program 108P for causing the computer main body 100 to function as the identification information estimation device 4001 that is an example of the estimation device of the present disclosure is memorized in the auxiliary memory device 108. The CPU 102 reads the control program 108P from the auxiliary memory device 108, loads the control program 108P into the RAM 104 and executes the processing. Hence, the computer main body 100 executing the control program 108P operates as the identification information estimation device 4001 that is an example of the estimation device of the present disclosure.

The learning model 108M including the learning model 4051 and the data 108D including various kinds of data are also memorized in the auxiliary memory device 108. The control program 108P may be provided on a recording medium such as a CD-ROM or the like.

Now, the estimation processing at the identification information estimation device 4001 that is executed by the computer is described.

Figure 47:
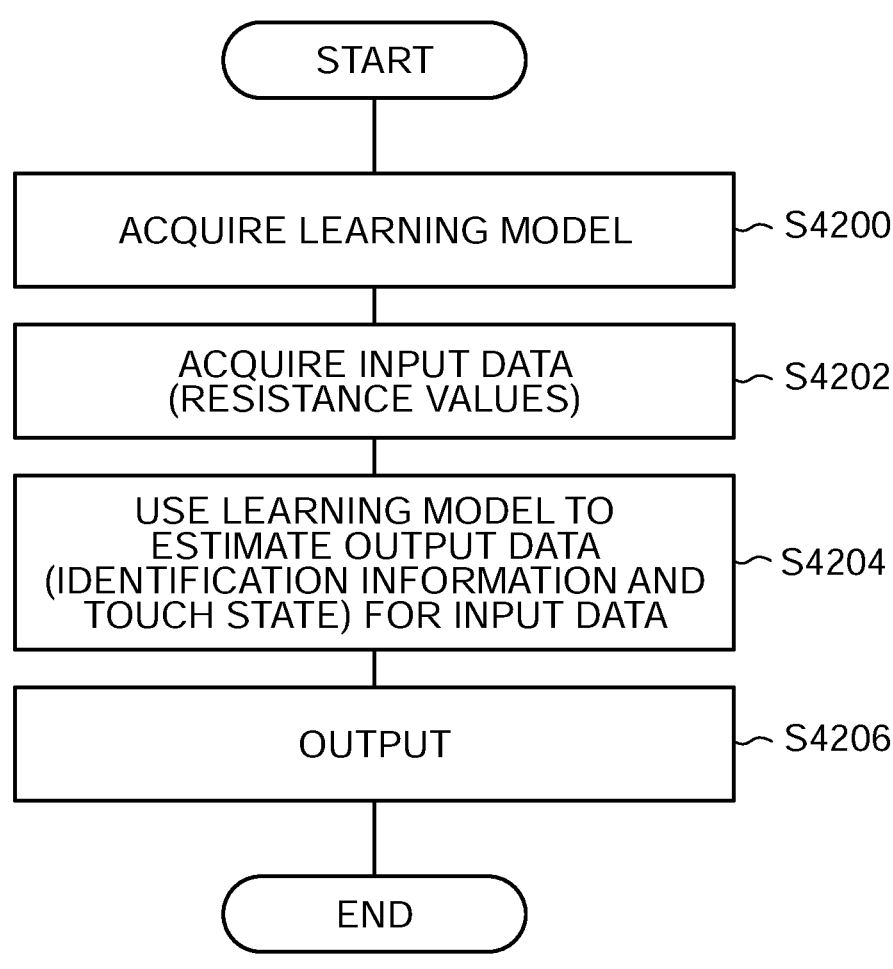
FIG. 47 is a flowchart showing an example of a flow of estimation processing according to the fourth exemplary embodiment.

FIG. 47 shows an example of a flow of the estimation processing according to the control program 108P executed by the computer main body 100.

When a power supply of the computer main body 100 is turned on, the estimation processing shown in FIG. 47 is executed by the CPU 102. That is, the CPU 102 reads the control program 108P from the auxiliary memory device 108, loads the control program 108P into the RAM 104 and executes the processing.

In step S200, the CPU 102 acquires the learning model 4051 by reading the learning model 4051 from the learning model 108M of the auxiliary memory device 108 and loading the learning model 4051 into the RAM 104. More specifically, the network model (see FIG. 44 and FIG. 46) that is a collection of inter-node connections according to weight parameters manifested as the learning model 4051 is loaded into the RAM 104. Thus, the learning model 4051 manifested by the combination of inter-node connections according to the weight parameters is built.

In step S4202, the CPU 102 acquires an unknown set of the input data 4004 (electrical resistances), which is a target for estimating a touch state caused by a pressure stimulus applied to the conductive urethane 22 and user identification information, in a time series via the communications interface 114.

In step S4204, the CPU 102 uses the learning model 4051 acquired in step S4200 to estimate the output data 4006 (an unknown touch state and user identification information)

that corresponds to the input data 3004 (electrical resistances) acquired in step S4202.

In step S4206, the CPU 102 outputs the estimation result output data 4006 (a touch state and user identification information) via the communications interface 114, outputs data such that sound is emitted from the speaker 118, outputs data for display at the display unit 211, and ends this processing routine.

The estimation processing shown in FIG. 47 is an example of processing that is executed in the estimation method of the present disclosure.

As described above, according to the present disclosure, the touch state 4003 and user identification information for a corresponding user may be estimated from the input data 4004 (electrical resistances) of the touch state 4003 of the user that changes in accordance with a pressure stimulus against the conductive urethane 22. That is, an unknown touch state and user identification information may be estimated without using special equipment or large equipment and without directly measuring deformation of a flexible member.

Because an electrical characteristic changes in accordance with touch states of respective users and characteristics of touch states are reflected by this electrical characteristic (time series electrical resistances), touch states and user identification information may be estimated from the electrical resistance values of the conductive urethane 22 changing in time series. That is, even though the robot 2 can be in various touch states, a suitable touch state and user identification information may be estimated by using the learning model described above.

In the identification information estimation device 4001 according to the present exemplary embodiment, it is verified that, by using the learning model 4051 trained by the learning processing described above and inputting electrical characteristics of the conductive urethane 22, various users and touch states corresponding to the electrical characteristics may be estimated.

As described above, the present exemplary embodiment is described as employing the conductive urethane as an example of the flexible member. However, it is sufficient that the flexible member is a member with conductivity. It will be clear that the flexible member is not limited to conductive urethane.

The present exemplary embodiment is described as using the learning model 4051 trained by the learning processing described above and estimating various users and touch states corresponding to the electrical characteristic of the conductive urethane 22. This exemplary embodiment concentrates on the detection of urged states in which a user touches the exterior portion 27 as the touch states. The identification information estimation device 4001 may employ a functional section that detects when an electrical characteristic time series exceeds a pre-specified touch detection threshold as a touch detection device that detects touches of users on the robot 2.

Fifth Exemplary Embodiment

The meaning of the term "body" as used in the present disclosure is intended to include one or more of a person or object that may apply a stimulus according to a physical quantity to a target object. In the descriptions below, the one or more of a person or object is not distinguished but collectively referred to as a body, conceptually encompassing people and things. That is, one of either of people and objects and combinations of people and objects are collectively referred to as a body.

A flexible material with enhanced conductivity that applies the technology of the present disclosure and state estimation processing that uses the flexible material to estimate a state of an application side of the flexible material are described with reference to FIG. 48 to FIG. 54.

—Flexible Material—

The meaning of the term "flexible material" as used in the present disclosure is intended to include a material that is deformable such that at least a portion is warped, and includes soft resilient bodies of rubber materials and the like, structures that contain fiber-form or mesh-form frameworks, and structures inside which numerous microscopic bubbles are dispersed. Examples of these structures include polymer materials such as urethanes. The term "flexible material with enhanced conductivity" is used in the present disclosure. The meaning of the term "flexible material with enhanced conductivity" is intended to include materials with conductivity, and includes materials in which a conductive material is added to a flexible material to enhance conductivity and materials in which a flexible material is conductive. A polymer material such as a urethane or the like is excellent as a flexible material with enhanced conductivity. In the descriptions below, as an example of a flexible material with enhanced conductivity, a material formed by blending and permeating (or "impregnating") a conductive material into all or a portion of a urethane material is referred to as conductive urethane and described. The conductive urethane may be formed by any method of blending and permeating (impregnating) a conductive material, may be formed by blending or permeating (impregnating) a conductive material, and may be formed by a combination of blending and permeating (impregnating) a conductive material. For example, when a conductive urethane formed by permeating (impregnating) has higher conductivity than a conductive urethane formed by blending, forming a conductive urethane by permeating (impregnating) is preferable.

The conductive urethane features the function of an electrical characteristic changing in accordance with an applied physical quantity. Examples of a physical quantity that activates the function of an electrical characteristic changing include a stimulus value due to a pressure value that represents a stimulus caused by a pressure deforming the structure, such as warping or the like (below referred to as a pressure stimulus). Pressure stimuli include pressures on predetermined locations and pressure applications according to distributions of pressure in a predetermined range. Alternative examples of the physical quantity include stimulus values such as water amounts and the like that represent stimuli (below referred to as material stimuli) that change (transform) a property of a material in accordance with a water inclusion amount, water application or the like. The electrical characteristic of the conductive urethane changes in response to an applied physical quantity. Examples of a physical quantity representing this electrical characteristic include an electrical resistance value. Alternative examples include a voltage value and a current value.

When conductivity is applied to a flexible material with a predetermined volume, the conductive urethane manifests an electrical characteristic (that is, a change in electrical resistance value) in response to applied physical quantities. This electrical resistance value may be understood to be a volume resistance value of the conductive urethane. Electrical pathways are complexly connected in the conductive urethane. The electrical pathways extend, contract or expand in accordance with, for example, deformations. The conductive urethane may exhibit a behavior in which an electrical pathway is temporarily cut and a behavior that causes a different connection from a previous state. Therefore, the conductive urethane exhibits behaviors by an electrical characteristic between positions separated by a predetermined distance (for example, positions of detection points at which electrodes are disposed) varying with deformations and transformations in accordance with the size and distribution of stimuli according to applied physical quantities (pressure stimuli and material stimuli). Therefore, the electrical characteristic changes in accordance with the size and distribution of stimuli according to physical quantities applied to the conductive urethane.

Because the conductive urethane is used, there is no need to provide detection points such as electrodes or the like at target locations of deformations or transformations. It is sufficient to provide detection points such as electrodes or the like at two or more arbitrary locations sandwiching locations at which stimuli according to physical quantities are applied to the conductive urethane (for example, FIG. 48).

To improve a detection accuracy of the electrical characteristic of the conductive urethane, a greater number of detection points than two may be used. As the conductive urethane of the present disclosure, the conductive urethane 22 shown in FIG. 48 may be formed as a single conductive urethane piece and may be formed as a conductive urethane group in which plural conductive urethane pieces are arrayed, in which case the electrical characteristic may be detected at each of the plural conductive urethane pieces or the electrical characteristics of the plural conductive urethane pieces may be combined and detected. When the electrical characteristic is detected at each of the plural conductive urethane pieces, an electrical characteristic such as electrical resistance values or the like may be detected at the respective arrangement positions (for example, detection sets #1 to #n). As an alternative example, a detection range of the conductive urethane 22 may be segmented, detection points may be provided at each segmented detection range, and the electrical characteristic may be detected for each detection range.

—Estimation Device—

Now, an example of an estimation device that uses the conductive urethane to estimate states at the application side of the conductive urethane is described.

Figure 48:
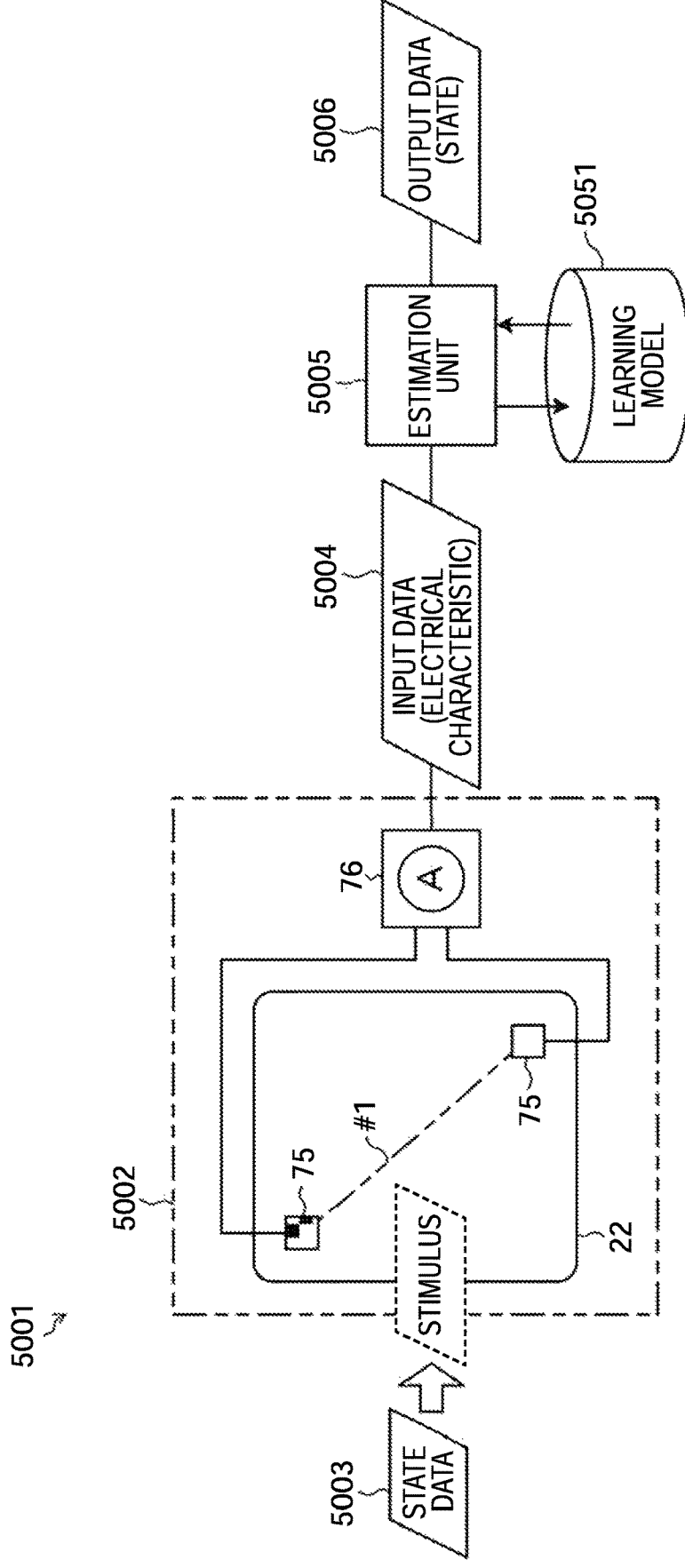
FIG. 48 is a diagram showing structures of an estimation device according to a fifth exemplary embodiment.

FIG. 48 shows an example of structures of an estimation device 5001 that is capable of executing estimation processing to estimate a state of the application side. The estimation device 5001 is provided with an estimation unit 5005, and is connected to a subject 5002 such that an electrical characteristic of the conductive urethane 22 can be inputted to the estimation unit 5005. The estimation device 5001 estimates a state of the application side of the conductive urethane 22, which is included at the subject 5002. The estimation device 5001 may be manifested by a computer equipped with a CPU that serves as an execution device executing the processing described below.

Deformations and transformations of the conductive urethane described above are caused by physical quantities applied to the conductive urethane in time series. A physical quantity applied in time series depends on a state at the application side. Therefore, an electrical characteristic of the conductive urethane that changes in time series corresponds to a state at the application side of a physical quantity applied to the conductive urethane. For example, when a pressure stimulus that deforms the conductive urethane or a material stimulus that transforms the conductive urethane is applied, the electrical characteristic of the conductive urethane that changes in time series corresponds to the state at the application side, representing a position, distribution and size of the pressure stimulus. Therefore, the state at the application side of the conductive urethane may be estimated from the electrical characteristic of the conductive urethane changing in time series.

At the estimation device 5001, a trained learning model 5051 is used to estimate and output an unknown state of the application side by the estimation processing described below. Thus, a state at the application side of the subject 5002 may be identified without using special equipment or large equipment and without directly measuring deformation or transformation of the conductive urethane 22 included at the subject. The learning model 5051 is trained using states at the application side of the subject 5002 and electrical characteristics of the subject 5002 (that is, electrical characteristics such as electrical resistance values or the like of the conductive urethane 22 disposed at the subject 5002) as inputs. Training of the learning model 5051 is described below.

Figure 49:
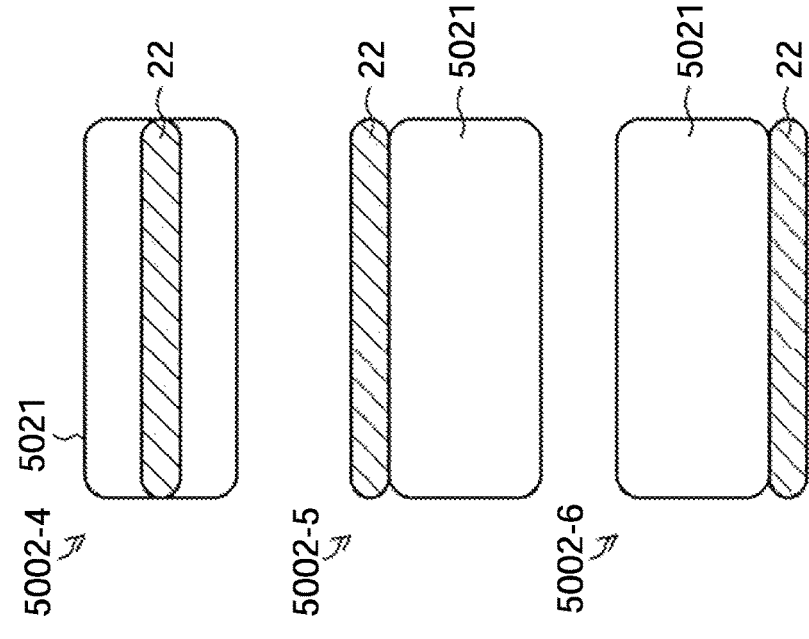
FIG. 49 is diagrams showing arrangements of conductive urethane according to the fifth exemplary embodiment.

The conductive urethane 22 may be disposed at a member 5021 that has flexibility and may structure the subject 5002 (FIG. 49). The subject 5002 that is structured by the member 5021 at which the conductive urethane 22 is disposed includes the electrical characteristic detection unit 76. It is sufficient that the conductive urethane 22 is disposed at least at a portion of the member 5021. The conductive urethane 22 may be disposed inside and may be disposed outside the member 5021. It is sufficient that the conductive urethane is disposed to enable estimation of states of the application side of the conductive urethane. For example, the conductive urethane may be disposed to be capable of touching a body directly, indirectly or both.

FIG. 49 is diagrams showing arrangements of the conductive urethane 22 at the subject 5002. A section A-A of the subject 5002 is shown as an object section 5002-1, and the conductive urethane 22 may be formed so as to fill the whole of the interior of the member 5021. As illustrated by a subject section 5002-2, the conductive urethane 22 may be formed at one side (a surface side) of the interior of the member 5021, and as illustrated by a subject section 5002-3, the conductive urethane 22 may be formed at the other side (back face side) of the interior of the member 5021. As illustrated by a subject section 5002-4, the conductive urethane 22 may be formed at a portion of the interior of the member 5021. As illustrated by a subject section 5002-5, the conductive urethane 22 may be segmented and disposed at the outer side of the surface side of the member 5021, and as illustrated by a subject section 5002-6, the conductive urethane 22 may be disposed outside of the other side (back face side). When the conductive urethane 22 is disposed outside of the member 5021, the conductive urethane 22 and the member 5021 may simply be layered, or the conductive urethane 22 and the member 5021 may be integrated by adhesion or the like. Even when the conductive urethane 22 is disposed outside of the member 5021, because the conductive urethane 22 is a conductive urethane member, flexibility of the member 5021 is not impeded.

As shown in FIG. 48, the electrical characteristic of the conductive urethane 22 (that is, volume resistance values, which are electrical resistance values) is detected from signals from at least two of the detection points 75 that are disposed a distance apart. The example in FIG. 48 shows an example of a detection set #1 that detects the electrical characteristic (time series electrical resistance values) from signals from the two detection points 75, which are disposed at opposite corners of the conductive urethane 22. Numbers and arrangements of the detection points 75 are not limited to the positions shown in FIG. 48 but may be three or more and may be at any positions provided those positions enable detection of the electrical characteristic of the conductive urethane 22. It is sufficient that the electrical characteristic detection unit 76 that detects the electrical characteristic of the conductive urethane 22 (that is, volume resistance values that are electrical resistance values) is connected to the detection points 75 and uses outputs of the electrical characteristic.

Because the conductive urethane 22 is used as a sensor in the present exemplary embodiment, discomfort caused to a body when, for example, the body is interposed is much less than with a conventional sensor. Therefore, a state of the application side in relation to the body during measurement is not adversely affected; measurement and state estimation of the application side may be conducted simultaneously. This is an advantage over a conventional sensor that performs measurement and state estimation of the application side separately, and is a particularly significant advantage in estimation by measurement and evaluation over a long duration following a time series change.

The estimation unit 5005 is a functional unit that is connected to the subject 5002 and uses the learning model 5051 to estimate a state at the application side on the basis of the electrical characteristic that changes in accordance with at least one of deformation and transformation of the conductive urethane 22. More specifically, the estimation unit 5005 inputs the time series input data 5004 representing sizes of electrical resistances (electrical resistance values) of the conductive urethane 22. The input data 5004 corresponds with state data 5003 representing states at the application side of the subject 5002, for example, states relating to behavior of bodies touching the subject 5002 such as postures, movements and the like of the bodies. When, for example, a body touches the subject 5002, the body touches in a certain state of posture or the like. In accordance with this state, a stimulus (at least one of pressure stimulus and material stimulus) is applied as a physical quantity to the conductive urethane 22 structuring the subject 5002, and the electrical characteristic of the conductive urethane 22 changes. As a result, the electrical characteristic of the conductive urethane 22 changes in a time series represented by the input data 5004 and the electrical characteristic corresponds with a state of the application side of the subject 5002, that is, of the conductive urethane 22. The estimation unit 5005 uses the trained learning model 5051 to output, as an estimation result, output data 5006 representing the state of the application side that corresponds to the electrical characteristic of the conductive urethane 22 changing in the time series.

The learning model 5051 is a model that has been trained to compute the output data 5006 representing a state of the application side from electrical resistances (the input data 5004) of the conductive urethane 22 that are changed by a stimulus (pressure stimulus or material stimulus) applied as a physical quantity. The learning model 5051 is, for example, a model that defines a trained neural network, which is manifested as a collection of information of weights (strengths) of connections between nodes (neurons) structuring the neural network.

—Learning Processing—

Now, learning processing that generates the learning model 5051 is described.

Figure 50:
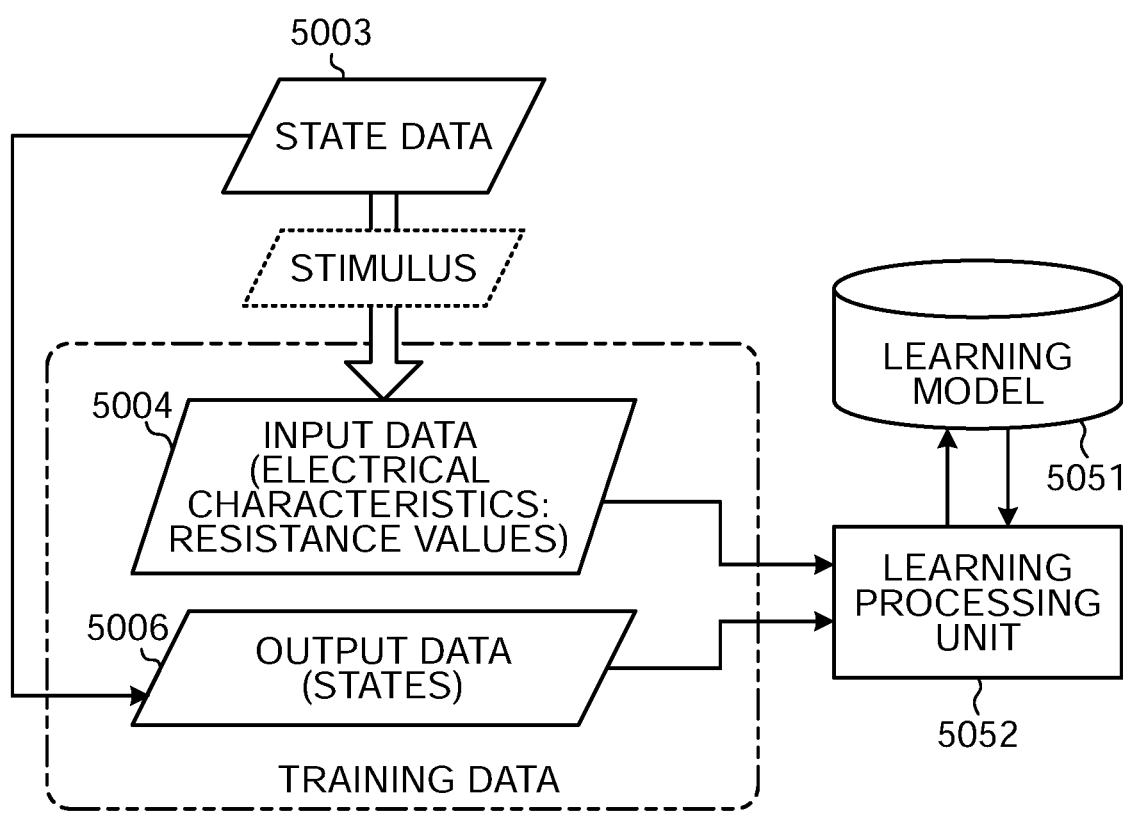
FIG. 50 is a diagram showing schematic structures of a learning model generation device according to the fifth exemplary embodiment.
Figure 51:
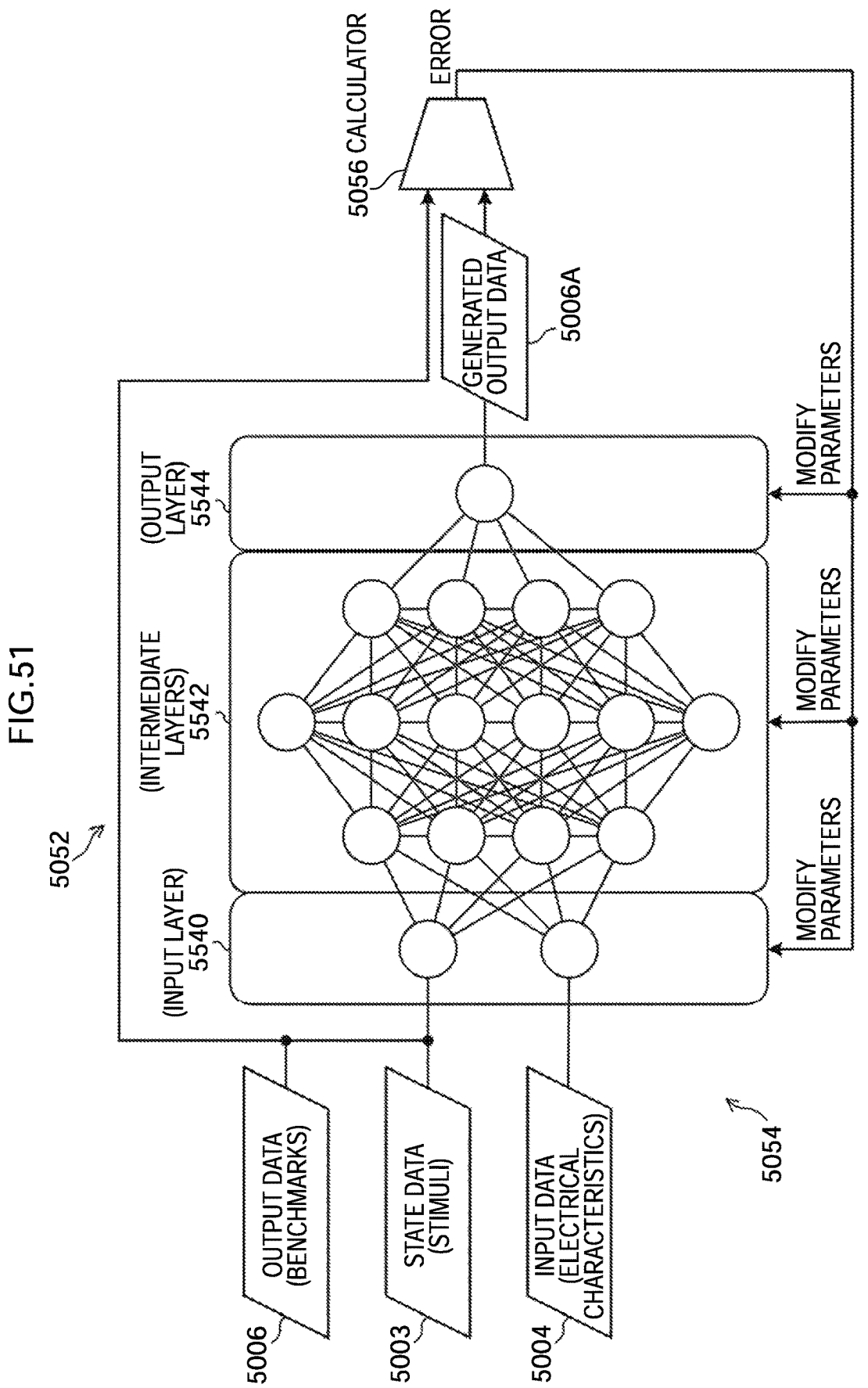
FIG. 51 is a diagram showing functional structures of a learning processing unit according to the fifth exemplary embodiment.

FIG. 50 shows schematic structures of a learning model generation device that generates the learning model 5051. The learning model generation device is provided with a learning processing unit 5052. The learning model generation device may be structured with a computer including a CPU, which is not shown in the drawings. The CPU, serving as the learning processing unit 5052, executes training data collection processing and learning model generation processing and generates the learning model 5051.

—Training Data Collection Processing—

In the training data collection processing, the learning processing unit 5052 uses the state data 5003 representing states at the application side as labels and collects large amounts of electrical characteristics (for example, electrical resistance values) of the conductive urethane 22 measured in time series to be the input data 5004. Therefore, the training data includes a large amount of sets of the input data 5004 representing the electrical characteristics and the state data 5003 representing states of the application side corresponding to the input data 5004.

More specifically, the training data collection processing acquires an electrical characteristic (for example, electrical resistance values) in a time series changed by a stimulus (pressure stimulus or material stimulus) according to a state of the application side when a state of the subject 5002 (that is, the application side of the conductive urethane 22) is formed. Then, the state data 5003 is assigned as a label to the acquired electrical characteristic time series (the input data 5004), and this processing is repeated until a pre-specified number of sets of the state data 5003 and input data 5004 is reached or until a pre-specified time has passed. These sets of the state data 5003 representing states of the application side and the electrical characteristics of the conductive urethane 22 in time series (the input data 5004) acquired for the respective states of the application side are used as the training data. The state data 5003 of the training data is memorized in memory, which is not shown in the drawings, to be treated as the output data 5006, which represents states of the application side to be correct estimation results of the learning processing, which is described below.

In the training data, time series information may be associated by assigning information representing a measurement time to each electrical resistance value of the conductive urethane 22 (the input data 5004). This time series information may be associated by assigning the information representing measurement times to sets of time series electrical resistance values of the conductive urethane 22 in periods defined as states of the application side.

Now, an example of the training data described above is shown in a table. Table 8 is an example in which data sets associating time series electrical resistance value data (r) with state data (R) representing states of the application side are used as training data relating to states of the application side of the conductive urethane 22.

TABLE 8

| Time series electrical resistance value data | State |
| --- | --- |
| r11, r12, r13, . . . r1n | R1 |
| r21, r22, r23, . . . r2n | R2 |
| . . . | . . . |
| rk1, rk2, rk3, . . . rkn | Rk |
| . . . | . . . |

An electrical characteristic detected at the conductive urethane 22 (a chronological characteristic according to time series electrical resistance value data) may be understood as a characteristic pattern relating to the state of the application side of the conductive urethane 22. That is, different stimuli are applied in time series to the conductive urethane 22 depending on states of the application side of the conductive urethane 22. Thus, an electrical characteristic time series in a predetermined duration can be regarded as representing a distinct electrical characteristic corresponding to the state of the application side. Therefore, a pattern (for example, the shape of a distribution of time series electrical resistance values of the electrical characteristic) represented by the electrical characteristic detected at the conductive urethane 22 (a chronological characteristic according to the time series electrical resistance value data) corresponds to the state of the application side and performs effectively in training processing, which is described below.

—Learning Model Generation Processing—

Now, the learning model generation processing is described. The learning model generation device shown in FIG. 50 uses the training data described above to generate the learning model 5051 through the learning model generation processing at the learning processing unit 5052.

FIG. 48 is a diagram showing functional structures of the learning processing unit 5052, that is, functional structures of the unillustrated CPU that relate to the learning model generation processing executed by the learning processing unit 5052. The unillustrated CPU of the learning processing unit 5052 includes a generator 5054 and a calculator 5056 as functional sections. The generator 5054 features a function of generating outputs in consideration of inputs that are before-and-after relationships of electrical resistance values acquired in time series.

As training data, the learning processing unit 5052 retains, in memory that is not shown in the drawings, numerous sets of the input data 5004 described above (for example, electrical resistance values) and the output data 5006 that is the state data 5003 representing states of the application side at which stimuli are applied to the conductive urethane 22.

The generator 5054 includes an input layer 5540, intermediate layers 5542 and an output layer 5544, constituting a publicly known neural network (NN). Because a neural network is a publicly known technology, detailed descriptions are not given here. The intermediate layers 5542 include numerous node groups (neuron groups) with inter-node connections and feedback connections. Data is inputted from the input layer 5540 to the intermediate layers 5542 and data of computation results from the intermediate layers 5542 is outputted to the output layer 5544.

The generator 5054 is a neural network that generates generated output data 5006A as data representing a state of the application side, or data that is close to a state of the application side, from the inputted input data 5004 (for example, electrical resistance values). The generated output data 5006A is data in which a state of the application side at which a stimulus is applied to the conductive urethane 22 is estimated from the input data 5004. The generator 5054 generates the generated output data representing a state close to a state of the application side from the input data 5004 inputted in time series. By learning using numerous sets of the input data 5004, the generator 5054 becomes capable of generating the generated output data 5006A to be close to a state of the application side of a body or the like that applies a stimulus to the subject 5002, that is, the conductive urethane 22. From another perspective, the electrical characteristics that are the input data 5004 inputted in time series may be understood as patterns. By learning these patterns, the generator 5054 becomes capable of generating the generated output data 5006A close to a state of the application side of a body or the like that applies a stimulus to the subject 5002, which is to say the conductive urethane 22.

The calculator 5056 compares the generated output data 5006A with the output data 5006 of the training data, and calculates an error in the comparison results. The learning processing unit 5052 inputs the generated output data 5006A and the output data 5006 of the training data to the calculator 5056. In response, the calculator 5056 calculates an error between the generated output data 5006A and the output data 5006 of the training data, and outputs signals representing the calculation results.

On the basis of the error calculated by the calculator 5056, the learning processing unit 5052 tunes weight parameters of the inter-node connections to train the generator 5054. More specifically, weight parameters of inter-node connections between the input layer 5540 and the intermediate layers 5542 of the generator 5054, weight parameters of inter-node connections in the intermediate layers 5542, and weight parameters of inter-node connections between the intermediate layers 5542 and the output layer 5544 are respectively fed back to the generator 5054 using a technique such as, for example, gradient descent, error back propagation or the like. That is, connections between all the nodes are optimized so as to minimize differences between the generated output data 5006A and the training data output data 5006, using the training data output data 5006 as benchmarks.

The generator 5054 may also use a recurrent neural network with a function that generates outputs with consideration to before-and-after relationships of the time series inputs, or may use an alternative method.

The learning processing unit 5052 uses the training data described above to generate the learning model 5051 by the learning model generation processing. The learning model 5051 is manifested as a collection of information of weight parameters (weights or strengths) of inter-node connections of training results and memorized in memory that is not shown in the drawings.

More specifically, the learning processing unit 5052 executes the learning model generation processing in the following sequence. In first learning processing, the learning processing unit 5052 acquires the input data 5004 (electrical characteristic) labeled with information representing states of the application side, which is the training data of results measured in time series. In second learning processing, the learning processing unit 5052 uses the training data of results measured in time series to generate the learning model 5051. That is, the learning processing unit 5052 obtains a collection of information of weight parameters (weights or strengths) of inter-node connections of the training results that is trained using the numerous sets of training data as described above. In third learning processing, the learning processing unit 5052 memorizes data manifested as the collection of information of weight parameters (weights or strengths) of inter-node connections of the training results to serve as the learning model 5051.

In the estimation device 5001 described above, the trained generator 5054 (that is, the data manifested as a collection of information of weight parameters of inter-node connections of training results) is used as the learning model 5051. When the learning model 5051 that is used is sufficiently trained, identifying states of the application side from electrical characteristic time series of the subject 5002, which is to say the conductive urethane 22, is conceivable.

—Physical Reservoir Computing—

In the conductive urethane 22 electrical pathways are complexly connected as described above. The conductive urethane 22 exhibits behaviors corresponding to changes (deformations) such as contractions, extensions and expansions of the electrical pathways, temporary cut-offs and new connections in accordance with changes, and changes in material properties (transformations). Consequently, the conductive urethane 22 exhibits behaviors with different electrical characteristics in response to applied stimuli (for example, pressure stimuli). This means the conductive urethane 22 may be treated as a reservoir storing data relating to deformations of the conductive urethane 22. That is, the estimation device 5001 may employ the conductive urethane 22 in a neural network (below referred to as a PRCN) known as physical reservoir computing (PRC). Because PRC and a PRCN are publicly known technologies, detailed descriptions are not given here. PRC and a PRCN are excellently applicable to estimation of information relating to deformations and transformations of the conductive urethane 22.

Figure 52:
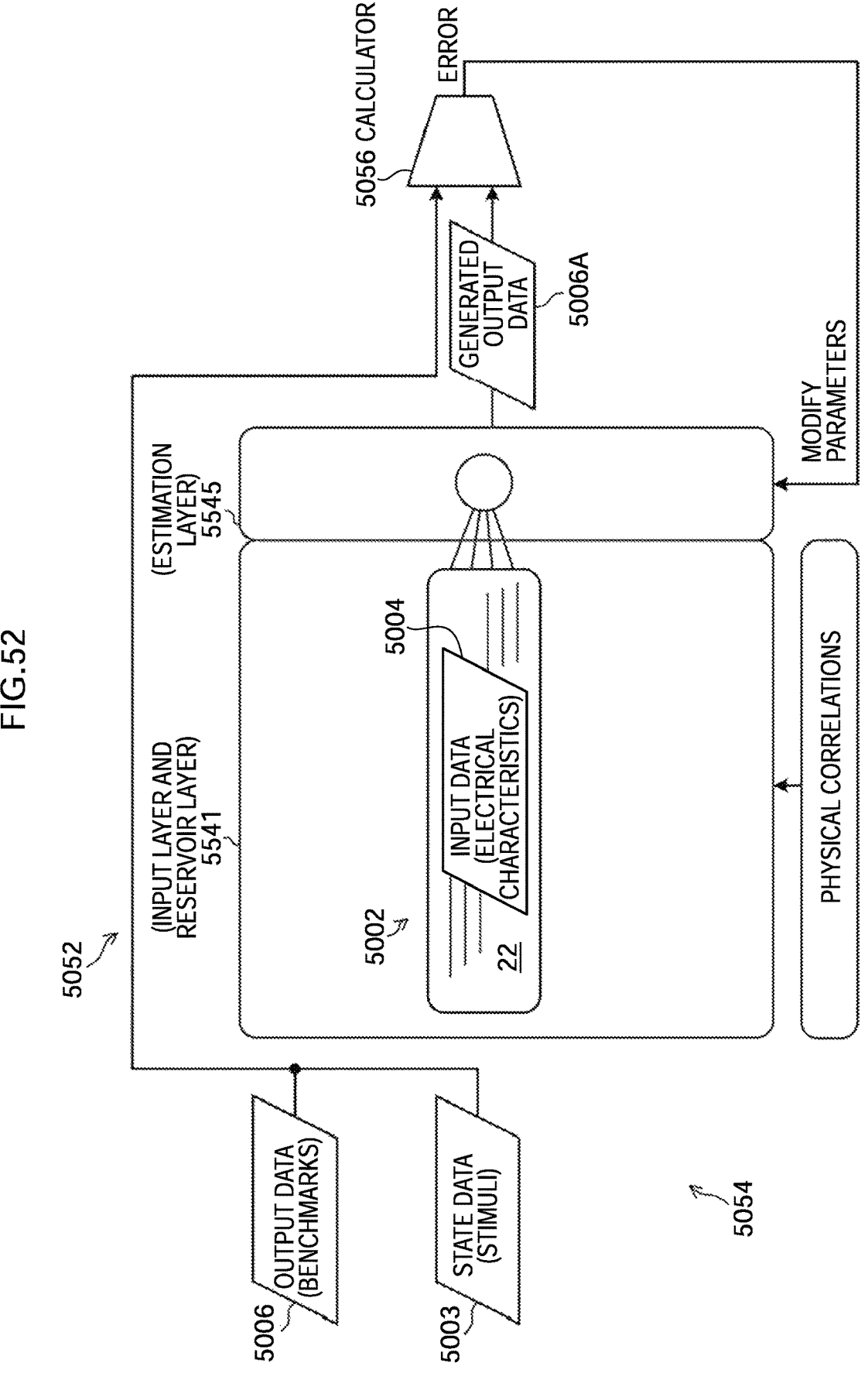
FIG. 52 is a diagram showing alternative functional structures of the learning processing unit according to the fifth exemplary embodiment.

FIG. 52 shows an example of functional structures of the learning processing unit 5052 employing a PRCN. The learning processing unit 5052 employing the PRCN includes an input reservoir layer 5541 and an estimation layer 5545. The input reservoir layer 5541 corresponds with the conductive urethane 22 included at the subject 5002. That is, in the learning processing unit 5052 employing the PRCN, the subject 5002 including the conductive urethane 22 is treated and trained as a reservoir that stores data relating to deformations and transformations of the subject 5002 including the conductive urethane 22. The conductive urethane 22 functions as an input layer inputting electrical resistance values, which are electrical characteristics (electrical resistance values) corresponding to each of numerous stimuli. The conductive urethane 22 also functions as a reservoir layer storing data relating to deformations and transformations of the conductive urethane 22. The conductive urethane 22 outputs electrical characteristics (the input data 5004) that differ in response to applied stimuli according to the state of the application side of a body or the like. Thus, the estimation layer 5545 may estimate an unknown state of the application side from electrical resistance values of the affected conductive urethane 22. Therefore, it is sufficient for the learning processing of the learning processing unit 5052 employing the PRCN to train the estimation layer 5545.

—Structure of Estimation Device—

Figure 53:
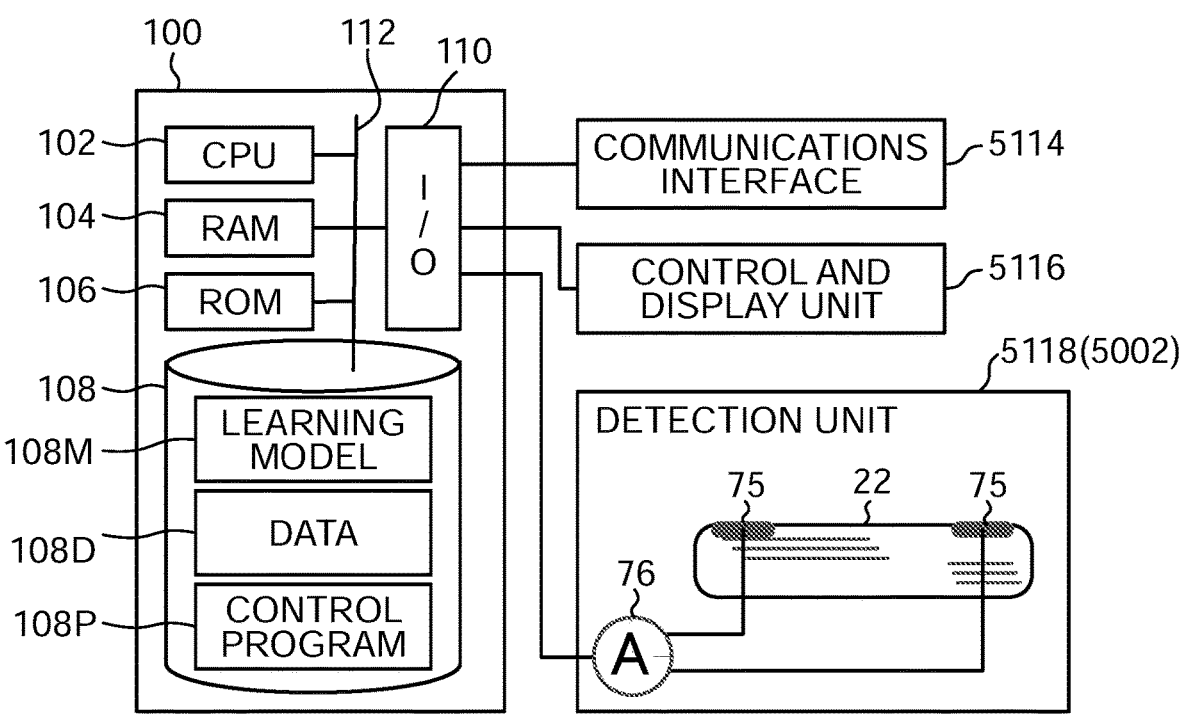
FIG. 53 is a diagram showing electronic structures of an estimation device according to the fifth exemplary embodiment.

Now, an example of concrete structures of the estimation device 5001 described above is described further. FIG. 53 shows an example of electronic structures of the estimation device 5001. The estimation device 5001 shown in FIG. 53 includes a computer serving as an execution device that executes processing to realize the various functions described above. The estimation device 5001 described above may be realized by the computer executing a program describing the various functions described above.

The computer that functions as the estimation device 5001 is equipped with the computer main body 100. The computer main body 100 is equipped with the CPU 102, RAM 104 of volatile memory or the like, ROM 106, auxiliary memory device 108 such as a hard disk drive (HDD) or the like, and input/output (I/O) interface 110. The CPU 102, RAM 104, ROM 106, auxiliary memory device 108 and input/output interface 110 are connected via the bus 112 to be capable of sending and receiving data and commands between one another. A communications interface 5114 for communicating with external equipment, a control and display unit 5116 of a display and keyboard or the like, and a detection unit 5118 are also connected to the input/output interface 110. The detection unit 5118 features a function for acquiring the input data 5004 (an electrical characteristic such as time series electrical resistance values or the like) from the subject 5002 including the conductive urethane 22. That is, the detection unit 5118 includes the subject 5002 at which the conductive urethane 22 is disposed and acquires the input data 5004 from the electrical characteristic detection unit 76 connected to the detection points 75 of the conductive urethane 22. The detection unit 5118 may be connected via the communications interface 5114.

The control program 108P for causing the computer main body 100 to function as the estimation device 5001 that is an example of the estimation device of the present disclosure is memorized in the auxiliary memory device 108. The CPU 102 reads the control program 108P from the auxiliary memory device 108, loads the control program 108P into the RAM 104 and executes the processing. Hence, the computer main body 100 executing the control program 108P operates as the estimation device 5001.

The learning model 108M including the learning model 5051 and the data 108D including various kinds of data are also memorized in the auxiliary memory device 108. The control program 108P may be provided on a recording medium such as a CD-ROM or the like.

—Estimation Processing—

Now, the estimation processing at the estimation device 5001 that is executed by the computer is described. FIG. 54 shows an example of a flow of the estimation processing according to the control program 108P executed by the computer main body 100. When a power supply of the computer main body 100 is turned on, the estimation processing shown in FIG. 54 is executed by the CPU 102. That is, the CPU 102 reads the control program 108P from the auxiliary memory device 108, loads the control program 108P into the RAM 104 and executes the processing.

First, the CPU 102 acquires the learning model 5051 (step S5200) by reading the learning model 5051 from the learning model 108M of the auxiliary memory device 108 and loading the learning model 5051 into the RAM 104. More specifically, the network model (see FIG. 51 and FIG. 52) that is a collection of inter-node connections according to weight parameters manifested as the learning model 5051 is loaded into the RAM 104. Thus, the learning model 5051 manifested by the combination of inter-node connections according to the weight parameters is built.

Then, the CPU 102 (step S5202) acquires an unknown set of the input data 5004 (an electrical characteristic), which is a target for estimating a state of the application side caused by a stimulus applied to the conductive urethane 22, in a time series via the detection unit 5118. Next, the CPU 102 uses the learning model 5051 to estimate (step S5204) the output data 5006 (an unknown state of the application side) that corresponds to the acquired input data 5004. The CPU 102 outputs (step S5206) the estimation result output data 5006 (the state of the application side) via the communications interface 5114, and ends this processing routine.

Thus, according to the estimation device 5001, an unknown state of the application side may be estimated from electrical resistance values of the conductive urethane 22. In concrete terms, the estimation device 5001 may estimate a state of the application side of a body or the like from the input data 5004 (electrical characteristic) that changes in accordance with a stimulus applied to the conductive urethane 22 due to the state of the application side. That is, a state of the application side of a body or the like may be estimated without using special equipment or large equipment and without directly measuring deformation of a flexible member.

Figure 55:
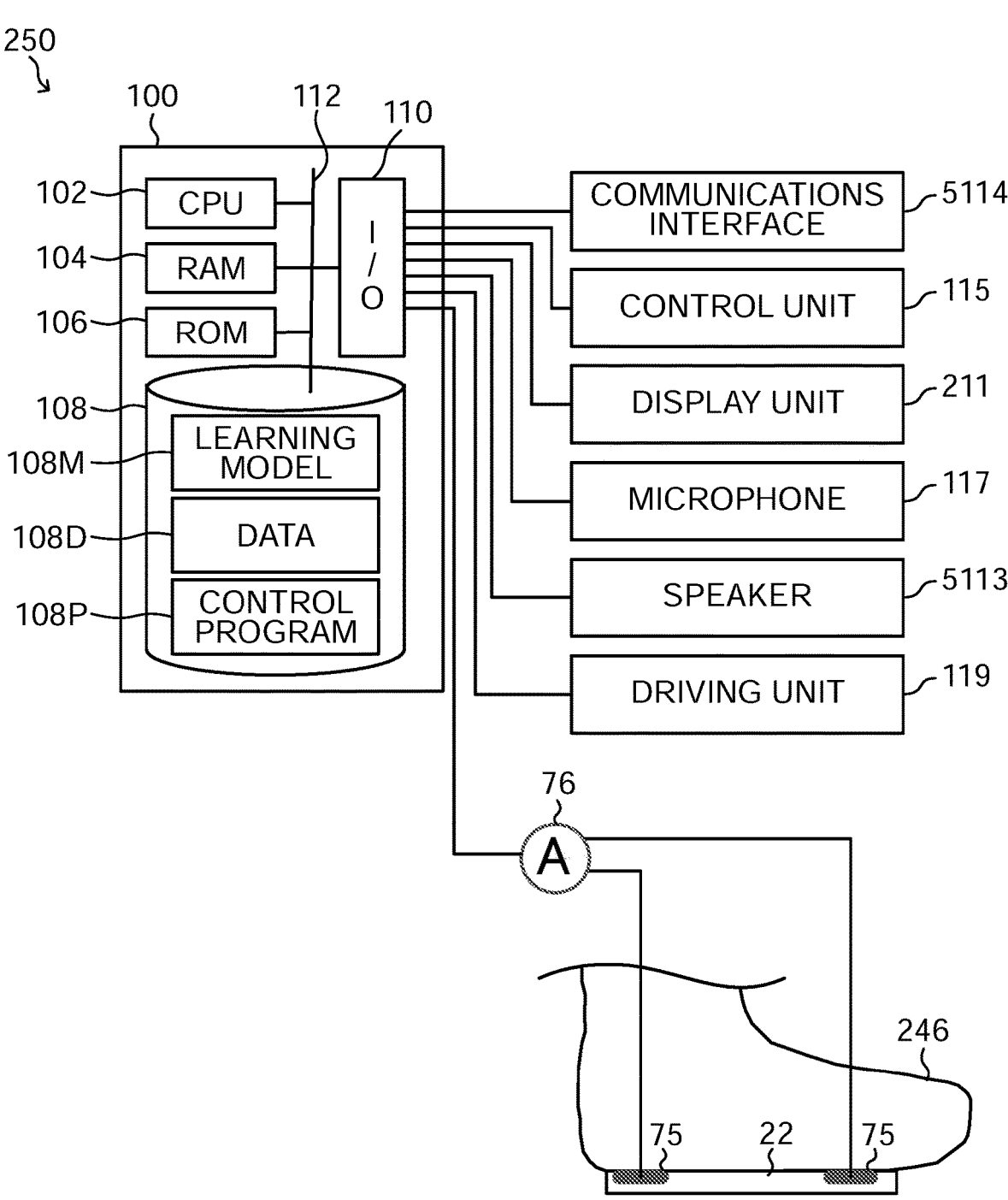
FIG. 55 is a diagram showing a structural example of a robot control device according to the fifth exemplary embodiment.

Now, a concrete example of estimation by the estimation device 5001 according to the present exemplary embodiment is described. Below, as an example of the flexible material with enhanced conductivity mentioned above, the conductive urethane 22 is provided at a foot of a robot, and a robot control device that provides functions for estimating information relating to touch states of the foot of the robot with external regions is described as an example. FIG. 2 is a diagram showing an example of robot structure of an android robot formed in a humanoid shape, and FIG. 55 is a diagram showing a structural example of the robot control device according to the present exemplary embodiment.

The meaning of the term "robot" as used in the present disclosure is intended to include a structure in which plural parts are coupled and at least one of the parts is movable.

Below, as an example of a touch state of a foot of the robot with an external region, an example of estimating a surface state of a ground surface or the like that a foot sole of the robot is touching is described. Touch states are not limited to surface states; other touch states that touch on an exterior surface of the robot are also applicable. Surface states include at least one of ground surface states and collision states with obstacles and the like (for example, states of collision with small stones, states of collision with steps and so forth). Ground surface states include at least one of degrees of unevenness of ground surfaces, such as rugged or gravelly paths and the like, and states of wet surfaces.

In the android robot 200 shown in FIG. 2, respective parts of the head portion 210, trunk portion 220, upper limb portions 230 (upper arms 232, forearms 234 and hands 236), leg portions 240 (thighs 242, lower legs 244 and feet 246) are linked by a skeleton 21. In the robot 200, the conductive urethane 22 is disposed at the soles of the feet. The conductive urethane 22 disposed at the robot 200 is connected to the electrical characteristic detection unit 76 via the detection points 75.

The conductive urethane 22 may be formed so as to have flexibility with predetermined stiffnesses. For example, the conductive urethane 22 may be formed so as to have flexibility with the stiffness varying in accordance with depth. With a structure such that the stiffness (flexibility) of each foot sole including the conductive urethane 22 varies in accordance with depth, a touch sensation similar to skin areas of the human body may be provided.

The conductive urethane 22 is formed in, for example, shapes that match the soles of the feet 246 of the robot 200. Thus, pressure stimuli from a ground surface or the like opposing the soles of the feet 246 of the robot 200 are applied as a physical quantity and change an electrical characteristic of the conductive urethane 22. Therefore, the conductive urethane 22 outputs patterns indicated by distinct electrical characteristics (electrical characteristics according to time series electrical resistance value data) depending on states of objects such as ground surfaces and the like that are touched by the soles of the feet 246 of the robot 200.

To improve a detection accuracy of the electrical characteristic, a greater number of the detection points 75 of the conductive urethane 22 than the (two) detection points shown in FIG. 55 may be used. As examples, one row or a plural number of rows in which plural conductive urethane pieces at which the respective detection points are disposed may be arrayed to form the conductive urethane 22, and the electrical characteristic may be detected from each of the plural conductive urethane pieces. For example, the conductive urethane pieces 23 (FIG. 9) may be arrayed to form the conductive urethane 22 (FIG. 10 and FIG. 11). The example shown in FIG. 9 illustrates a first detection set #1 and a second detection set #2. The first detection set #1 detects an electrical resistance value according to signals from detection points 75A that are distanced apart and disposed at opposite corner positions. The second detection set #2 detects an electrical resistance value according to signals from detection points 75B that are distanced apart and disposed at the other opposite corner positions. In the example shown in FIG. 10, the conductive urethane pieces 23 (FIG. 9) are arrayed (4×1) in the length direction of each foot 246 to form the conductive urethane 22, and the conductive urethane pieces 23, in sequence, constitute the first detection set #1 to an eighth detection set #8. In the example shown in FIG. 11 the first detection set #1 of each conductive urethane piece 23 (FIG. 9) is employed, and the conductive urethane pieces 23 are arrayed (4×2) in the length direction and width direction of the foot 246 to form the conductive urethane 22 and constitute the first detection set #1 to eighth detection set #8. Shapes of the conductive urethane 22 are shown as rectangular shapes in FIG. 9 to FIG. 11 but may be the shapes of the feet 246.

As an alternative example, a detection range of the conductive urethane 22 may be segmented, detection points may be provided at each segmented detection range, and the electrical characteristic may be detected for each detection range. For example, specifying regions corresponding to the size of the conductive urethane pieces 23 shown in FIG. 10 and FIG. 11 as detection ranges, disposing detection points at each of the specified detection ranges, and detecting the electrical characteristic in each detection range is applicable.

The robot 200 is equipped with the robot control device 250, which controls the robot 200. The robot control device 250 includes functional units that operate as the estimation device 5001.

The robot control device 250 is equipped with the computer main body 100. The computer main body 100 is equipped with the CPU 102, RAM 104 of volatile memory or the like, ROM 106, auxiliary memory device 108 such as a hard disk drive (HDD) or the like, and input/output (I/O) interface 110. The CPU 102, RAM 104, ROM 106, auxiliary memory device 108 and input/output interface 110 are connected via the bus 112 to be capable of sending and receiving data and commands between one another. The communications interface 5114 for communicating with external equipment is connected to the input/output interface 110. The communications interface 5114 functions to acquire the input data 5004 (electrical resistances) from the robot 200 with the conductive urethane 22. That is, the communications interface 5114 is a detection unit and is capable of acquiring the input data 5004 (electrical resistances) from the electrical characteristic detection unit 76 connected to the detection points 75 of the conductive urethane 22 disposed at the robot 200.

The control unit 115 that is a keyboard or the like, the display unit 211 that is a display or the like, the microphone 117 for voice message inputs, a speaker 5113 for voice message outputs, and the driving unit 119 are connected to the input/output interface 110. The display unit 211 is disposed at the head portion 210 of the robot 200. The control unit 115, microphone 117 and speaker 5113 are, for example, disposed in the interior (not shown in the drawings) of the trunk portion 220 of the robot 200. The driving unit 119 is disposed (not shown in the drawings) so as to drive to enable movements of parts in accordance with coupling of a skeleton 201 of the robot 200.

Because the robot 200 is equipped with the control unit 115, display unit 211, microphone 117 and speaker 5113, commands from users, states of users, information on responses to users and the like may be acquired and supplied.

The driving unit 119 is provided to move parts of the robot 200 in accordance with the coupling of the skeleton 201. By the robot 200 moving respective parts or moving plural coupled parts by the driving of the driving unit 119, the robot 200 may maintain various postures, conduct various actions, and walk. Thus, the robot 200 operates as an autonomous robot system.

The control program 108P for causing the computer main body 100 to function as an example of the estimation device of the present disclosure is memorized in the auxiliary memory device 108. The CPU 102 reads the control program 108P from the auxiliary memory device 108, loads the control program 108P into the RAM 104 and executes the processing. Hence, the computer main body 100 executing the control program 108P operates the robot control device 250 as an example of the estimation device 5001 of the present disclosure.

The learning model 108M including the learning model 5051 and various kinds of data are memorized in the auxiliary memory device 108.

To estimate a surface state of a ground surface or the like that is touched by the soles of the feet 246 of the robot 200, the robot control device 250 detects an electrical characteristic of the conductive urethane 22 disposed at the robot 200. To detect the electrical characteristic of the conductive urethane 22, the electrical characteristic detection unit 76 is connected to the input/output interface 110. The electrical characteristic detection unit 76 detects the electrical characteristic inputted from the detection points 75 and outputs detection results to the computer main body 100.

The computer main body 100 uses the trained learning model 5051 to estimate the surface state of the ground surface or the like from the electrical characteristic of the conductive urethane 22 provided at the soles of the feet 246 of the robot 200.

Estimation processing at the computer main body 100 uses the trained learning model 5051 to estimate and output an unknown state of a ground surface or the like that is in contact with the soles of the feet 246 of the robot 200, which is a surface state of the ground surface or the like that relates to a pressure distribution of the conductive urethane 22. Therefore, a surface state of a ground surface or the like may be identified without using special equipment or large equipment and without directly measuring deformation of the conductive urethane 22. To estimate a surface state of a ground surface or the like from an electrical characteristic of the conductive urethane 22, the learning model 5051 that estimates the surface state of the ground surface or the like from the electrical characteristic of the conductive urethane 22 is memorized at the auxiliary memory device 108 of the computer main body 100.

The learning model 5051 is a model that has been trained to compute a surface state of a ground surface or the like, that is, a surface state (the output data 5006) of the ground surface or the like representing a state of pressure distribution or the like on the conductive urethane 22, from electrical resistances (the input data 5004) of the conductive urethane 22 that change with pressure stimuli from the ground surface or the like through the soles of the feet 246 of the robot 200. The learning model 5051 is, for example, a model that defines the trained neural network described above, which is manifested as a collection of information of weights (strengths) of connections between nodes (neurons) structuring the neural network.

The learning model 5051 is generated by the learning processing at the learning processing unit 5052 (FIG. 50). The learning processing unit 5052 uses electrical characteristics of the conductive urethane 22 (the input data 5004) that change with pressure stimuli caused by surface states (the state data 5003) of ground surfaces and the like that are in contact with the soles of the feet 246 of the robot 200 to conduct the learning processing. That is, the learning processing unit 5052 uses surface states of ground surfaces and the like as labels and large amounts of data of sets of electrical resistances of the conductive urethane 22 measured in time series as training data. More specifically, the training data includes a large amount of sets of input data including electrical resistance values (the input data 5004) and information (the output data 5006) representing surface states of ground surfaces and the like corresponding to the input data. The learning processing unit 5052 associates time series information by assigning information representing a measurement time to each electrical resistance value of the conductive urethane 22 (the input data 5004). This time series information may be associated by assigning information representing measurement times to sets of time series electrical resistance values of the conductive urethane 22 in periods defined as the surface states of ground surfaces and the like (the state data 5003).

Now the learning processing unit 5052 is described. In the learning processing conducted by the learning processing unit 5052, surface states (the state data 5003) of ground surfaces and the like that are in contact with the soles of the feet 246 of the robot 200 and electrical resistance values from the conductive urethane 22 (the input data 5004) are used as training data. For example, electrical resistance values are detected while the robot 200 is placed or walking on a ground surface with a known surface state, and the electrical resistance values are associated with the surface state of the ground surface or the like and used as the training data.

Surface states include states representing time series pressure distributions of shoes 12 or the like. States representing time series pressure distributions include static states according to postures in which movements of the robot 200 are stable, and dynamic states according to plural postures or movements that change chronologically. It is sufficient to connect the electrical characteristic detection unit 76 to the detection points 75 and detect the electrical characteristic (that is, the electrical resistance values that are volume resistance values).

More specifically, the learning processing unit 5052 described above executes training data collection processing and learning processing. FIG. 56 shows an example of the training data collection processing executed by a CPU, which is not shown in the drawings. In step S5100, the learning processing unit 5052 applies a stimulus by the robot 200 being placed or walking on a ground surface or the like that has a predetermined surface state. In step S5102, the learning processing unit 5052 acquires a time series of electrical resistance values of the conductive urethane 22 that change in response to the pressure stimulus according to the surface state of the ground surface or the like. In step S5104, the learning processing unit 5052 assigns the surface state (the state data 5003) information to the acquired time series of electrical resistance values as a label and memorizes the same. The learning processing unit 5052 repeats the processing described above until a pre-specified number of sets of surface states of ground surfaces and the like (the state data 5003) and electrical resistance values of the conductive urethane 22 is reached or until a pre-specified time has passed (results of the determination in step S5106 are negative until the result is affirmative). Thus, the learning processing unit 5052 may acquire and memorize electrical resistance values of the conductive urethane 22 in time series for being placed or walking on each of different surface states of ground surfaces and the like. The learning processing unit 5052 uses the memorized sets of time series electrical resistance values of the conductive urethane 22 of the respective surface states as the training data.

A state of wearing the shoes 12 may be identified by at least a subset of changes, preservation and the like of physical quantities, such as relative positional relationships of portions of the feet 246 of the robot 200 with respect to a ground surface or the like and distributions, sizes and frequencies of pressure stimuli and the like at those portions. Thus, this subset of time series physical quantities can be thought to include characteristics that represent surface states of ground surfaces and the like. In the present exemplary embodiment, because the conductive urethane 22 is utilized, an electrical characteristic (volume resistance) reflecting these physical quantities may be detected in time series.

An example of the training data for training the learning model 5051 that estimates a surface state of a ground surface or the like on which the robot 200 is placed from the electrical characteristic of the conductive urethane 22 is shown in a table. Table 9 is an example in which data associating time series electrical resistance value data (r) with surface state values is used as training data relating to the surface states. Table 9 shows an example of data in which, as the surface state values, materials of ground surfaces and the like are assigned as the state values.

TABLE 9

| Time series electrical resistance value data | State |
| --- | --- |
| r11, r12, r13, . . . r1n | Asphalt |
| r21, r22, r23, . . . r2n | Concrete |
| . . . | . . . |
| rk1, rk2, rk3, . . . rkn | Wood |
| . . . | . . . |

Surface state values to be assigned to time series electrical resistance value data are not limited by the above description; alternative state values may be employed. For example, as shown in table 10, surface state values quantifying degrees of unevenness of ground surfaces and the like may be employed. Alternatively, surface state values quantifying ground surface states, surface state values quantifying wet ground surface states and the like may be employed. Further, when collision states with obstacles are to be estimated, surface state values of types of obstacle may be employed as information relating to touch states of the feet of the robot 200 with external regions.

TABLE 10

| Time series electrical resistance value data | State |
| --- | --- |
| r11, r12, r13, . . . r1n | 5 |
| r21, r22, r23, . . . r2n | 4 |
| . . . | . . . |
| rk1, rk2, rk3, . . . rkn | 2 |
| . . . | . . . |

In the present exemplary embodiment, the learning model 5051 is generated by the learning processing by the learning processing unit 5052, using this collected training data.

Figure 57:
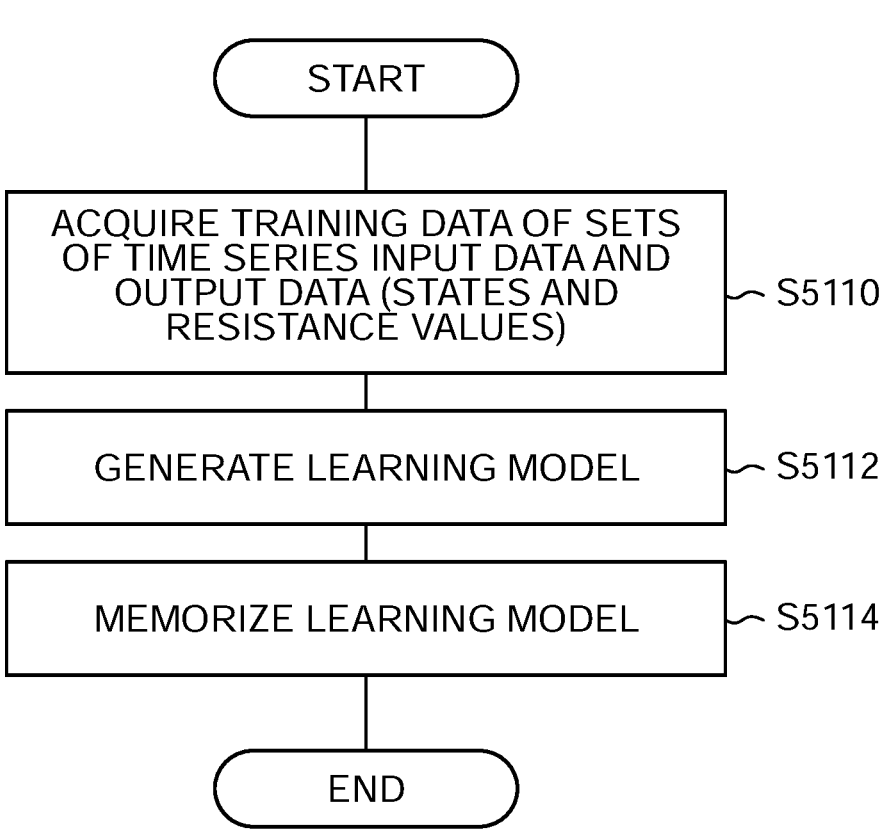
FIG. 57 is a flowchart showing an example of a flow of learning processing according to the fifth exemplary embodiment.

FIG. 57 shows an example of flow of the learning processing. In step S5110, the learning processing unit 5052 acquires the input data 5004 (electrical resistances) labeled with information representing surface states of ground surfaces and the like, which is the training data of results measured in time series. In step S5112, the learning processing unit 5052 uses the training data of results measured in time series to generate the learning model 5051. That is, the learning processing unit 5052 obtains a collection of information of weight parameters (weights or strengths) of inter-node connections of the training results that are trained using the numerous sets of training data as described above. In step S5114, the learning processing unit 5052 memorizes data manifested as the collection of information of weight parameters (weights or strengths) of inter-node connections of the training results to serve as the learning model 5051.

The processing carried out by the learning processing unit 5052 is an example of processing of the learning model generation device of the present disclosure. The computer main body 100 is an example of the estimation unit and the estimation device of the present disclosure. The output data 5006 that is information representing surface states is an example of information relating to surface states of the present disclosure.

Figure 58:
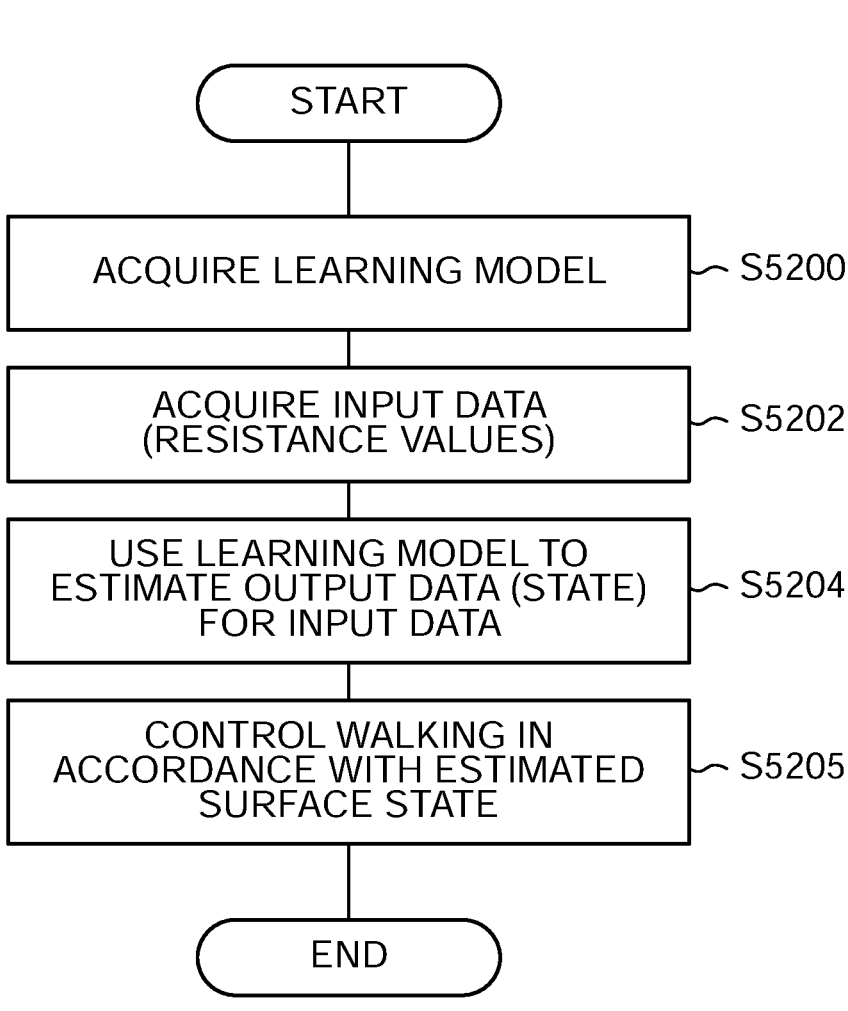
FIG. 58 is a flowchart showing a specific example of a flow of estimation processing according to the fifth exemplary embodiment.

The computer main body 100 uses the learning model 5051 generated by the learning processing unit 5052 to estimate a surface state of a ground surface or the like that is in contact with the soles of the feet 246 of the robot 200. More specifically, the computer main body 100 carries out estimation processing similar to FIG. 54 described above, but as shown in FIG. 58, instead of outputting output data of an estimation result (step S5206), in step S5205 the computer main body 100 carries out walking control in accordance with the estimated surface state. For example, driving amounts of the driving unit 119 and the like are specified in advance for each surface state, and the computer main body 100 controls the driving unit 119 in accordance with the estimated surface state to control walking of the robot 200. Thus, control to assist movement of the robot 200 while identifying surface states of ground surfaces and the like is possible. The estimation processing shown in FIG. 58 is an example of processing that is executed in a control method and of control of a control unit of the present disclosure.

As described above, according to the present disclosure, surface states of ground surfaces and the like may be estimated from the input data 5004 (electrical resistances) of the conductive urethane 22 that change in accordance with pressure stimuli applied through the soles of the feet of the robot 200. That is, a surface state of an object that is touched by the soles of the feet 246 of the robot 200 may be estimated as a touch state without using special equipment or bulky devices such as large equipment and without directly measuring deformation of a flexible member.

With the robot control device 250 that uses the learning model 5051 trained by the learning processing described above, it is verified that touch states of the feet 246 of the robot 200 with external regions may be estimated by inputting the electrical characteristic of the conductive urethane 22 for various unknown surface states.

Because walking control is performed in accordance with surface states of ground surfaces and the like that are in contact with the soles of the feet 246 of the robot 200, walking speeds, walking methods and the like may be changed to suit surface states of ground surfaces. Therefore, falls caused by changes of ground surface during walking and suchlike may be suppressed.

As described above, in the present disclosure, exemplary embodiments are described that employ conductive urethane as an example of the flexible member. However, it will be clear that the flexible member is not limited to conductive urethane.

The technical scope of the present disclosure is not to be limited to the scopes recited in the above exemplary embodiments. Numerous modifications and improvements may be applied to the exemplary embodiments described above within a scope not departing from the gist of the invention, and modes in which these modifications and/or improvements are applied are to be encompassed by the technical scope of the present disclosure.

In the exemplary embodiments described above, the estimation processing, learning processing and driving processing are described as being implemented by software structures according to processes using flowcharts, but this is not limiting. For example, modes are possible that implement these processes with hardware structures.

A portion of the estimation processing, for example, a neural network of a learning model or the like, may be constituted as a hardware circuit.

In the exemplary embodiments described above, processing is described as being implemented by the execution of programs memorized at an auxiliary memory device, but at least a portion of the processing of a program may be implemented in hardware. Further, the flows of the processing of the programs described in the above exemplary embodiments are examples. Unnecessary steps may be removed, new steps may be added, and processing sequences may be rearranged within a scope not departing from the gist of the disclosure.

In the exemplary embodiments described above, the processing is executed by a computer. Therefore, the processing described above may be memorized and distributed, on a recording medium such as an optical disc or the like, as programs describing code that can be processed by a computer.

The above exemplary embodiments are described as using a CPU as an example of a general purpose processor, but the term "processor" is intended to include processors in a broad sense, encompassing general purpose processors (for example, a central processing unit (CPU) or the like), dedicated processors (for example, a graphics processing unit (GPU), application-specific integrated circuit (ASIC), field programmable gate array (FPGA), programmable logic device or the like) and so forth. Operations of the processor need not be conducted by a single processor but may be conducted by plural processors in co-operation, and may be conducted by plural processors at physically distant locations in co-ordination.

NOTES

The following supplementary notes are disclosed in relation to the exemplary embodiment described above.

Supplementary Note 1

An estimation device includes:

a detection unit that detects an electrical characteristic between a pre-specified plurality of detection points at a flexible material in a robot, the flexible material being provided at at least a part of an exterior portion or at a movable portion, the flexible material including conductivity, and the electrical characteristic changing in response to a change of state;

memory; and at least one processor connected to the memory, wherein the processor inputs a time series of the electrical characteristic detected by the detection unit to a learning model and estimates robot state information, robot operation information or user identification information representing a state of the robot corresponding to the input time series of the electrical characteristic, the learning model being trained so as to input the time series of the electrical characteristic and output the robot state information, robot operation information or user identification information, and the learning model being trained using, as training data, time series of the electrical characteristic when changes of state occur, and robot state information representing states of the robot after the changes of state, robot operation information representing operations of the robot corresponding to the changes of state, or identification information of users who touch the robot and cause the changes of state.

Supplementary Note 2

A non-transitory memory medium memorizing a program executable by a computer for executing estimation processing, including a detection unit that detects an electrical characteristic between a pre-specified plurality of detection points at a flexible material in a robot, the flexible material being provided at at least a part of an exterior portion or at a movable portion, the flexible material including conductivity, and the electrical characteristic changing in response to a change of state, and the estimation processing inputting a time series of the electrical characteristic detected by the detection unit to a learning model and estimating robot state information, robot operation information or user identification information representing a state of the robot corresponding to the input time series of the electrical characteristic, the learning model being trained so as to input the time series of the electrical characteristic and output the robot state information, robot operation information or user identification information, and the learning model being trained using, as training data, time series of the electrical characteristic when changes of state occur, and robot state information representing states of the robot after the changes of state, robot operation information representing operations of the robot corresponding to the changes of state, or identification information of users who touch the robot and cause the changes of state.

The disclosures of Japanese Patent Application Nos. 2021-121927, 2021-122017, 2021-122018, 2021-121929 and 2021-202894 are incorporated into the present specification by reference in their entirety.

All references, patent applications and technical specifications cited in the present specification are incorporated by reference into the present specification to the same extent as if the individual references, patent applications and technical specifications were specifically and individually recited as being incorporated by reference.

The invention claimed is:

1. An estimation device, comprising:

a detection unit that detects an electrical characteristic between a pre-specified plurality of detection points at a flexible material in a robot, the flexible material being provided at at least a part of an exterior portion or at a movable portion, the flexible material including conductivity, and the electrical characteristic changing in response to a change of state, wherein the electrical characteristic is volume resistance; and an estimation unit that inputs a time series of the electrical characteristic detected by the detection unit to a learning model and estimates robot state information representing a state of the robot, robot operation information, or user identification information corresponding to the input time series of the electrical characteristic, the learning model being trained so as to input the time series of the electrical characteristic and output the robot state information, robot operation information, or user identification information, and the learning model being trained using, as training data, time series of the electrical characteristic when changes of state occur, and using:

robot state information representing states of the robot after the changes of state, robot operation information representing operations of the robot corresponding to the changes of state, or identification information of users who touch the robot and cause the changes of state, wherein the learning model is trained so as to output, as the robot state information corresponding to the detected electrical characteristic, information representing a cracked state of the robot.

2. The estimation device according to claim 1, wherein:

the robot includes an artificial muscle; and the liquid includes a medium for activating the artificial muscle.

3. The estimation device according to claim 1, wherein:

the electrical characteristic is volume resistance;

operations of the robot include a type of operation that the robot is to execute just after pressure is applied to the flexible material, the type of operation corresponding to the applied pressure; and the learning model is trained so as to output, as the robot operation information, information representing an operation of the robot corresponding to the detected electrical characteristic.

4. The estimation device according to claim 1, wherein:

the flexible material is disposed at a plurality of different regions of the robot;

the detection unit detects the electrical characteristic between the plurality of detection points at each of the plurality of different regions; and the learning model is trained so as to output robot operation information representing an operation of the robot corresponding to the electrical characteristics respectively detected at the plurality of different regions.

5. The estimation device according to claim 1, wherein the robot state information comprises:

touch state information representing a touch state of the movable portion against a target object that applies pressure to the flexible material, or information relating to a touch state of a foot of the robot with respect to an external region that applies pressure to the flexible material.

6. The estimation device according to claim 5, wherein:

the electrical characteristic is volume resistance;

the movable portion is formed as an inflectable tubular member;

the target object is a passage enclosed by a peripheral wall face;

the touch state includes a passage inflection state manifested by the movable portion being inserted in the passage and the movable portion inflecting against and touching the passage; and the learning model is trained so as to output, as the touch state information, information representing the passage inflection state corresponding to the detected electrical characteristic.

7. The estimation device according to claim 5, wherein:
the electrical characteristic is volume resistance;
the movable portion is formed as an inflectable tubular member;
the touch state includes a surface state of the target object manifested by the movable portion touching a surface of the target object; and
the learning model is trained so as to output, as the touch state information, information representing the surface state of the target object corresponding to the detected electrical characteristic.

8. The estimation device according to claim 1, further comprising a learning unit that:
for each user, collects new training data from an estimation result estimated and obtained using the learning model, and
uses the collected training data for each user to continually train the learning model.

9. The estimation device according to claim 1, wherein:
the flexible material is disposed at a plurality of different regions of the robot;
the detection unit detects the electrical characteristic between the plurality of detection points at each of the plurality of different regions; and
the learning model is trained so as to output user identification information determined by respective touch states of a user against the plurality of different regions.

10. The estimation device according to claim 5, wherein the touch state comprises:
a ground surface state in contact with a sole of the foot of the robot, or
a collision state with an obstacle.

11. The estimation device according to claim 10, wherein the ground surface state comprises:
a degree of unevenness of a ground surface, or
a state of a wet ground surface.

12. The estimation device according to claim 1, further comprising a control unit that assists control of movement of the robot in accordance with an estimation result from the estimation unit.

13. The estimation device according to claim 1, wherein:
the flexible material is disposed at a plurality of different regions of the robot;
the detection unit detects the electrical characteristic between the plurality of detection points at each of the plurality of different regions; and
the learning model is trained so as to output, as the robot state information, part state information representing a state of a part in relation to each of the plurality of different regions.

14. The estimation device according to claim 1, wherein the learning model includes a model generated by training that uses a network based on reservoir computing in which the flexible material is a reservoir.

15. A robot system, comprising:
a robot in which a flexible material is provided at a movable portion, the flexible material including conductivity and an electrical characteristic of the flexible material changing in response to a change in applied pressure; and
the estimation device according to claim 1.

16. A robot system, comprising:
a robot in which a flexible material is provided at at least a part of an exterior portion, the flexible material including conductivity and an electrical characteristic of the flexible material changing in response to a change of state or a change in applied pressure; and
the estimation device according to claim 1.

17. A robot system, comprising:
a robot in which a flexible material is provided at at least a part of an exterior portion, the flexible material including conductivity and an electrical characteristic of the flexible material changing in response to a change in applied pressure; and
the estimation device according to claim 1,
wherein the robot is controlled so as to perform an operation represented by the robot operation information estimated by the estimation device.

18. An estimation method, comprising, by a computer:
acquiring an electrical characteristic from a detection unit that detects the electrical characteristic between a pre-specified plurality of detection points at a flexible material in a robot, the flexible material being provided at at least a part of an exterior portion or at a movable portion, the flexible material including conductivity, and the electrical characteristic changing in response to a change of state, wherein the electrical characteristic is volume resistance; and
estimating robot state information representing a state of the robot, robot operation information, or user identification information corresponding to an input time series of the electrical characteristic detected by the detection unit, the estimating including inputting the time series of the electrical characteristic to a learning model, the learning model being trained so as to input the time series of the electrical characteristic and output the robot state information, robot operation information, or user identification information, and the learning model being trained using, as training data, time series of the electrical characteristic when changes of state occur, and using:
robot state information representing states of the robot after the changes of state,
robot operation information representing operations of the robot corresponding to the changes of state, or
identification information of users who touch the robot and cause the changes of state,
wherein the learning model is trained so as to output, as the robot state information corresponding to the detected electrical characteristic, information representing a cracked state of the robot.

19. A non-transitory storage medium storing a program executable by a computer to perform estimation processing, the estimation processing comprising:
acquiring an electrical characteristic from a detection unit that detects the electrical characteristic between a pre-specified plurality of detection points at a flexible material in a robot, the flexible material being provided at at least a part of an exterior portion or at a movable portion, the flexible material including conductivity, and the electrical characteristic changing in response to a change of state, wherein the electrical characteristic is volume resistance; and estimating robot state information representing a state of the robot, robot operation information, or user identification information corresponding to an input time series of the electrical characteristic detected by the detection unit, the estimating including inputting the time series of the electrical characteristic to a learning model, the learning model being trained so as to input the time series of the electrical characteristic and output the robot state information, robot operation information, or user identification information, and the learning model being trained using, as training data, time series of the electrical characteristic when changes of state occur, and using:

robot state information representing states of the robot after the changes of state, robot operation information representing operations of the robot corresponding to the changes of state, or identification information of users who touch the robot and cause the changes of state, wherein the learning model is trained so as to output, as the robot state information corresponding to the detected electrical characteristic, information representing a cracked state of the robot.

\* \* \* \* \*